US012728587B2

(12) United States Patent
Ashkenazy et al.

(10) Patent No.: US 12,728,587 B2
(45) Date of Patent: Sep. 8, 2026

(54) METHOD AND SYSTEM FOR THREE-DIMENSIONAL PRINTING ON FABRIC

(71) Applicant: Stratasys Ltd., Rehovot (IL)

(72) Inventors: Ofir Ashkenazy, Mevaseret Zion (IL); Elena Shpayzer, Gedera (IL); Dani Peri, Rehovot (IL); Margarita Feldman, Ashdod (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 19/144,476

(22) PCT Filed: Dec. 28, 2023

(86) PCT No.: PCT/IL2023/051334
§ 371 (c)(1),
(2) Date: Jun. 29, 2025

(87) PCT Pub. No.: WO2024/142067
PCT Pub. Date: Jul. 4, 2024

(65) Prior Publication Data

US 2026/0109106 A1 Apr. 23, 2026

Related U.S. Application Data

(60) Provisional application No. 63/436,181, filed on Dec. 30, 2022.

(51) Int. Cl.
*B29C 64/112* (2017.01)
*B29C 64/291* (2017.01)
(Continued)

(52) U.S. Cl.
CPC .......... *B29C 64/112* (2017.08); *B29C 64/291* (2017.08); *B29C 64/386* (2017.08); *B33Y 10/00* (2014.12); *B33Y 50/00* (2014.12)

(58) Field of Classification Search
CPC ... B29C 64/112; B29C 64/386; B29C 64/291; B33Y 10/00; B33Y 50/00
See application file for complete search history.

(56) References Cited

U.S. PATENT DOCUMENTS 6,259,979 B1 7/2001 Holmquist
6,569,373 B2 5/2003 Napadensky
(Continued)

FOREIGN PATENT DOCUMENTS

CN 306606355 6/2021
EP 3606297 2/2020
(Continued)

OTHER PUBLICATIONS

International Search Report and the Written Opinion Dated Apr. 10, 2024 From the International Searching Authority Re. Application No. PCT/IL2023/051335 (5 Pages).
(Continued)

*Primary Examiner* — Monica A Huson

(57) ABSTRACT

A method of forming an object on a fabric by three-dimensional printing, comprises: printing on the fabric an adhesion structure having a stack of layers in a configured pattern corresponding to a shape of a bottommost surface of the object, wherein for each layer of the stack the printing comprises dispensing and curing a first formulation along a scanning direction. The method also comprises printing the object onto the stack by dispensing and curing a building formulation in layers along the direction in configured patterns corresponding to shapes of slices of the object. Optionally, the curing comprises irradiating the layer by creating a pattern of curing radiation that scans the layer along the direction, wherein the pattern has a shape of a single stripe.

20 Claims, 21 Drawing Sheets

(51) Int. Cl.

| | |
|---|---|
| ***B29C 64/386*** | (2017.01) |
| *B33Y 10/00* | (2015.01) |
| *B33Y 50/00* | (2015.01) |

(56) References Cited

U.S. PATENT DOCUMENTS

| | | | |
|---|---|---|---|
| 6,658,314 | B1 | 12/2003 | Gothait |
| 6,850,334 | B1 | 2/2005 | Gothait |
| 6,863,859 | B2 | 3/2005 | Levy |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| D577,752 | S | 9/2008 | McDaniel et al. |
| 7,500,846 | B2 | 3/2009 | Eshed et al. |
| 9,031,680 | B2 | 5/2015 | Napadensky |
| 9,227,365 | B2 | 1/2016 | Dikovsky et al. |
| D809,578 | S | 2/2018 | Cummings |
| D812,653 | S | 3/2018 | Brusilovski et al. |
| D812,654 | S | 3/2018 | Brusilovski |
| D870,164 | S | 12/2019 | Wurmfeld |
| D894,707 | S | 9/2020 | Hall |
| D903,456 | S | 12/2020 | Hall |
| D940,212 | S | 1/2022 | Meron et al. |
| D949,962 | S | 4/2022 | Brusilovski |
| D951,052 | S | 5/2022 | Choi et al. |
| D966,355 | S | 10/2022 | Mordechay et al. |
| D986,524 | S | 5/2023 | Mordechay et al. |
| D1,003,139 | S | 10/2023 | Hall |
| D1,033,496 | S | 7/2024 | Shin et al. |
| 2006/0054039 | A1 | 3/2006 | Kritchman et al. |

FOREIGN PATENT DOCUMENTS

| | | |
|---|---|---|
| JP | 2009-190338 | 8/2009 |
| KR | 300911537.0000 | 6/2017 |
| WO | WO 2016/009426 | 1/2016 |
| WO | WO 2022/024114 | 2/2022 |
| WO | WO 2022/085006 | 4/2022 |
| WO | WO 2024/142067 | 7/2024 |
| WO | WO 2024/142068 | 7/2024 |
| WO | WO 2024/142069 | 7/2024 |

OTHER PUBLICATIONS

International Search Report and the Written Opinion Dated Mar. 11, 2024 From the International Searching Authority Re. Application No. PCT/IL2023/051336 (11 Pages).

International Search Report and the Written Opinion Dated Mar. 21, 2024 From the International Searching Authority Re. Application No. PCT/IL2023/051334 (16 Pages).

Notification of Refusal—Rule 18 of the Common Regulations Under the Hague Agreement, Subsection 22(3) and Section 43 of the Industrial Design Regulations of Canada Dated Nov. 5, 2024 From the Innovation, Science and Economic Development Canada, Canadian Intellectual Property Office Re. Application No. 219983. (4 Pages).

Notification of Refusal—Rule 18(2) of the Common Regulations Dated Jan. 22, 2024 From the Israel Patent Office (ILPO) Re. Application No. 70389. (6 Pages).

Notification of Refusal (Rule 18 of the Common Regulations Under the Hague Agreement/ 37 CFR 1.1063) Dated Sep. 28, 2024 From the US Patent and Trademark Office Re. U.S. Appl. No. 35/519,588. (27 Pages).

Notification of Refusal (to WIPO)—Pursuant to Article 12 of the Geneva Act and Rule 18(2) of the Common Regulations Under the 1999 Act and the 1960 Act of the Hague Agreement Dated Nov. 18, 2024 From the Geneva Act of the Hague Agreement Concerning the International Registration of Industrial Designs Re. Application No. 202460000072.7. (3 Pages).

Amazon "Plate Jigs 3D Printer: 5pcs Piece Pressed Aluminium Gear Aluminium Gear Clamp Leashes Timing Belt Clamp Aluminium Tooth Plate Jigs 3D Printer Timing Belt Accessoires Universal Tooth Board", Amazon, 5 P., Oct. 27, 2021.

Stevenson "The Science of 3D Printed Jigs & Fixtures", Fabbaloo, 6 P., Jan. 26, 2021.

Youtube "The Benefits of 3D Printing Jigs & Fixtures", Youtube, 1 P., Aug. 26, 2019.

International Preliminary Report on Patentability Dated Jul. 10, 2025 From the International Bureau of WIPO Re. Application No. PCT/IL2023/051334 (10 Pages).

International Preliminary Report on Patentability Dated Jul. 10, 2025 From the International Bureau of WIPO Re. Application No. PCT/IL2023/051335 (8 Pages).

International Preliminary Report on Patentability Dated Jul. 10, 2025 From the International Bureau of WIPO Re. Application No. PCT/IL2023/051336 (6 Pages).

10
36
38
40
12
340
50
φ
26
18
32
r
18
16
42
20
24

10
50
14
32
34
16
420
402
54
z
z
52
30
12
r
r

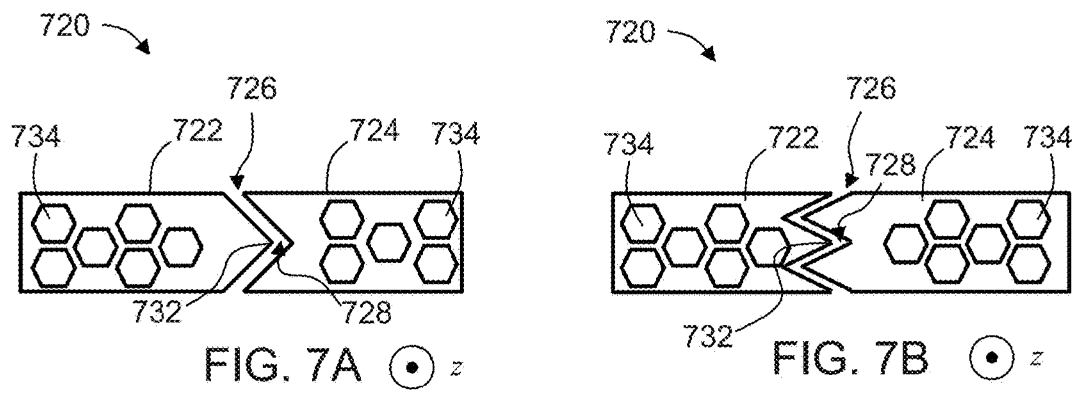
FIG. 7A z
FIG. 7B z
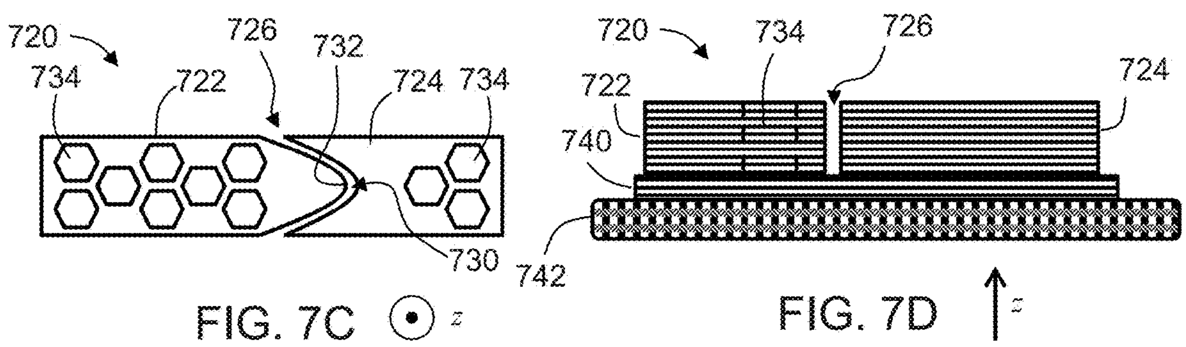
FIG. 7C z
FIG. 7D z
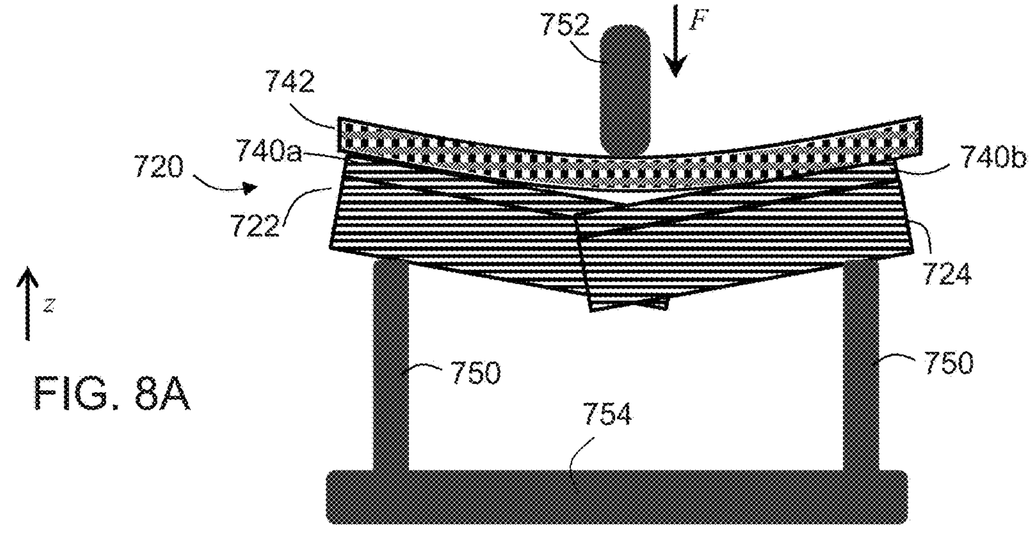
FIG. 8A

METHOD AND SYSTEM FOR THREE-DIMENSIONAL PRINTING ON FABRIC

RELATED APPLICATIONS

This application is a National Phase of PCT Patent Application No. PCT/IL2023/051334 having International filing date of Dec. 28, 2023, which claims the benefit of priority under 35 USC § 119(e) of U.S. Provisional Patent Application No. 63/436,181, filed on Dec. 30, 2022, the contents of which are incorporated herein by reference in their entirety.

PCT Patent Application No. PCT/IL2023/051334 is also related to U.S. Provisional Patent Application Nos. 63/436,172 and 63/436,186, both filed on Dec. 30, 2022. The contents of the above applications are all incorporated by reference as if fully set forth herein in their entirety.

PCT Patent Application No. PCT/IL2023/051334 is also related to International Design Application No. DM/227028, the contents of which are all incorporated by reference as if fully set forth herein in their entirety.

PCT Patent Application No. PCT/IL2023/051334 is also related to co-filed, co-pending, co-assigned PCT International Patent Application No. PCT/IL2023/051336_entitled "FORMULATIONS FOR THREE-DIMENSIONAL PRINTING ON FABRIC", which claims the benefit of priority under 35 USC § 119(e) of U.S. Provisional Patent Application No. 63/436,172.

PCT Patent Application No. PCT/IL2023/051334 is also related to co-filed, co-pending, co-assigned PCT International Patent Application No. PCT/IL2023/051335_entitled "ADHESIVE AND/OR COATING FORMULATIONS USABLE IN THREE-DIMENSIONAL PRINTING ON FABRIC", which claims the benefit of priority under 35 USC § 119(e) of U.S. Provisional Patent Application No. 63/436,186. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to a method and system for three-dimensional printing on fabric.

Additive manufacturing (AM) is a technology enabling fabrication of shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,979, 6,569,373, 6,658,314, 6,850,334, 6,863,859, 7,183,335, 7,209,797, 7,225,045, 7,300,619, 7,500,846, 9,031,680 and 9,227,365, U.S. Published application No. 20060054039, and International publication No. WO 2016/009426, all by the same Assignee, and being hereby incorporated by reference in their entirety.

SUMMARY OF THE INVENTION

According to an aspect of some embodiments of the present invention there is provided a method of forming an object on a fabric by three-dimensional printing. According to embodiments of the present invention, the method comprises: printing on the fabric an adhesion structure having a stack of layers in a configured pattern corresponding to a shape of a bottommost surface of the object, wherein for each layer of the stack the printing comprises dispensing and curing a first formulation along a scanning direction. According to embodiments of the present invention, the method also comprises printing the object onto the stack by dispensing and curing a building (e.g., modeling material) formulation in layers along the direction in configured patterns corresponding to shapes of slices of the object. According to various exemplary embodiments of the present invention, for each layer of the stack and each layer of the object (e.g., the modeling material formulation), the curing comprises irradiating the layer by creating a pattern of curing radiation having radiation intensity $I_A$ that scans the layer along the direction, wherein the pattern has a shape of a single stripe.

According to some embodiments of the invention the stack comprises from about 10 layers to about 30 layers.

According to an aspect of some embodiments of the present invention there is provided a method of forming an adhesion structure on a fabric by three-dimensional printing. According to embodiments of the present invention, the method comprises printing on the fabric a first stack of uncured layers in a configured pattern corresponding to a shape of a bottommost surface of an object, wherein for each layer of the stack the printing comprises dispensing a first formulation without curing the first formulation. The method also comprises printing on the first stack a second stack of layers, wherein for each layer of the second stack the printing comprises dispensing and curing the first formulation along a scanning direction, wherein the curing comprises irradiating the layer by creating a pattern of curing radiation having radiation intensity $I_B$ that scans the layer along the direction, wherein the pattern has a shape of at least two separated stripes.

According to some embodiments of the invention, the first stack comprises less than 5 layers. According to some embodiments of the invention the second stack comprises from about to about 30 layers.

According to some embodiments of the invention, the method comprises printing the object onto the second stack. According to some embodiments of the invention the object is printed by dispensing and curing a building (e.g., modeling material) formulation in layers along the direction in configured patterns corresponding to shapes of slices of the object. According to various exemplary embodiments of the invention, for each layer of the object, the curing comprises irradiating the layer by creating a pattern of curing radiation having radiation intensity $I_A$ that scans the layer along the direction, wherein the pattern has a shape of a single stripe, and wherein the intensity $I_B$ is about two times the intensity $I_A$.

According to an aspect of some embodiments of the present invention there is provided a method of forming an object on a fabric by three-dimensional printing. According to embodiments of the present invention, the method comprises: printing on the fabric an adhesion structure having a stack of layers in a configured pattern corresponding to a shape of a bottommost surface of an object, wherein for each layer of the second stack, the printing comprises dispensing and curing a first formulation along a scanning direction, wherein the curing comprises irradiating the layer by creating a pattern of curing radiation having radiation intensity $I_C$ that scans the layer along the direction, and wherein the pattern has a shape of at least two separated stripes. The method also comprises printing the object onto the stack by dispensing and curing a building formulation in layers along the direction in configured patterns corresponding to shapes of slices of the object, wherein for each layer of the object, the curing comprises irradiating the layer by creating a pattern of curing radiation having radiation intensity $I_A$ that scans the layer along the direction, wherein the pattern has a shape of a single stripe, and wherein the intensity $I_C$ is about four times the intensity $I_A$.

According to some embodiments of the invention, the stack comprises from about 10 to about 30 layers.

According to an aspect of some embodiments of the present invention there is provided a method of forming an adhesion structure on a fabric by three-dimensional printing. The method comprises obtaining a parameter describing the fabric, and selecting a printing protocol from the protocols described below based on the parameter.

According to some embodiments of the invention, the method comprises irradiating a topmost surface of the object by creating a pattern of curing radiation having radiation intensity $I_B$ that scans the topmost surface along the direction, wherein the pattern has a shape of at least two separated stripes and wherein the intensity $I_B$ is about two times the intensity $I_A$.

According to some embodiments of the invention the method comprises printing the first formulation also on an outer surface of the object to form a liquid coating, and irradiating the coating by the curing radiation to form a solidified coating. According to some embodiments of the invention the method comprises irradiating the coating by creating a pattern of curing radiation having radiation intensity $I_B$ that scans the topmost surface along the direction, wherein the pattern has a shape of at least two separated stripes and wherein the intensity $I_B$ is about two times the intensity $I_A$.

According to some embodiments of the invention the method comprises testing adherence level of the object to the fabric.

According to some embodiments of the invention the method is repeated for different orientations of the fabric on the same side thereof.

According to an aspect of some embodiments of the present invention there is provided a method of selecting a printing protocol for three-dimensional printing on a fabric. The method comprises executing the protocols described herein on different portions of the fabric, and testing adherence level of a respective object to each of the portions of the fabric. According to some embodiments of the invention the method is repeatedly executed for different orientations of the fabric on the same side, thereof.

According to some embodiments of the invention the method is repeated for different sides of the fabric.

According to some embodiments of the invention the object comprises two gap-separated stacks of modeling material layers, wherein a bending resistance is higher for the stacks of modeling material layers than for the adhesive material and the fabric.

According to some embodiments of the invention the testing comprises bending the fabric at the gap so as to detach at least one of the stacks of modeling material layers from the fabric at a detachment point bordering the gap.

According to some embodiments of the invention the gap has a piecewise linear shape, and the detachment point is near a breakpoint of the piecewise linear shape.

According to some embodiments of the invention the gap forms an acute angle at the breakpoint.

According to some embodiments of the invention the gap has a curved shape.

According to some embodiments of the invention a width of the gap is less than 1 mm.

According to some embodiments of the invention the gap-separated stacks form a three-dimensional structure having a planar aspect ratio of from about 1:3 to about 1:10.

According to some embodiments of the invention the thicknesses of the stacks of modeling material are larger than a thickness of the adhesion structure.

According to some embodiments of the invention the thicknesses of the stacks of modeling material are at least two times larger than the adhesion structure.

According to some embodiments of the invention the stacks of layers of the modeling material comprises a multiplicity of through holes defining open cells in the stacks.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A-D are schematic illustrations of a two-part structure suitable for testing adherence level of a substance to a fabric, according to some embodiments of the present invention;

FIGS. 8A and 8B are schematic illustrations of a procedure for bending the two-part structure, according to some embodiments of the present invention;

DESCRIPTION OF SPECIFIC EMBODIMENTS OF THE INVENTION

Figure 1A:
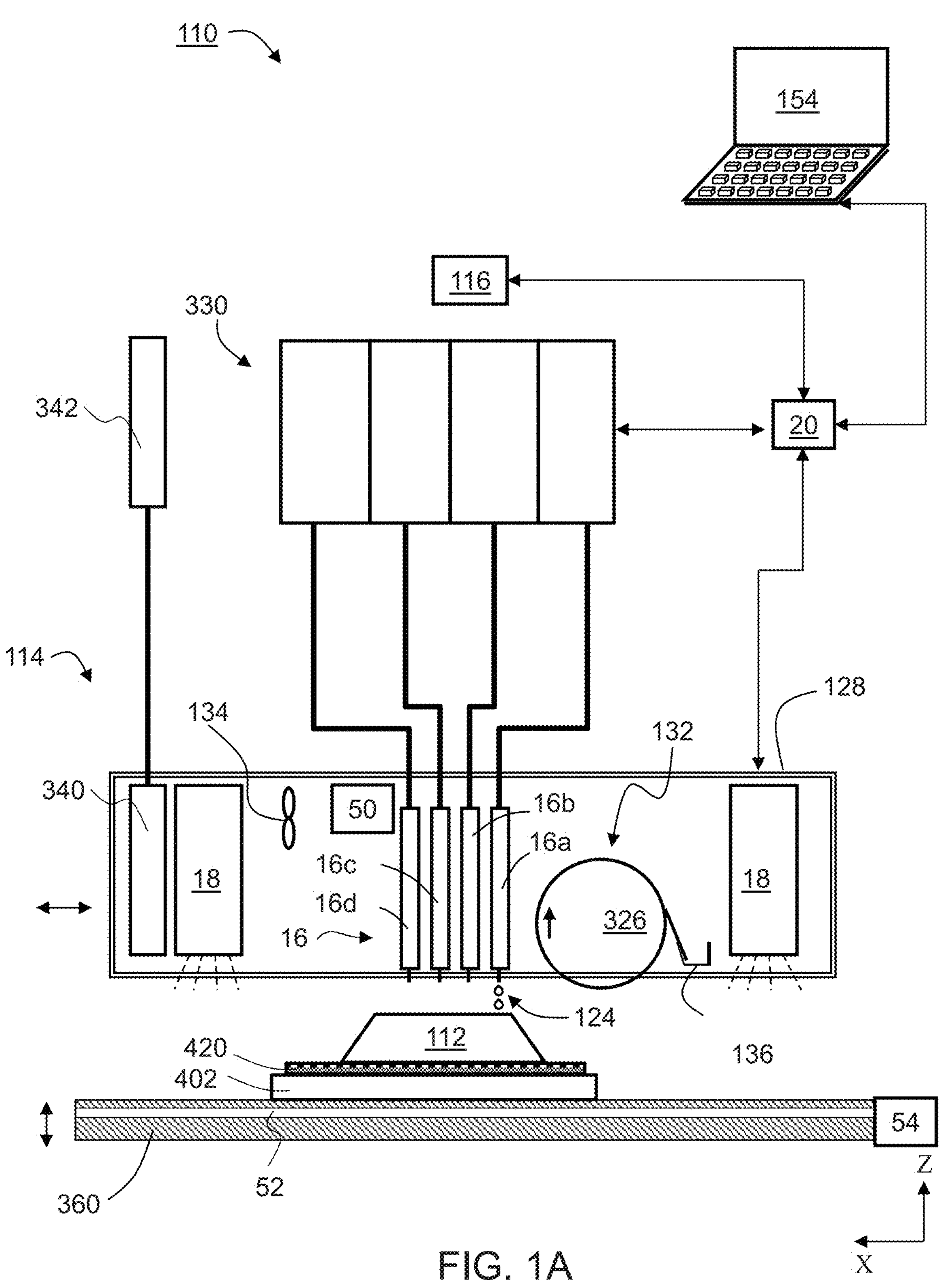
FIGS. 1A-D are schematic illustrations of an additive manufacturing system according to some embodiments of the invention.

The present invention, in some embodiments thereof, relates to three-dimensional printing and, more particularly, but not exclusively, to a method and system for printing objects on fabric.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a printing head having one or more arrays of nozzles to deposit building material in layers on a receiving surface. The AM apparatus thus dispenses building material in target locations which are to be occupied and leaves other target locations void. The apparatus typically includes a plurality of arrays of nozzles, each of which can be configured to dispense a different building material. This is typically achieved by providing the printing head with a plurality of fluid channels are separated from each other such that there is no fluid communication therebetween, wherein each channel receives a different building material through a separate inlet and conveys it to a different array of nozzles.

Thus, different target locations can be occupied by different building materials. The types of building materials can be categorized into two major categories: modeling material and support material. Typically, the building materials are solvent-free (e.g. do not contain water or any organic solvent) and/or are dispensed at a temperature above 40° C., above 50° C. or above 60° C. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different building (e.g., modeling) material formulations, each material from a different array of nozzles (belonging to the same or different printing heads) of the AM apparatus. In some embodiments, two or more such arrays of nozzles that dispense different building (e.g., modeling) material formulations are both located in the same printing head of the AM apparatus. In some embodiments, arrays of nozzles that dispense different building (e.g., modeling) formulations are located in separate printing heads, for example, a first array of nozzles dispensing a first building (e.g., modeling) formulation is located in a first printing head, and a second array of nozzles dispensing a second building (e.g., modeling) formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are located in separate printing heads.

Herein throughout, whenever a material or a formulation (building, modeling and/or support) is described in the context of being dispensed, it is meant to refer to a curable or uncured material or formulation, before being hardened or solidified (e.g., upon exposure to a curing condition), unless specifically indicated otherwise.

Figure 2A:
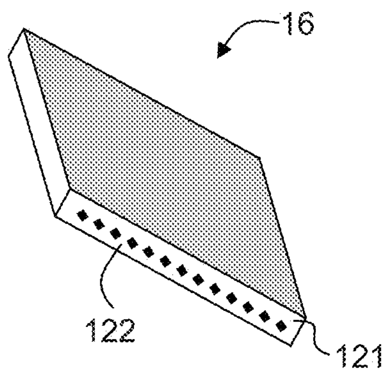
FIGS. 2A-2C are schematic illustrations of printing heads according to some embodiments of the present invention.
Figure 2B:
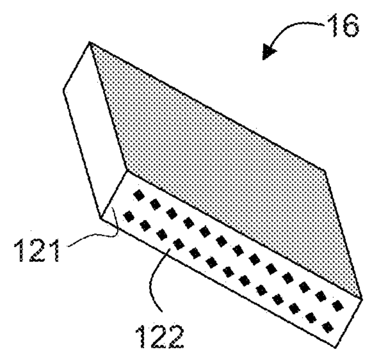
Figure 2C:
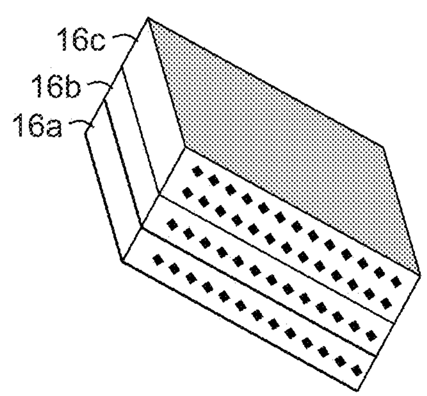

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid (uncured) building material 124 is dispensed.

Preferably, but not obligatorily, apparatus 114 is a three-dimensional printing apparatus, in which case the printing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each printing head is optionally and preferably fed via one or more building material reservoirs which may optionally include a temperature control unit (e.g., a temperature sensor and/or a heating device), and a material level sensor. To dispense the building material, a voltage signal is applied to the printing heads to selectively deposit droplets of material via the printing head nozzles, for example, as in piezoelectric inkjet printing technology. Another example includes thermal inkjet printing heads. In these types of heads, there are heater elements in thermal contact with the building material, for heating the building material to form gas bubbles therein, upon activation of the heater elements by a voltage signal. The gas bubbles generate pressures in the building material, causing droplets of building material to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four printing heads 16*a*, 16*b*, 16*c* and 16*d* are illustrated. Each of heads 16*a*, 16*b*, 16*c* and 16*d* has a nozzle array. In this Example, heads 16*a* and 16*b* can be designated for modeling material/s and heads 16*c* and 16*d* can be designated for support material. Thus, head 16*a* can dispense one modeling material, head 16*b* can dispense another modeling material and heads 16*c* and 16*d* can both dispense support material. In an alternative embodiment, heads 16*c* and 16*d*, for example, may be combined in a single head having two nozzle arrays for depositing support material. In a further alternative embodiment, any one or more of the printing heads may have more than one nozzle arrays for depositing more than one material, e.g. two nozzle arrays for depositing two different modeling materials or a modeling material and a support material, each formulation via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material, the number of arrays of nozzles that dispense support material, and the number of nozzles in each respective array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein throughout the term "about" refers to ±10% or ±5%.

For example, for a=1, the overall dispensing rate of support material is generally the same as the overall dispensing rate of the modeling material when all the arrays of nozzles operate.

Apparatus 114 can comprise, for example, M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a solidifying device 18 which can include any device configured to emit light, heat or the like that may cause the deposited material to harden. For example, solidifying device 18 can comprise one or more radiation sources, which can be, for example, an ultraviolet or visible or infrared lamp, or other sources of electromagnetic radiation, or electron beam source, depending on the modeling material being used. In some embodiments of the present invention, solidifying device 18 serves for curing or solidifying the modeling material. Preferably, as illustrated in FIG. 1A, there are two solidifying device 18 at both sides of the dispensing heads 16, so that during operation of both devices 18 one provides radiation to locations immediately before the material is dispensed to these locations, and one provides radiation to locations immediately after the material is dispensed to these locations. Devices 18 are preferably configured to operate independently, both from the standpoint of timing and from the stand point of radiation intensity. Yet, by controlling their independent operations, a synchronized radiation protocol can be achieved, as further explained hereinunder.

In some embodiments of the present invention apparatus 114 comprises cooling system 134 such as one or more fans or the like.

The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the materials just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 32, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In the schematic illustrations of FIG. 1A, the edge(s) of tray 360 are provided with straight corners. However, this need not necessarily be the case, since, for some applications, particularly when tray 360 is in contact with a fabric on which the object is printed, it may be desired for the edge(s) of the top surface of tray 360 to be formed as a fillet and/or a chamfer (see chamfer 411 in FIGS. 4E and 4F).

In use, the printing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the printing heads of unit 16 is followed by the curing of the modeling material(s) by radiation source 126. In the reverse passage of the heads, back to their starting point for the layer just deposited, an Additional dispensing of building material may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a supply system 330 which comprises the building material containers or cartridges and supplies a plurality of building materials to fabrication apparatus 114.

A controller 20 controls fabrication apparatus 114 and optionally and preferably also supply system 330. Controller 20 typically includes an electronic circuit configured to perform the controlling operations. Controller 20 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, controller 20 controls the voltage applied to each printing head or each nozzle array and the temperature of the building material in the respective printing head or respective nozzle array.

Once the manufacturing data is loaded to controller 20 it can operate without user intervention. In some embodiments, controller 20 receives additional input from the operator, e.g., using data processor 154 or using a user interface 116 communicating with controller 20. User interface 116 can be of any type known in the art, such as, but not limited to, a keyboard, a touch screen and the like. For example, controller 20 can receive, as additional input, one or more building material types and/or attributes, such as, but not limited to, color, characteristic distortion and/or transition temperature, viscosity, electrical property, magnetic property. Other attributes and groups of attributes are also contemplated.

Figures 1B, 1C:
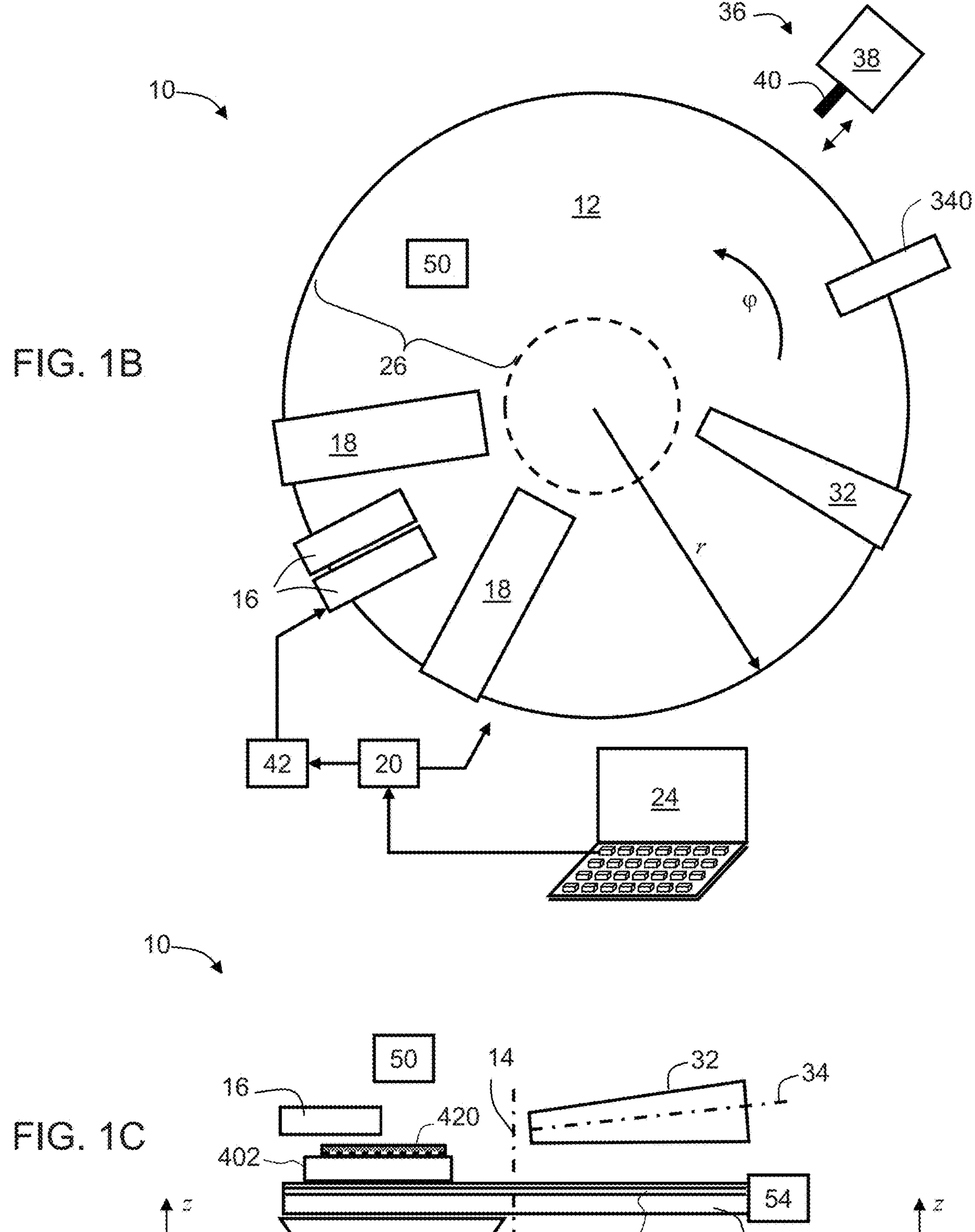
Figure 1D:
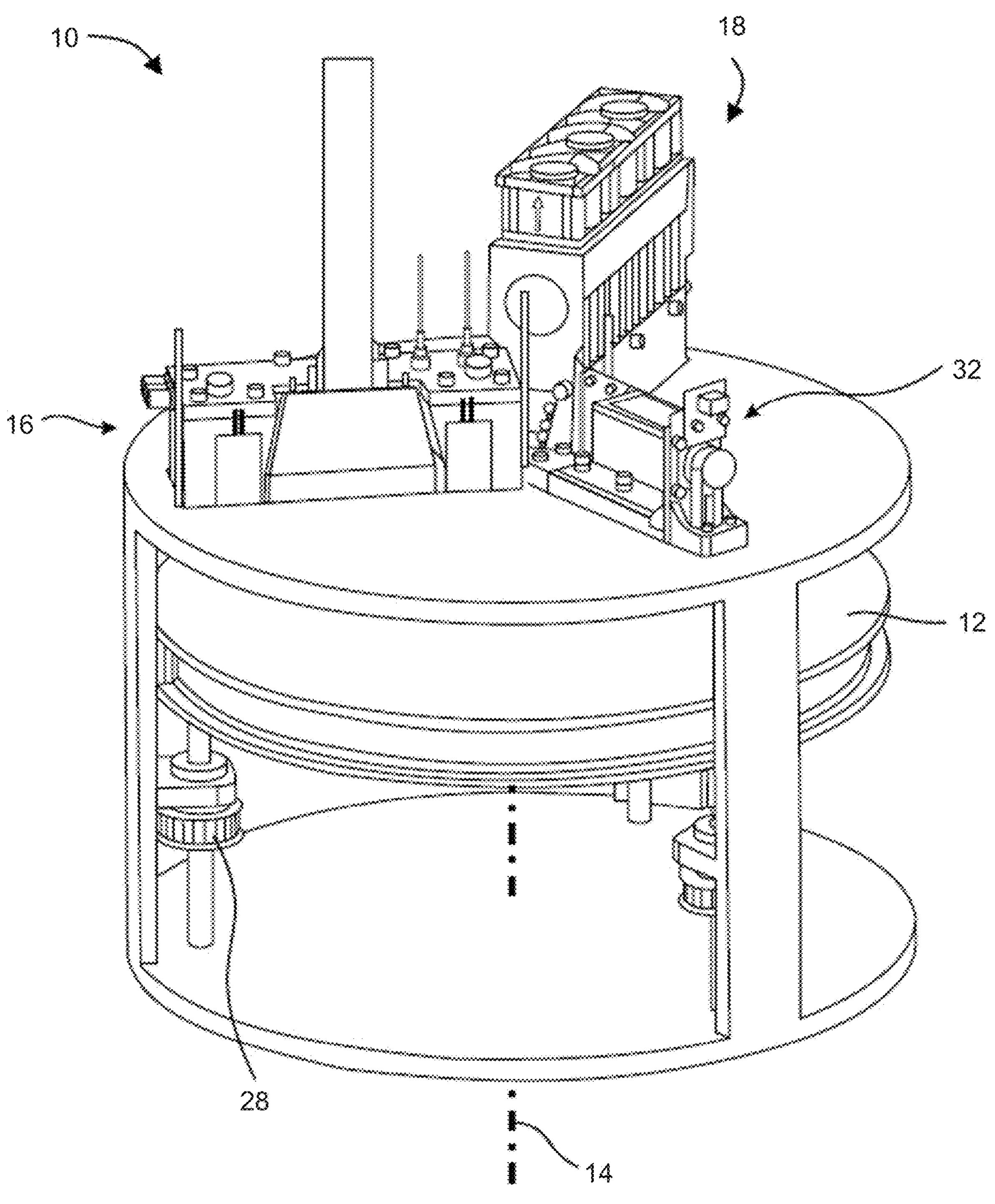

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 42. Tray 12 can have a shape of a disk or it can be annular. Non-round shapes are also contemplated, provided they can be rotated about a vertical axis. In the schematic illustrations of FIG. 1C, the edge(s) of tray 12 are provided with straight corners. However, as in the case of tray 360 above, for some applications, particularly when tray 12 is in contact with a fabric on which the object is printed, it may be desired for the edge(s) of the top surface of tray 12 to be formed as a fillet and/or a chamfer.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The radial direction r in system 10 enacts the indexing direction y in system 110, and the azimuthal direction φ enacts the scanning direction x in system 110. Therefore, the radial direction is interchangeably referred to herein as the indexing direction, and the azimuthal direction is interchangeably referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material, or at least two arrays of the same head can be fed with different building materials.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16*a*, 16*b*, 16*c* is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
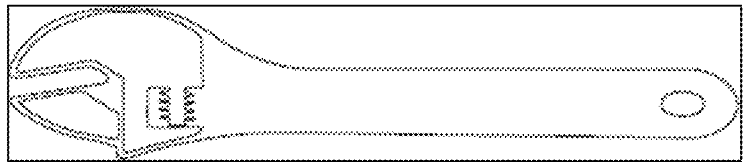
FIGS. 3A and 3B are schematic illustrations demonstrating coordinate transformations according to some embodiments of the present invention.
Figure 3B:
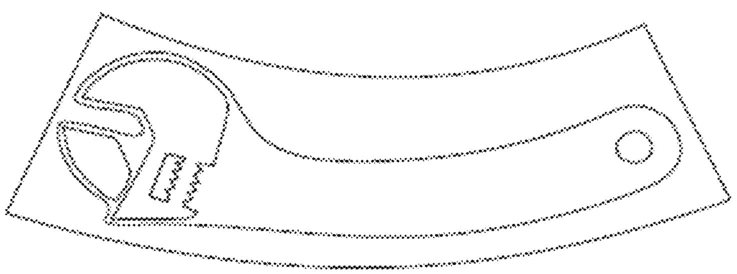

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more solidifying devices 18, which can include, for example, one or more radiation sources, such as, but not limited to, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of solidifying device 18 is controlled by controller 20 which may activate and deactivate solidifying device 18 and may optionally also control the amount of radiation generated by solidifying device 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Figure 1E:
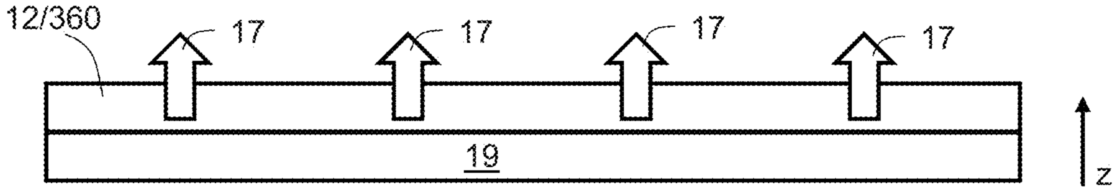
FIGS. 1E-G are schematic illustrations of a work tray for an additive manufacturing system in embodiments of the invention in which the work tray comprises or is associated with a radiation source.
Figure 1F:
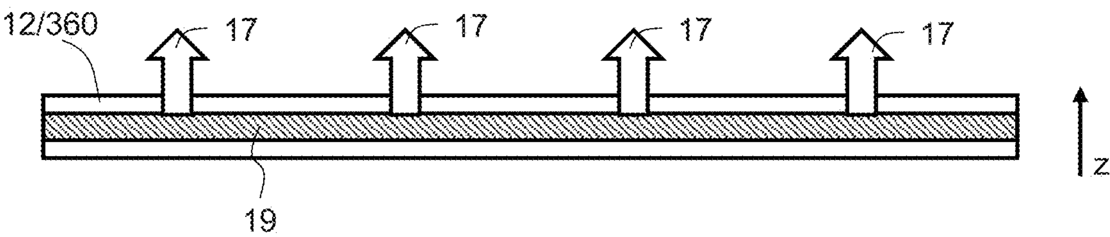
Figure 1G:
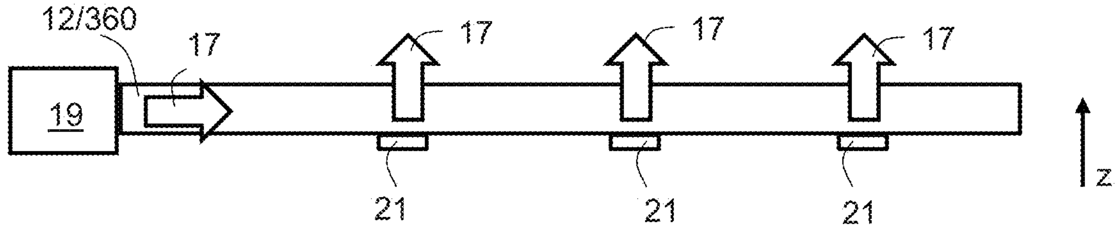

FIGS. 1E-G are schematic illustrations of work tray 12/360 in embodiments of the invention in which the work tray comprises or is associated with a radiation source 19 that emits radiation 17 to irradiate the building material from below. Radiation source 19 can emit any type of radiation 17, including, without limitation, electromagnetic radiation (e.g., ultraviolet, visible, infrared, etc.), electron beam radiation, or the like, depending on the modeling material being used. The radiation 17 emitted by radiation source 19 serves for solidifying the building material from below. Radiation source 19 can comprise any device capable of emitting radiation 17, such as, but not limited to, one or more LEDs, a digital light projector (DLP), a laser device, electron beam source, or the like. Radiation source 19 can be controlled by controller 20 which may activate and deactivate it and may optionally also control the amount and/or cross-sectional area of radiation 17.

In the schematic illustration of FIG. 1E, radiation source 19 is below the work tray, in which case work tray 12/360 is preferably transparent to the radiation 17 emitted by source 19. In the schematic illustration of FIG. 1F, radiation source 19 is embedded within tray 12/360, in which case the parts of the work tray that are above source 19 are transparent to radiation 17. In the schematic illustration of FIG. 1G, radiation source 19 is mounted at the side of tray 12/360, in which case radiation 17 is coupled into tray 12/360 and guided within tray 12/360 until it exits upwards. Radiation 17 can be guided by the material of work tray 12/360 (e.g., by means of total internal reflection) and exit upwards by redirection elements 21 (e.g., mirrors or diffraction gratings). Radiation 17 can be guided by one or more waveguides (not shown) embedded in the work tray 12/360.

In some embodiments, radiation source 19 is activated by controller 20 only when the bottommost layer(s) of building materials are dispensed (e.g., the first 1, 2, 3, 4 or 5 layers), and deactivated thereafter. Alternatively, the building material dispensed to form the bottommost layers can be transparent to radiation 17, to allow radiation 17 to penetrate through the bottommost layers and solidify the layers above them. Some embodiments contemplate selecting for the bottommost layer(s) building materials that absorb radiation 17, so as to mask the layers above them from radiation 17.

In some embodiments, radiation source 19 is activated in a spatially-selective manner, wherein some regions over the tray emit radiations and other regions do not emit radiation. For example, radiation source 19 is activated in a spatially-selective manner, only regions on the work tray above which the building material has been dispensed irradiate. Spatially-selective irradiation can be achieved, for example, by providing radiation source 19 as a LED array, and activating the individual LEDs selectively.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials may be formed.

In some embodiments of the present invention the system dispenses digital material for at least one of the layers.

The phrase "digital materials", as used herein and in the art, describes a combination of two or more materials on a pixel level or voxel level such that pixels or voxels of different materials are interlaced with one another over a region. Such digital materials may exhibit new properties that are affected by the selection of types of materials and/or the ratio and relative spatial distribution of two or more materials.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

In the context of a digital material, the interlacing can be either among single voxels, each containing a different building material, or among blocks of voxels wherein a block of voxels is defined as a continues region that is occupied by n voxels all containing the same building material, and wherein the border of this region is define as a collection of voxels that are adjacent to at least one voxel that contains a building material other than the building material contained in the voxels of the collection. In preferred embodiments, n is less than 1000, or less than 500, or less than 100, or less than 50, or less than 10.

In exemplary digital materials, the modeling material of each voxel or voxel block, obtained upon curing, is independent of the modeling material of a neighboring voxel or voxel block, obtained upon curing, such that each voxel or voxel block may result in a different modeling material and the new properties of the whole part are a result of a spatial combination, on the voxel level, of several different model materials.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published application No. 20100191360, the contents of which are hereby incorporated by reference.

In some embodiments of the present invention system 10 and/or system 110 are configured for printing one or more objects on a fabric.

As used herein "fabric" encompasses any article of manufacture that is made at least partially of a natural or man-made fibrous material. Examples of types of fabric include, but are not limited to: clothes, shoes, toys, fabric articles, carpets, cloth hats, cloth bags, socks, towels, draperies, etc.

The present embodiments contemplate printing on woven or non-woven fabrics.

As used herein, "woven" means a structure produced when at least two sets of strands are interlaced, e.g., at right angles to each other, according to a predetermined pattern of interlacing, and such that at least one set is parallel to the axis along the lengthwise direction of the fabric, in accordance with ASTM D123-03.

As used herein, the term "nonwoven" means a textile structure produced by bonding or interlocking of fibers, or both, accomplished by mechanical, chemical, thermal, or solvent means and combinations in accordance with ASTM D123-03.

Preferably, but not necessarily, when the printing system (e.g., system 10 or 110) is employed for printing an object on a fabric, leveling device 32 is not used or used only after the object reaches a predetermined height above the fabric.

Preferably, but not necessarily, when the printing system (e.g., system 10 or 110) is employed for printing an object on a fabric the height of the printed objects is below 10 cm, more preferably below 9 cm, more preferably below 8 cm, more preferably below 8 cm, more preferably below 7 cm, more preferably below 6 cm, more preferably below 5 cm, more preferably below 4 cm, more preferably below 3 cm, more preferably below 2 cm, more preferably below 1 cm.

In some embodiments of the present invention the work tray of the system (e.g., tray 12 or 360) has reflectivity of at least 50% or at least 60% or at least 70% or at least 80% or more to radiation emitted by the radiation source of solidifying device 18. The advantage of making the work tray reflective or partially reflective is that the reflected radiation arriving to the fabric from below can solidify building material that is below the fabric and can also penetrate the pores of the fabric and solidify droplets of building material within these pores, thereby improving the adherence of the printed object to the fabric.

The present embodiments also contemplate providing the work tray with one or more fluid channels 52. A fluid delivery system 54 can generates a flow of fluid within fluid channel 52. The fluid is optionally and preferably can be at a controlled temperature, thereby controlling the temperature of the work tray. When fluid delivery system 54 generates a flow of fluid that is at a temperature that is less than the temperature of the dispensed building material, the fluid absorbs heat from the building material. Fluid delivery system 54 can also generate a flow of fluid that is at an elevated temperature relative to the fabric, facilitating straightening wrinkles in the fabric before dispensing the building materials on the fabric. The present inventors also contemplate combination of these embodiments, wherein the fluid is at an elevated temperature before dispensing the building materials and at a reduced temperature during the fabrication of the object. The fluid can be in a gaseous or liquid phase (e.g., air, helium, water, oil or the like). Preferably, fluid delivery system 54 is controlled by controller 20.

In some embodiments of the present invention system 10 and/or 110 comprise a jig 402 configured for affixing a fabric 420 to a predetermined location on the work tray of the system (e.g., tray 12 or 360), and also at a predetermined orientation relative to the nozzle arrays (e.g., arrays 122) of the system. In some embodiments of the present invention jig 402 is also configured for stretching fabric 420.

Figure 4A:
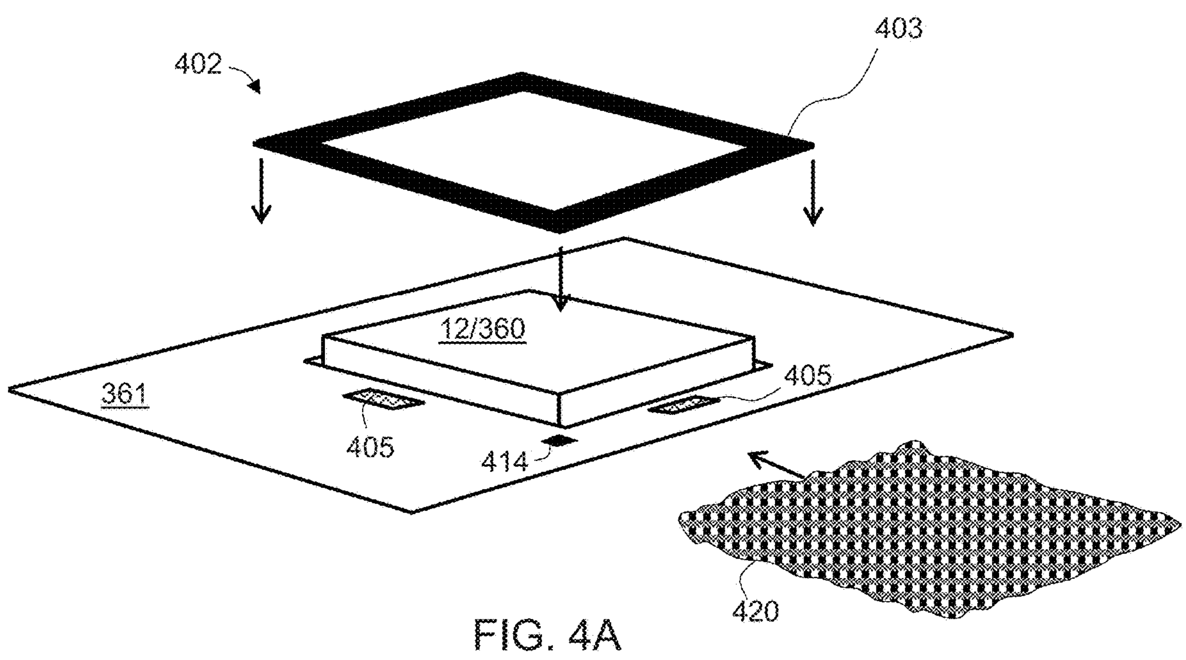
FIGS. 4A-F are schematic illustrations of a jig suitable for some embodiments of the present invention.
Figure 4B:
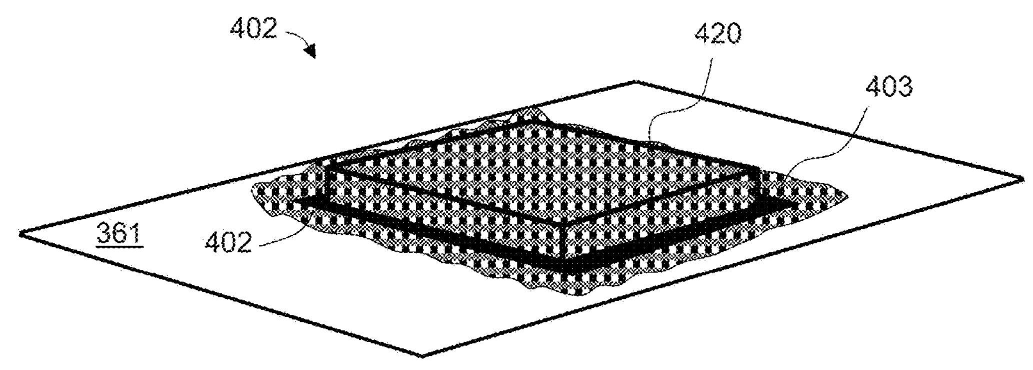

Jig 402 is illustrated in greater detail in FIGS. 4A-F. FIGS. 4A and 4B illustrate an embodiment in which jig 402 comprises a frame 403 and one or more magnetic or metallic elements 405, wherein elements 405 are attached, preferably permanently, to tray 12/360 or adjacent thereto, e.g., onto a static platform 361 surrounding tray 12/360, and wherein at least one of tray 12/360 and elements 405 comprises a permanent magnet to ensure mutual magnetic attraction between elements 405 and frame 403. Frame 403 can be made magnetic or metallic in its entirety, or it can include metallic or magnetic elements (not shown, see FIGS. 4E and 4F) on its periphery, at lateral locations that match the locations of elements 405. FIG. 4A illustrates jig 402 in its opened state, before fabric 420 is placed on the work tray 12/360, and FIG. 4B illustrates jig 402 in its closed state wherein frame 403 is magnetically attached to elements 405 (not shown in FIG. 4B), affixing and optionally and preferably stretching fabric 420 onto work tray 12/360. Jig 402 can also comprise a pair of frames 403 magnetically attachable to each other, in which case the fabric 420 is stretched between the frames of jig 402 before it is placed on work tray 12/360. In these embodiments, elements 405 are not necessary.

Figure 4C:
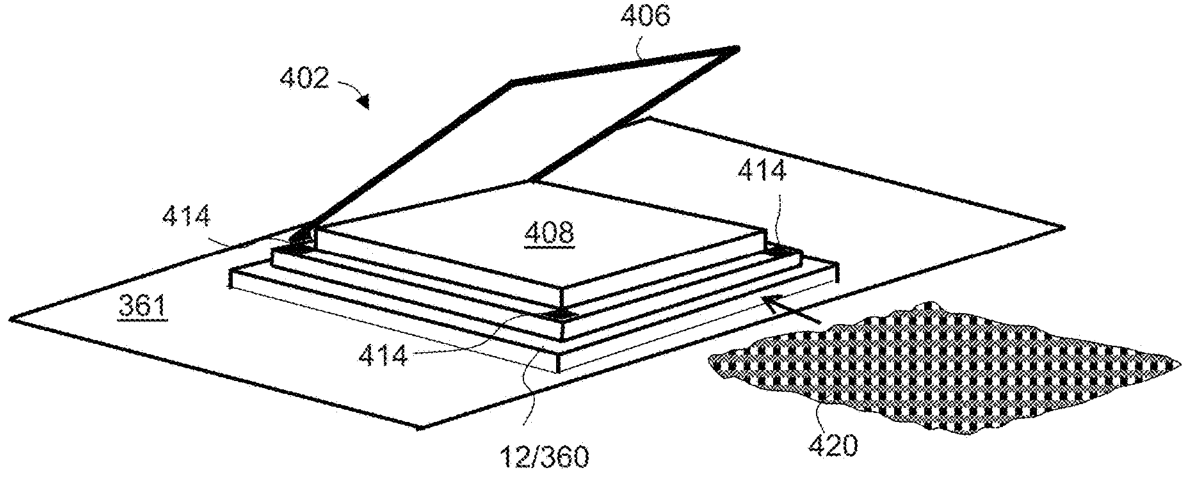
Figure 4D:
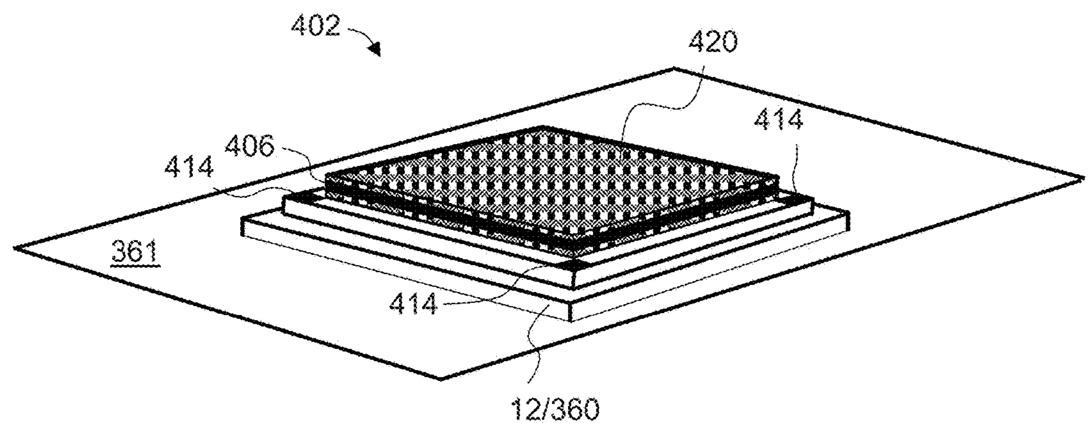
Figure 4E:
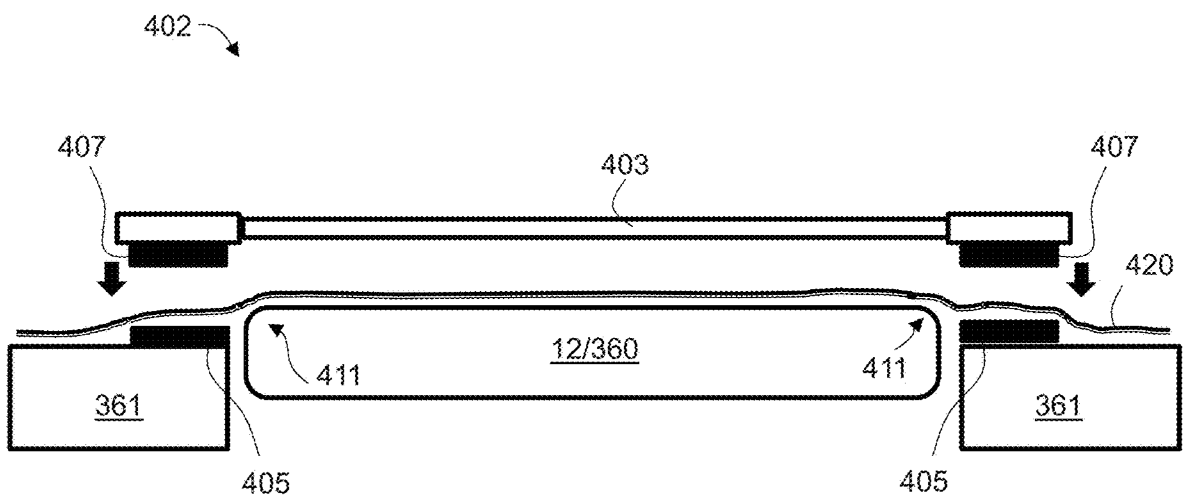
Figure 4F:
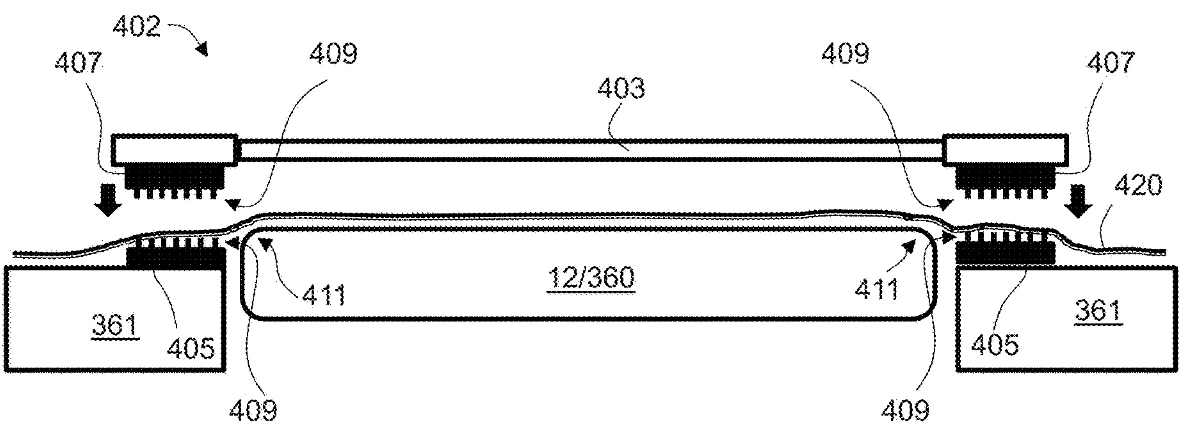

FIGS. 4E and 4F illustrate a side view of jig 402. In the illustrated embodiment, frame 403 is provided with magnetic or metallic elements 407 mounted on its periphery, at lateral locations that match the locations of elements 405. Elements 407 and 405 can be flat, as illustrated in FIG. 4E, or they can comprise protruding elements 409 or a rough surface, as illustrated in FIG. 4F. The protruding elements or rough surface can be on the metallic or magnetic elements mounted on frame 403, on platform 361, or on both frame 403 and platform 361. When frame 403 is metallic or magnetic in its entirety, and there are no additional metallic or magnetic elements 407 mounted thereon, the protruding elements 409 or a rough surface can be formed on frame 403 at lateral locations that match the locations of elements 405.

FIGS. 4C and 4D illustrate an embodiment in which jig 402 comprises a rotatable frame 406 and a planar fabric holder 408 wherein frame 406 is sized and shaped such that once frame 406 is rotated to engage the plane of fabric holder 408, frame 406 surrounds fabric holder 408 and traps fabric 420 between frame 406 and fabric holder 408. Fabric holder 408 can be in the form of a continuous surface or a frame. When fabric holder 408 is a continuous surface, fabric 420, once placed and optionally and preferably stretched on fabric holder 408, can be accessed only from one side of fabric 420 (typically from above). When fabric holder 408 is shaped as a frame, fabric 420, once placed and optionally and preferably stretched on fabric holder 408, can be accessed from both sides of fabric 420. FIG. 4C illustrates jig 402 in its opened state, ready to receive fabric 420, and FIG. 4D illustrates jig 402 in its closed state affixing fabric 420 to tray 12/360.

The advantage of having a jig which also comprises planar fabric holder 408 is that it allows jig 402 to receive fabric 420 either while jig 402 is placed on work tray 12/360, or before jig 402 is placed on work tray 12/360.

Figure 5A:
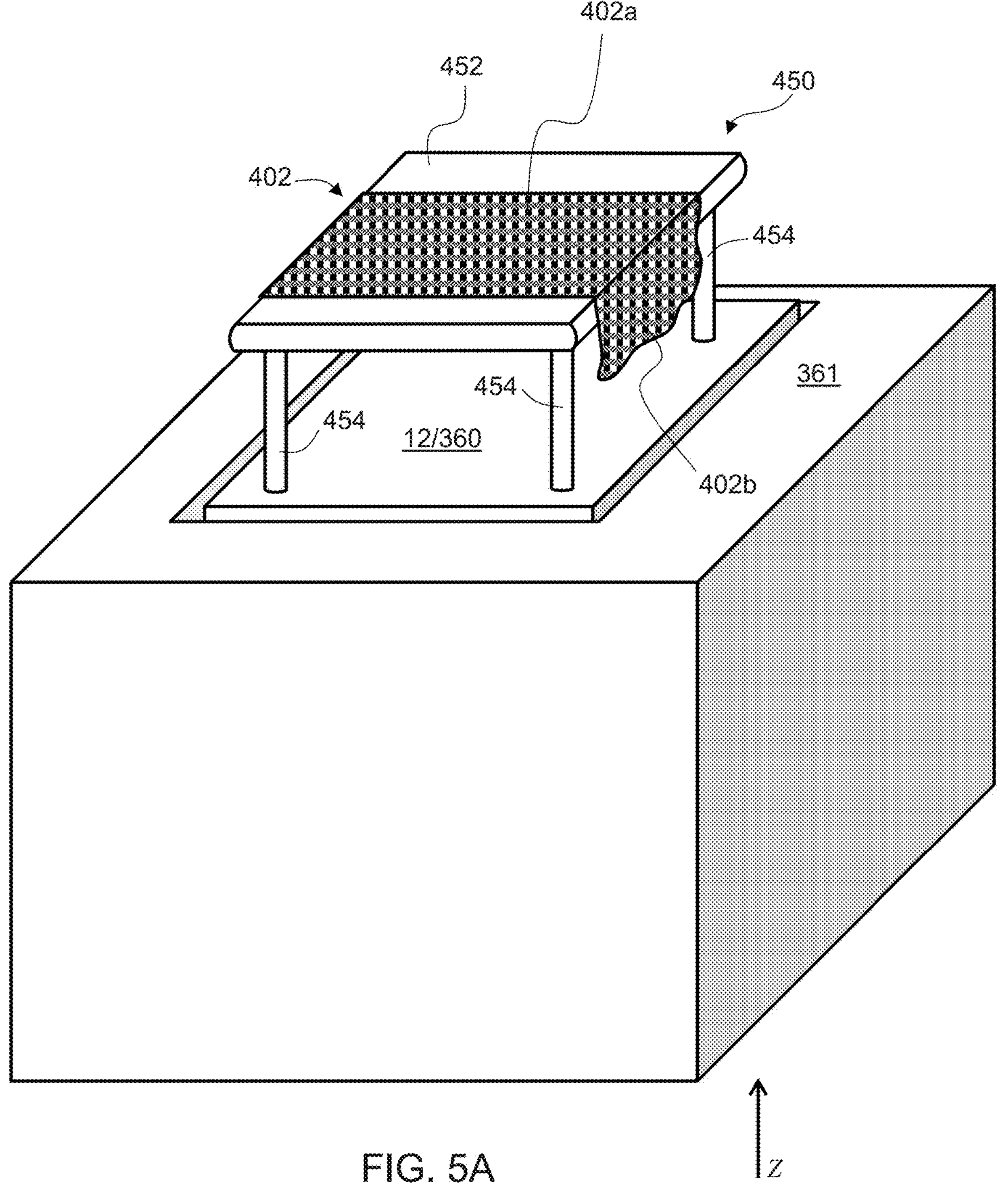
FIGS. 5A-C are schematic illustrations of a configuration in which a fabric is placed on a ramp structure, according to some embodiments of the present invention.
Figure 5B:
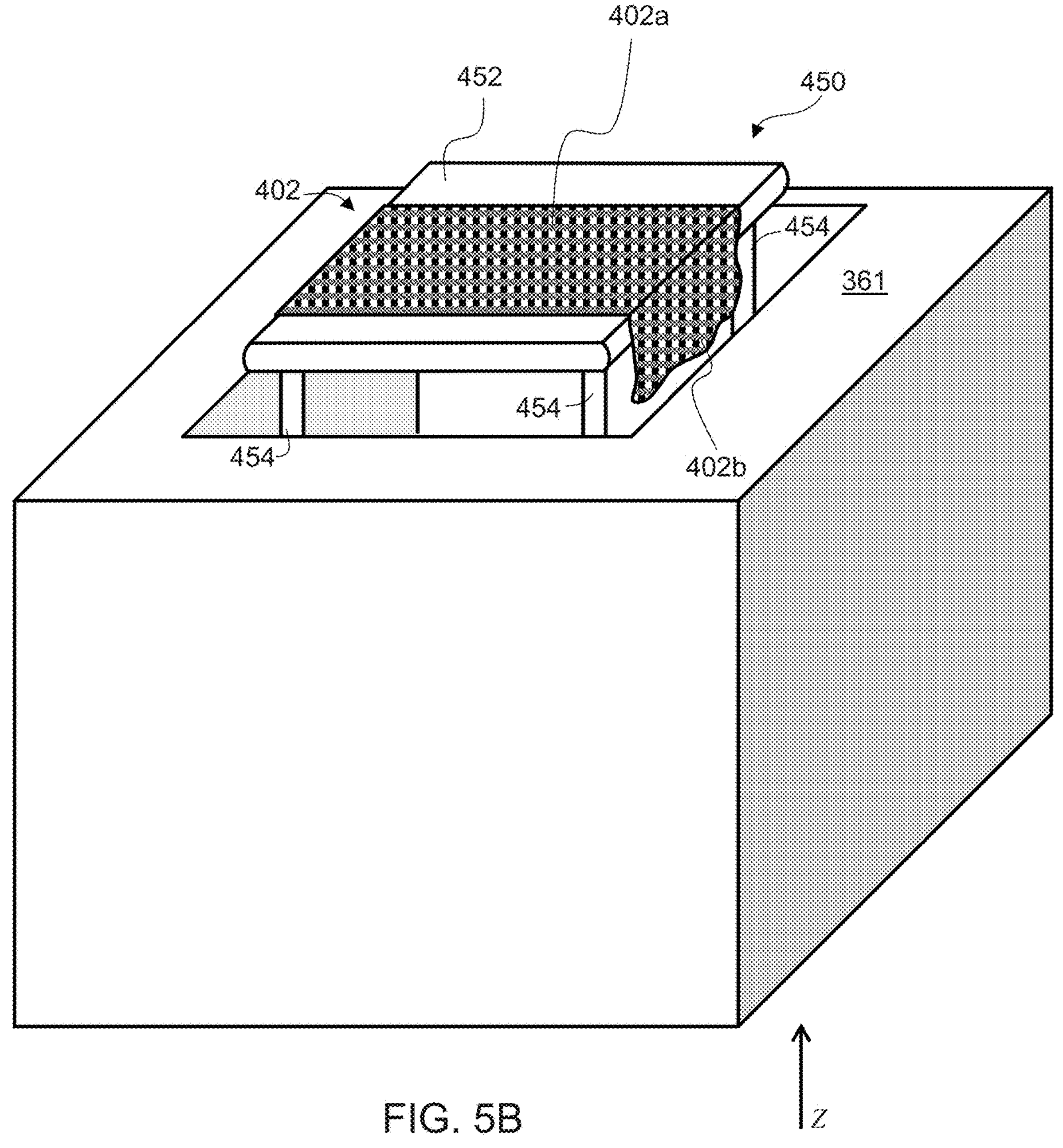
Figure 5C:
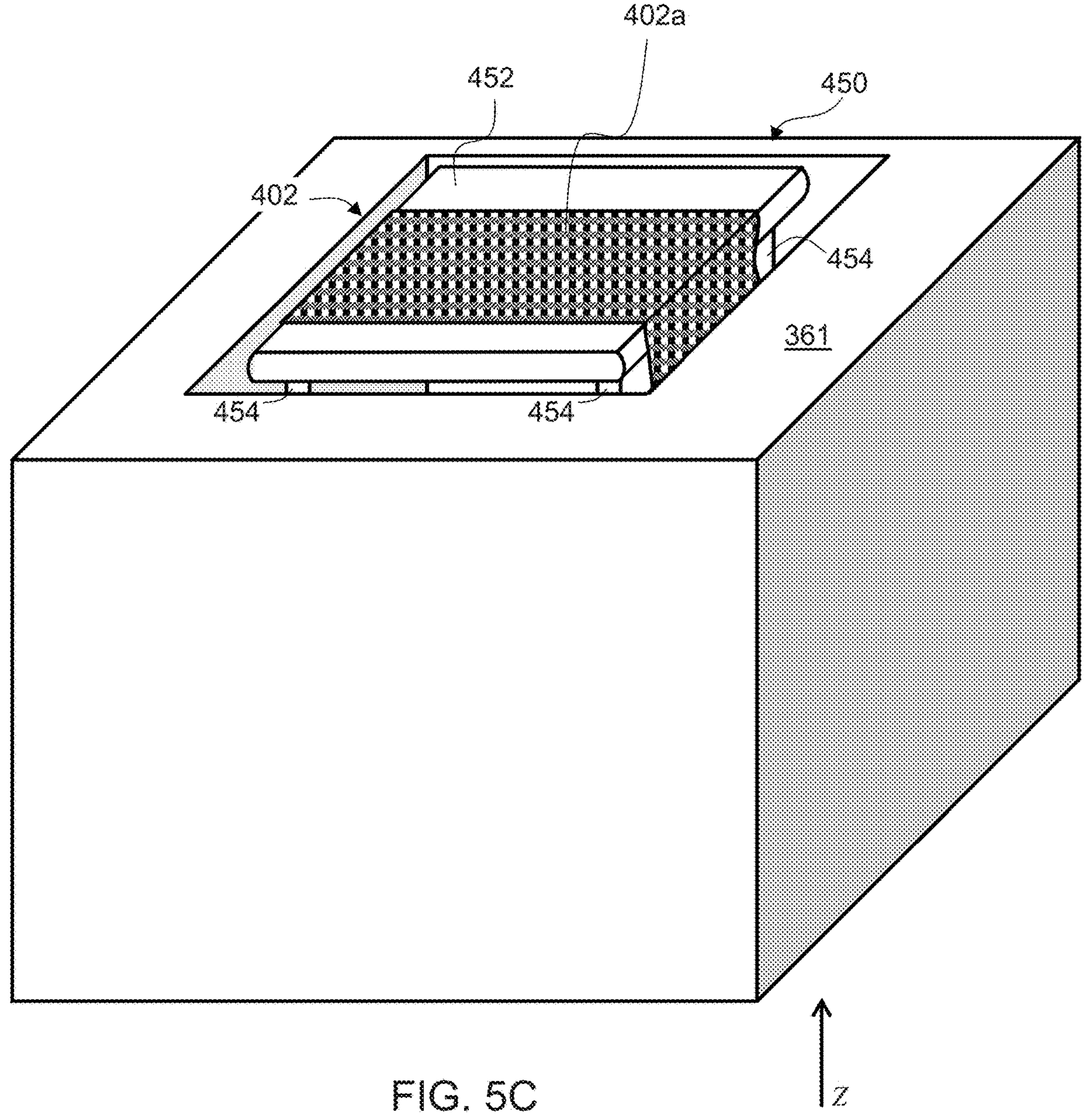

FIGS. 5A-C are schematic illustrations of a configuration in which fabric 420*a* is placed on a ramp structure 450 which includes a planar ramp 452 and one or more spacer beams 454 keeping ramp 452 spaced apart vertically from the work tray 12/360. Ramp structure 450 can be placed on tray 12/360, or connected to the tray 12/360 by connectors (not shown), such as, but not limited to, snap connectors. When ramp structure 450 is connected to the tray, the connectors are preferably outside the printing area of the AM system, so as not to interfere with the printing process when the AM system is operated without ramp 450. Fabric 420 can be affixed using any of the techniques described above except that the fabric is affixed to ramp structure 450 rather than to tray 12/360.

The advantage of using ramp structure 450 is that it allows printing a three-dimensional object on a fabric that is larger than the work tray. In use, fabric 420 is affixed to the upper surface of ramp 452. When the size of fabric 420 is larger than the size of ramp structure, fabric 420 is folded over the edge of ramp structure 450, so that a horizontal portion 420*a* of fabric 420 is supported by the upper surface of ramp 452 and a hanging portion 420*b* of fabric 420 is folded into a space below ramp 452 but above work tray 12/360, as illustrated in FIG. 5A. Preferably, fabric 420 is affixed to ramp structure 450 before placing on work tray 12/360 or connecting it thereto, but embodiments in which fabric 420 is affixed to ramp 452, while ramp structure 450 is on work tray 12/360, are also contemplated.

Once fabric 420 is affixed to work tray 12/360 (FIG. 4A-F) or ramp 452 (FIG. 5A-C), the computerized controller 20 (FIGS. 1A and 1B) operates the array(s) of nozzles 122 (FIGS. 2A-C) to dispense building material(s) in a configured pattern corresponding to a shape of an object on the affixed fabric 420. In embodiments in which ramp structure 450 is employed the computerized controller 20 controls the array(s) of nozzles 122 to terminate any dispensing when the nozzles are above the gap between ramp structure 450 and platform 361, thereby ensuring that the droplets of building material(s) land only on the horizontal portion 402*a* of fabric 420.

It is appreciated that when ramp structure 450 is employed, the vertical position of ramp 452 along the Z direction is higher than that of work tray 12/360. In this case, the computerized controller 20 adjusts the vertical position of work tray 12/360 so as to compensate for the height of ramp structure 452 above work tray work tray 12/360. The adjustment process is illustrated in FIGS. 5A-C. The initial vertical position of work tray 12/360 is preferably selected such that the upper surface of ramp 452 is at the vertical position that work tray 12/360 would have had, had ramp structure not have been employed. For example, as illustrated in FIG. 5C, the initial vertical position of work tray 12/360 can be selected such that the upper surface of ramp 452 is at the same vertical position as the upper surface of platform 361. Once the initial vertical position is adjusted the printing process continues in layers as further detailed hereinabove, wherein once the layer is completed, work tray 12/360 is lowered in the Z direction, according to the desired thickness of the subsequent layer.

With reference to FIGS. 1A-C, system 10 and 110 optionally and preferably comprises a position tracking system 50. In some embodiments of the present invention position tracking system 50 is configured for determining a position of jig 402 relative to work tray 12 or 360, once jig 402 is placed on the tray. Position tracking system 50 can include, for example, an optical scanner, an imaging device, a magnetic sensor, and/or a radiofrequency sensor. Computerized controller 20 receives position tracking signals from system 50 and executes a registration procedure based on the position tracking signals, and operates nozzle array 122 responsively to the registration. The advantage of this embodiment is that it does not require accurate positioning of jig 402 on the tray, since the registration procedure performed by controller 20 ensures that the nozzles are activated to dispense the building materials at the appropriate locations on fabric 420.

Position tracking system 50 can determine the position of jig 402 in more than one way. In some embodiments of the present invention, system 50 captures an image of the tray or a portion thereof (e.g., when system 50 comprises a pixelated imager or an optical scanner) and executes an image processing procedure to identify the location of jig 402 relative to the tray. In some embodiments of the present invention position tracking system 50 can determine the position of jig 402 using marks 414, which can be formed or attached, for example, to the frame 406 of jig 402, or, as illustrated in FIGS. 4A, 4C and 4D, on fabric holder 408, or, on the work tray, or, as illustrated in FIG. 4A on static platform 361. The marks 414 are identifiable by position tracking system 50 and are used by system 50 for determining the position of jig 402. For example, when system 50 comprises an optical scanner or an imager, marks 414 can be a printed pattern, such as, but not limited to, a barcode, or a source of optical signal, e.g., a light emitting diode emitting radiation that does not solidify the building materials dispensed by the nozzle arrays. When system 50 comprises a magnetic or radiofrequency sensor, marks can comprise a source of radiofrequency or magnetic field, such as, but not limited to, a miniature coil or the like.

The present disclosure also contemplates embodiments in which position tracking system 50 is used to identify patterns (e.g., printed patterns, weaving pattern, knitted pattern) on fabric 420 itself. In these embodiments, it is not necessary for tracking system 50 to be used for determining the position of the jig 402 (although such determination is also contemplated in some embodiments) since controller 20 can execute the registration procedure based on the identified patterns on fabric 420.

The fabrication process of three-dimensional objects on fabric 420 may optionally and preferably include use of one or more liquid formulations other than a building material for three-dimensional printing. The liquid formulations can be curable or non-curable. The liquid formulations are also referred to herein interchangeable as "liquid additives" or as "additive formulations" or as "liquid additive formulations". Liquid additive formulations can be deposited on the fabric by the dispensing heads of system 10 or 110. Also contemplated, are embodiments in which the liquid formulations are deposited by additive dispensing system 340 (see FIGS. 1A and 1B), which is in fluid communication with a container 342 containing the liquid formulation (shown only in FIG. 1A), and which can be controlled by the controller 20. In some embodiments of the present invention, one or more additive formulation(s) is/are applied by directing an aerosol or mist of the liquid additive to the fabric. In these embodiments, the system 340 is in the form of an aerosol dispenser or a sprinkler for generating the aerosol or mist of the liquid additive and directing it to the fabric. In some embodiments of the present invention, one or more liquid additives is applied by depositing droplets of the additive at discrete addressable locations on the fabric. In these embodiments, one or more of the printing heads 16 can be configured to dispense the respective additive formulation, and one or more of the containers or cartridges of supply system 330 can contain the respective additive formulation. When there are two or more additive formulations (e.g., formulations that are otherwise non-reactive but react with each other in situ after deposition), the depositing at discrete addressable locations on the fabric can be done in an interlaced manner, preferably laterally, to form interfaces between adjacent drops of different additive formulations.

Additive dispensing system 340 can be mounted on the same printing block with heads 16, as illustrated in FIG. 1A, and therefore move horizontally together with heads 16. Alternatively, system 340 can be mounted separately from heads 16 (see, e.g., FIG. 1B), in which case heads 16 and system 340 can be configured to move independently. In some embodiments, building tray 12/360 or a section thereof moves under a static additive dispensing system 340 (e.g. a row of sprinklers) and/or a static printing block 128 on which heads 16 are mounted. In some other embodiments, tray 360 is configured to move in the Z direction, heads 16 are mounted in printing block 128 which is configured to perform horizontal scans of the surface of tray 360 in a first direction (e.g. X axis), and additive dispensing system 340 is configured to perform horizontal scans of the surface of tray 360 in a second direction (e.g. Y axis). In some embodiments, both printing block 128 and additive dispensing system 340 are configured to perform horizontal scans of the surface of tray 360 in the same direction (e.g. X axis).

Types of liquid additive formulations that are contemplated according to some embodiments of the present invention include, but are not limited to, a priming formulation (e.g., a stiffening formulation, an adhesive formulation, a pore size modifying formulation, etc.), a finishing or coating formulation (e.g., a radiation protective formulation, a glossy finish formulation, a matte finish formulation, etc.), a masking formulation, and the like. Other types of additive formulations that can be used according to some embodiments of the present invention include temporary protection formulations, water repellent formulations, waterproof formulations, hydrophobic formulations, and the like.

When the additive formulation is a priming formulation, it is applied prior to the dispensing of the building (e.g., modeling) material formulation. Thus, for example, an adhesive formulation can be applied to the fabric and then a building (e.g., modeling) material formulation can be dispensed wherein the adhesive formulation ensures adherence of the uncured building (e.g., modeling) material formulation or of the cured building (e.g., model, modeling) material to the fabric. Another example is the application of a pore size modifying solution that increases the sizes of the pores of the fabric. A building (e.g., modeling) material formulation can then be dispensed to form a penetration element (e.g., element 506) within the increased pores. An additional example is the application of a stiffening substance so as to stabilize the fabric prior to the dispensing.

When the additive formulation is a finishing or coating formulation, it is applied after the dispensing of the building material(s). For example, a glossy or matte finish formulation can be applied on the dispensed building material(s) to impart the dispensed materials with a desired appearance. Similarly, a paint such as a metallic paint (e.g. chrome, gold) can be applied in the form of a finishing formulation on at least part of the object that has been printed with the building material. Also contemplated are finishing formulations that serve for protecting the fabric or printed object, for example, against discoloration, radiation, abrasion, chemical damages, water absorption, and the like. Representative examples of such protective formulations, include, without limitation, UV resistant material (such as the UV resistant material commercially available from Krylon®), polyurethane (such as the polyurethane solution available from Rust-Oleum).

When the additive formulation is a masking formulation, it is preferably applied prior to the dispensing of the building material formulation(s). The masking formulation serves for preventing selected regions of the fabric from contacting the dispensed building material(s), and is therefore executed selectively at locations not to be occupied by the object to be printed. The masking formulation is preferably removable, e.g., washable. For example, a masking formulation can include the solution disclosed in U.S. Pat. No. 5,308,647, the contents of which are hereby incorporated by reference. The masking formulation can also be applied after printing, but before finishing (if applied), so as to protect the object or other locations on the fabric from the finishing formulation (if applied).

Also contemplated is the use of layers of support material as a protective coating, in locations not to be occupied by the object to be printed.

Any of the aforementioned additive formulations can optionally and preferably comprise a non-active (e.g., non-curable) formulation capable of being activated in situ, namely while being spread on the fabric. In these embodiments, the formulation is applied to the fabric and activated thereafter. In exemplary embodiments, the formulation is a curable formulation that undergoes polymerization of monomers and/or oligomers, or cross-linking of polymeric chains, or modification of optical properties of the formulation, upon being exposed to a curing condition, as described herein (e.g., irradiation, heat).

Also contemplated are formulations that are activated by chemical reaction. Such reaction can occur between the formulation and one or more of the building materials, and/or between two or more applied formulations. For example, in some embodiments of the present invention one or more building material formulation(s) are dispensed onto the fabric and are allowed to at least partially penetrate into the pores of the fibers while being in their liquid phase (before hardening upon exposure to a curing condition). Thereafter, a formulation that reacts with the dispensed building material formulation(s) is applied. The chemical reaction between the building material formulation(s) (e.g., one or more of the curable materials therein) and the applied formulation modifies at least one property of the building materials (e.g., mechanical and/or optical property). In some embodiments, the formulation induces polymerization of one or more curable material(s) in the dispensed building material formulation.

In embodiments in which two or more formulations react with one another, they are preferably deposited separately such as to induce reaction therebetween on the fabric. Depending on the product of such a reaction, the formulations can be deposited before the dispensing of the building material formulation(s), after the dispensing of the building material formulation(s), or contemporaneously or intermittently with the dispensing of the building material formulation(s).

For example, the formulations can be deposited before the dispensing of the building material formulation(s), when the reaction product forms an adhesive allowing adherence of the building material(s), and/or when the reaction product modifies the pore size (e.g., a reaction product that locally shrinks the fibers of the fabric, thereby increasing the inter-fiber pore size), and/or when the reaction product that forms a mask on regions of the fabric which are desired to be protected from being contacted with building materials. The formulations can be deposited after the dispensing of the building material formulation(s), when the reaction product modifies the appearance of the hardened building material(s) (e.g., increases or reduces glossiness, modifies color), or to cover the hardened building material(s) with a (typically transparent) cover, e.g., a protective cover. The formulations can be deposited contemporaneously or intermittently with the dispensing of the building material formulation(s), when it is desired to interlace the reaction product vertically or laterally with the hardened building material(s), e.g., to reinforce the building materials, improve the flexibility of the final object, etc.

A representative example of a formulation suitable for serving as a priming and/or coating formulation according to some embodiments of the invention are described in greater detailed in the Examples section that follows.

The present disclosure also contemplates use of a non-liquid additive. For example, the applied additive can be in solid phase. In these embodiments, the additive can be applied by contacting the fabric with a substrate carrying the additive and applying pressure, radiation and/or heat to the substrate so as to transfer the additive from the substrate to the fabric. The substrate is typically, but not necessarily, in the form of a film containing the additive or coated with the additive. For example, when the additive comprises a stiffening substance, such as, but not limited to, an oily substance, e.g., wax, a sheet containing the stiffening substance can be placed on the fabric and the sheet can be heated and/or pressed against the fabric such that the stiffening substance is transferred to the fabric.

The solid phase additive can be applied on the same side of the fabric on which the building material formulations are dispensed, and/or on an opposite side of the fabric on which said building material formulations are dispensed. Application of solid phase additive to the fabric is typically executed prior to the dispensing, but embodiments in which the solid phase additive is applied to the fabric after the object is formed thereon are also contemplated.

Figure 6A:
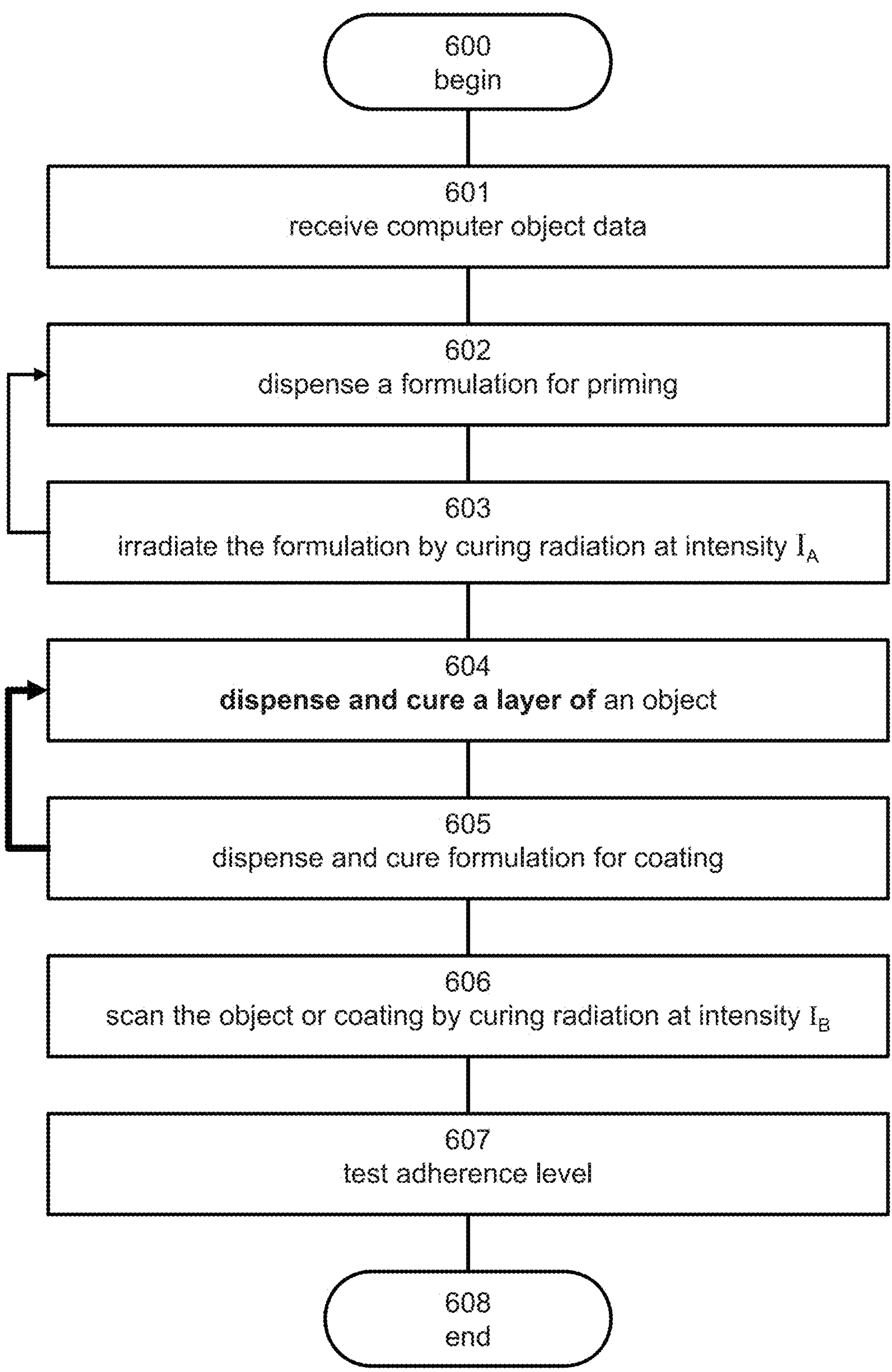
FIGS. 6A-C are flowchart diagrams describing a method suitable for forming an adhesion structure on a fabric by three-dimensional printing, according to some embodiments of the present invention.
Figure 6B:
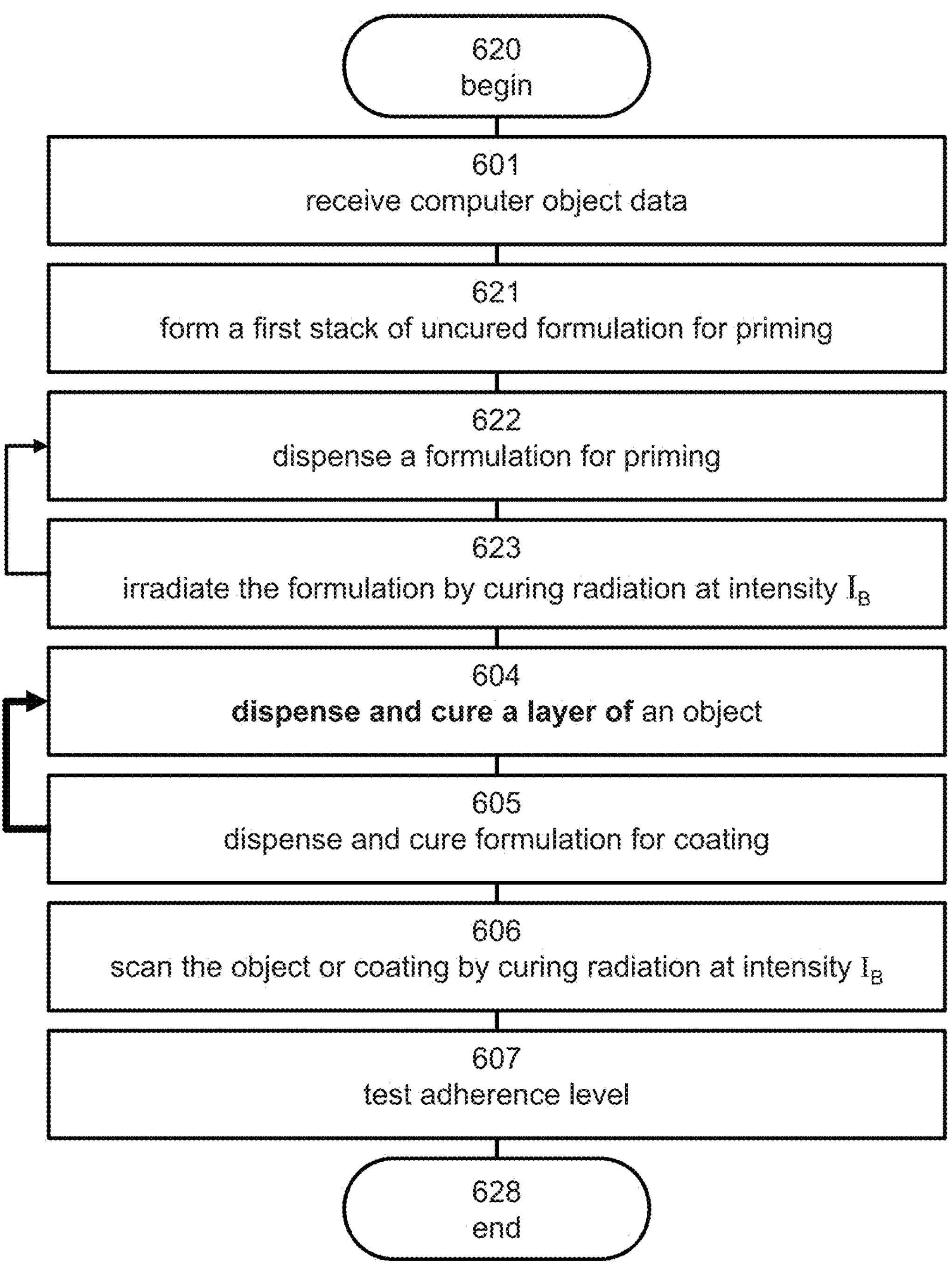
Figure 6C:
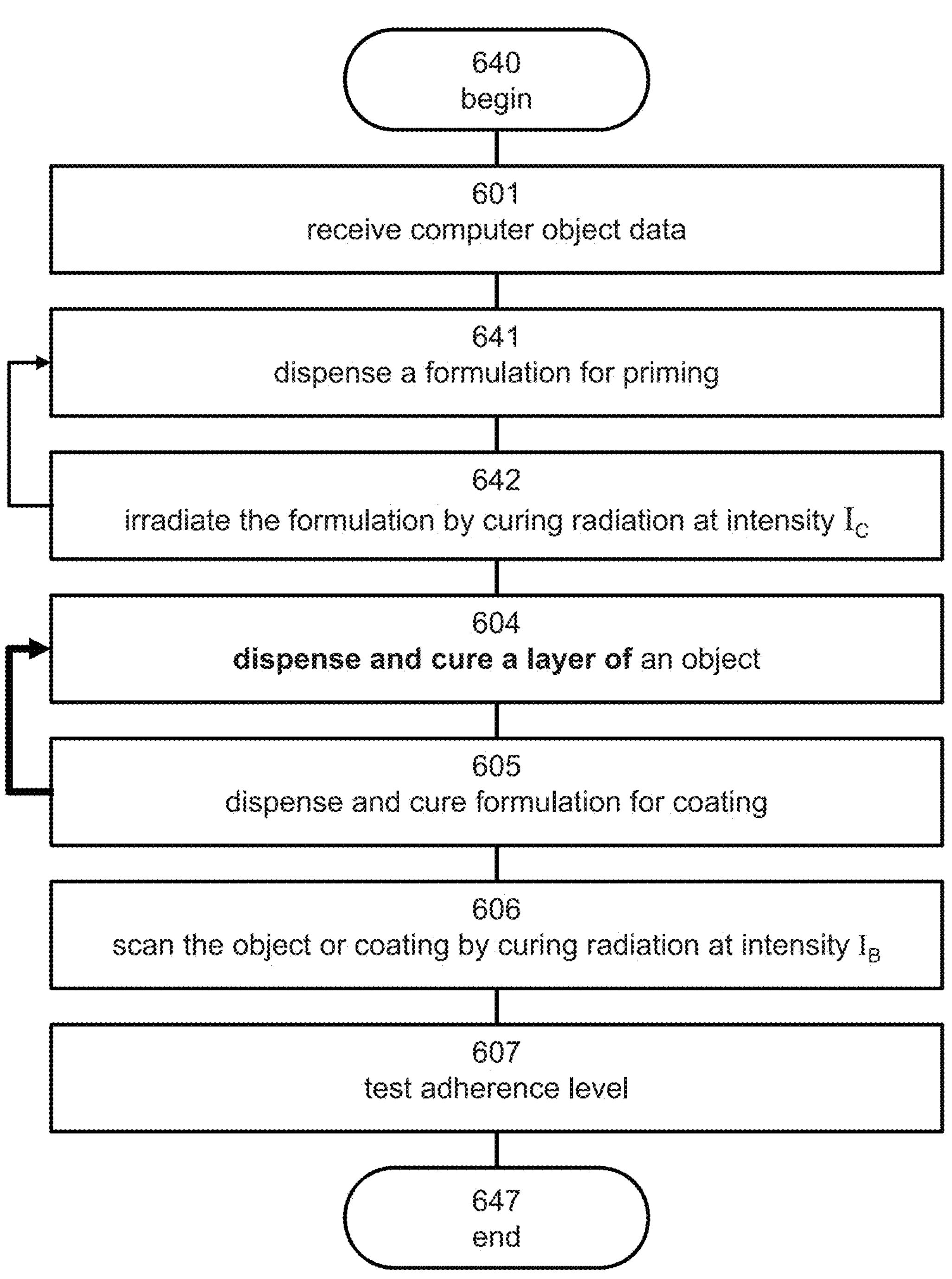

Reference is now made to FIGS. 6A-C which are flowchart diagrams describing a method suitable for forming an adhesion structure on a fabric by three-dimensional printing, according to various exemplary embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method of the present embodiments can be executed by the computerized controller (e.g., controller 20) of system 10 or 110.

The method of the present embodiments can be used as a printing protocol for improving adhesion of three-dimensional printed objects to the fabric. The adhesion structure is formed by sequential dispensing of a formulation that is suitable for serving as a priming formulation in layers. Preferably, but not necessarily, the entire adhesion structure is made of a single formulation. A representative example of a formulation suitable for these embodiments is described in the Examples section that follows. Other types of formulations are also contemplated.

Typically, once the adhesion structure is formed on the fabric as described below, a three-dimensional object made of one or more modeling materials is printed onto the adhesion structure. The Inventors found that by executing the method described below with reference to FIG. 6A provides an adequate adherence between the object and any fabric. The Inventors found that when the fabric is less absorbent to the dispensed formulation, a further improvement to the adhesion level can be obtained by executing the method described below with reference to FIG. 6B, and when the fabric is more absorbent to the dispensed formulation, a further improvement to the adhesion level can be obtained by executing the method described below with reference to FIG. 6C.

The absorbance level of the fabric can be determined before printing using any procedure known in the art. For example, a drop of the dispensed formulation can be applied to the fabric, and the absorbance level can be determined based on the contact angle between the drop and the fabric, wherein higher contact angles corresponds to a fabric that is more hydrophobic hence less absorbent. Alternatively, or additionally, the fabric can be immersed in liquid (e.g., water) and the amount of time at which the fabric absorbs the liquid can be correlated to the absorbance level of the fabric.

Referring to FIG. 6A, the method begins at 600 and optionally and preferably continues to 601 at which computer object data are received. The computer object data can be in any of the aforementioned formats, and describe at least the bottommost surface of an object to be fabricated on top of the adhesion structure. Typically, however, the computer object data describe the entire shape of the object.

The method continues to 602 at which the priming formulation is dispensed to form a layer. The dispensing is on the fabric or on a previously dispensed layer, when such a layer was already formed by the method. The formulation is dispensed in a selective manner according to the computer object data of the bottommost surface of the object to be fabricated on top of the adhesive structure. Thus, the formulation is dispensed at lateral coordinates which are expected to be occupied by the object, once printed, and is not dispensed at other locations.

The method continues to 603 at which the formulation is irradiated by curing radiation having radiation intensity $I_A$ to form a solidified adhesive material that composes a layer of the adhesive structure. The wavelength of the curing radiation depends on the type of formulation that is used. For example, when the formulation is UV-curable, the radiation can be UV radiation. A typical value for the intensity $I_A$ is from about 2.5 W/cm$^2$ to about 5.5 W/cm$^2$.

For any layer of the adhesive structure, operation 603 is preferably executed according to a protocol in which a pattern of curing radiation is created on the layer wherein the pattern has a shape of a single stripe, and is advanced along the scanning direction (x or Q). A representative example of an irradiating protocol suitable for operation 603 is illustrated in FIGS. 11A and 11B, showing a layer 610 of the priming formulation on fabric 420 and a pattern 612 of curing radiation in the form of a single straight stripe propagating along the direction x when fabric 420 is on tray 360 (FIG. 11A) or and along the direction φ when fabric 420 is on tray 12 (FIG. 11B).

Figure 11A:
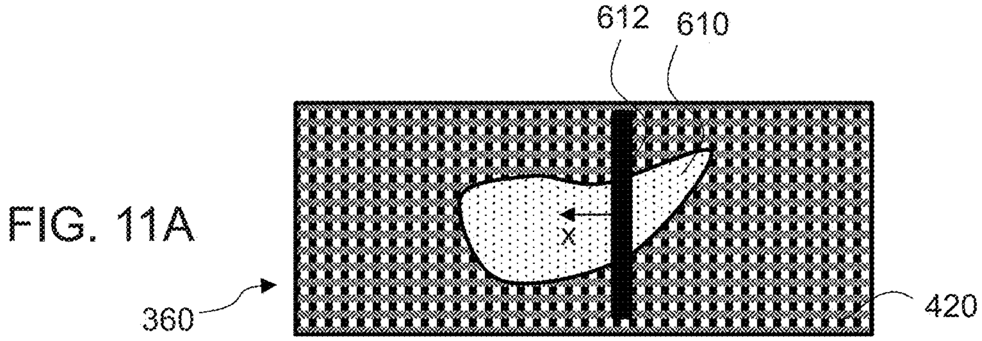
FIGS. 11A-D are schematic illustrations of irradiating protocols according to some embodiments of the present invention.
Figure 11B:
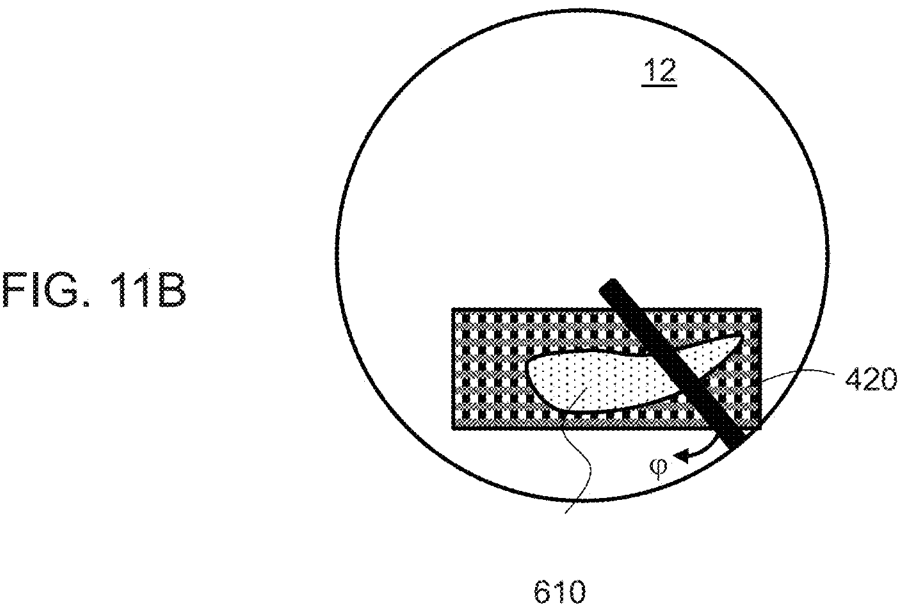

The radiation pattern is created by the devices that emit the radiation (e.g., devices 18 of system 10 or 110), and the irradiating protocol illustrated in FIGS. 11A and 11B can be employed by judicious control over these devices. For example, when the system is configured to perform reciprocal relative motion between the dispensing head and the tray along a straight line (e.g., system 110) operation 603 can be executed by activating only the solidification device that follows the printing head and deactivating the solidification device that is followed by the printing head (e.g., with reference to FIG. 1D, when the head 16 moves to the left the device 18 at the right-hand-side of head 16 is activated and the device 18 at the left-hand-side of head 16 is deactivated and vice versa). This ensures execution of the protocol shown in FIG. 11A. When the system is configured to perform rotary relative motion between the dispensing head and the tray (e.g., system 10), operation 603 can be executed by activating only the solidification device that is in front of the printing head with respect to the rotation direction, and deactivating the solidification device that is behind the printing head with respect to the rotation direction. This ensures execution of the protocol shown in FIG. 11B. The control over the solidification devices is typically by means of the controller of the three-dimensional printing system (e.g., controller 20 of system 10 or 110).

From 603 the method optionally and preferably loops back to 602 for the formation of the subsequent layer of the adhesive structure. The looping is repeated a predetermined number of times. Preferably, the looping is repeated until the number of layers in the adhesive structure is $N_1$, where $N_1$ is from about 10 to about 30 layers, or from about 15 to about 30 layers, e.g., about 20 layers.

Once the loop is completed, a stack of layers is formed, and the method optionally and preferably continues to 604 at which the three-dimensional object is printed in layers on the topmost layer of the stack, based on the computer object data. The object is preferably printed using one or more modeling materials, such as, but not limited to, one of more of the aforementioned modeling materials. In some embodiments of the present invention at least one of the modeling material formulations that is/are dispensed at 604 is a flexible modeling material, such as, but not limited to, the flexible modeling material described in Example 3 of the Examples section that follows. The object is printed by dispensing one or more modeling formulations in layers in configured patterns corresponding to shapes of slices of the object, and irradiating the modeling formulation(s) of each layer by the curing radiation. The irradiation is preferably according to the same irradiating protocol described above with respect to operation 603.

In some embodiments, the method continues to 605 at which a formulation suitable for use as a coating formulation is dispensed and cured on the outer surface of the object to form a solidified coating. In some embodiments, the coating formulation is the same as the priming formulation dispensed at 602. The coating is formed by dispensing the formulation in layers over the object, and irradiating the formulation of each layer by the curing radiation. In some embodiments, the coating formulation is also dispensed to at least partially surround one or more of the layers formed at 604. Such a surrounding or partially surrounding coating can be formed substantially simultaneously with the formation of the respective layer of the object, by dispensing the modeling formulation(s) and coating formulation using different nozzle arrays of the dispensing heads 16. Alternatively, the surrounding or partially surrounding coating can be formed for the respective layer after the layer of modeling formulation(s) is dispensed, as indicated by the loopback arrow from 605 to 604. The advantage of forming a surrounding or partially surrounding coating is that it provides coating also at the sides of the object. For example, a coating that surrounds the printing object from all sides can be provided by dispensing the coating formulation to completely surround each of the layers formed at 604. The irradiation in 605 is preferably according to the same irradiating protocol described above with respect to operation 603. The thickness of the solidified coating is preferable from about 0.01 mm to about 0.5 mm, e.g., about 0.05 mm or about 0.1 mm.

In some embodiments of the present invention the method proceeds to 606 at which the topmost layer of the object or the coating (if applied) is scanned by the curing radiation at intensity $I_B$, which is different from $I_A$. Preferably, no formulation is dispensed during the execution of 606. Intensity $I_B$, is preferably about two times $I_A$.

Figure 11C:
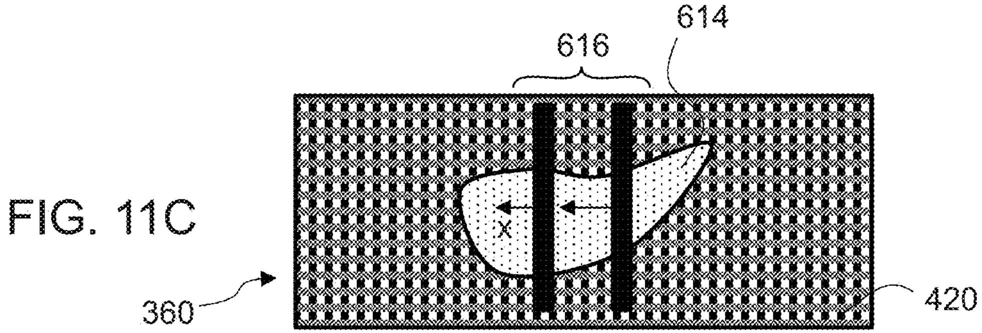
Figure 11D:
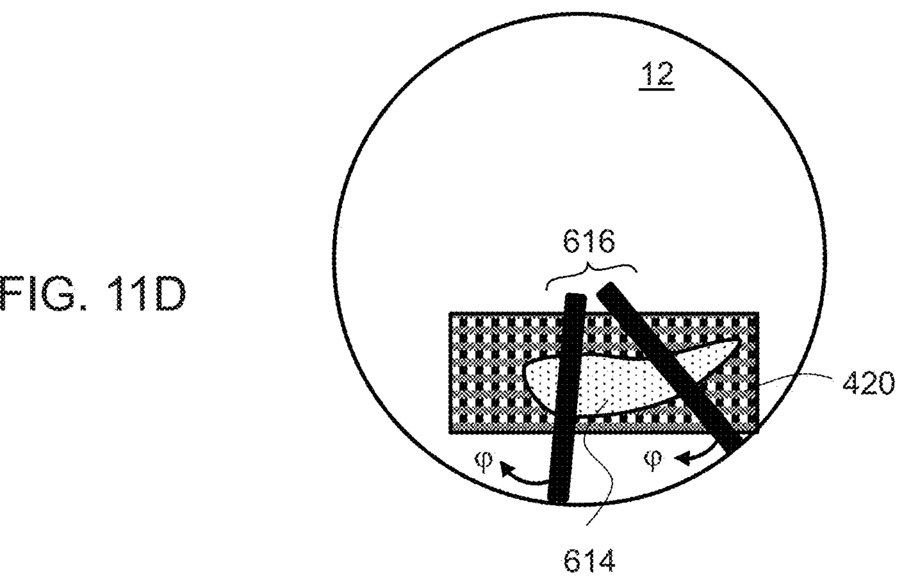

The irradiating protocol employed by the controller at 606 is optionally and preferably different from the irradiating protocol employed in 603. Specifically 606 is executed according to a protocol in which a pattern of curing radiation is created on the layer wherein the pattern has a shape of two stripes, and is advanced along the scanning direction (x or q). A representative example of an irradiation protocol suitable for operation 606 is illustrated in FIGS. 11C and 11D, showing layer 614 of the object 112 on fabric 420 and a pattern 616 of curing radiation in the form of two straight stripes propagating along the direction x when fabric 420 is on tray 360 (FIG. 11C) or and along the direction φ when fabric 420 is on tray 12 (FIG. 11D). Such a pattern of curing radiation can be created by activating both devices, each at the same power that is used during operation 603. Specifically, when the system is configured to perform reciprocal relative motion along a straight line (e.g., system 110) operation 606 can be executed by activating both the solidification device that follows the printing head and the solidification device that is followed by the printing head, and when the system is configured to perform rotary relative motion (e.g., system 10), operation 606 can be executed by activating both the solidification device that is in front of the printing head with respect to the rotation direction, and the solidification device that is behind the printing head with respect to the rotation direction. The control over the solidification devices is typically by means of the controller of the three-dimensional printing system (e.g., controller 20 of system 10 or 110).

Alternatively, operation 606 can be implemented by doubling the power of one of the solidification devices while deactivating the other device, in which case the radiation pattern is as shown in FIGS. 11A and 11B except that its intensity is doubled.

In some embodiments of the present invention the object is a testing object that is printed in order to test the adherence level that the adhesive structure provides. In these embodiments, the method proceeds to 607 at which the adherence level of the object to the fabric is tested. A representative example of a testing object and a testing procedure suitable for the present embodiments is provided hereinunder. When the object serves for testing, operation 605 can be skipped.

The method ends at 608.

Referring to FIG. 6B, the method described in this flowchart is suitable for being executed when the absorbent level of the fabric is relatively low. The method begins at 620 and optionally and preferably continues to 601 at which computer object data are received as further detailed hereinabove.

The method continues to 621 at which the formulation is dispensed to form a first stack of uncured layers. The dispensing is on the fabric or on a previously dispensed layer, and is executed in a selective manner according to the computer object data of the bottommost surface of the object as further detailed hereinabove. In each layer of the first stack, the formulation is dispensed without curing it. Thus, during operation 621, all the solidification devices are deactivated. The number of layers that are dispensed without curing during operation 621 is less than 5, more preferably less than 4. In a preferred embodiment the first stack consists 2 layers.

The method continues to 622 at which the priming formulation is dispensed on the first stack to form a layer. The method continues to 623 at which the formulation is irradiated by the aforementioned curing radiation at radiation intensity $I_B$. A typical value for the intensity $I_B$ is from about 5 W/cm$^2$ to about 10 W/cm$^2$. For any layer of the adhesive structure, operation 623 is preferably executed according to a protocol in which pattern 616 of curing radiation is created on the layer wherein the pattern has a shape of two stripes, and is advanced along the scanning direction (x or q), as further detailed hereinabove with respect to operation 606 and illustrated in FIGS. 11C and 11D.

From 623 the method optionally and preferably loops back to 622 for the formation of the subsequent layer of the adhesive structure. The looping is repeated a predetermined number of times. Preferably, the looping is repeated until the number of layers in the adhesive structure is $N_2$, where $N_2$ is from about 15 to about 30 layers. As further explained below, the present disclosure contemplate performing two or more of the methods described in FIGS. 6A-C on the same fabric or the same type of fabric. When both method 600 and method 620 are performed on the same fabric, the value of $N_2$ is optionally and preferably less than the value of $N_1$. For example, when $N_1$=15, $N_2$ can be 10, when $N_1$=20, $N_2$ can be 18, etc.

Once the loop that includes 622 and 623 is completed, a second stack of layers is formed, and the method optionally and preferably continues to 604 at which the three-dimensional object is printed on the topmost layer of the second stack. The object is preferably printed using one or more modeling materials, such as, but not limited to, one of more of the aforementioned modeling materials. The object is printed by dispensing one or more modeling formulations in layers in configured patterns corresponding to shapes of slices of the object, and irradiating the modeling formulation(s) of each layer by the curing radiation. The irradiation is preferably according to the same irradiating protocol described above with respect to operation 603.

In some embodiments, the method continues to 605 at which a formulation suitable for use as a coating formulation is dispensed and cured on the outer surface of the object as further detailed hereinabove, and in some embodiments the method proceeds to 606 at which the topmost layer of the object or coating is scanned by the curing radiation at intensity $I_B$, as further detailed hereinabove.

In some embodiments of the present invention the method proceeds to 607 at which the adherence level of the object to the fabric is tested, as delineated above, mutatis mutandis, and is further detailed below.

The method ends at 628.

Referring to FIG. 6C, the method described in this flowchart is suitable for being executed when the absorbent level of the fabric is relatively high. The method begins at 640 and optionally and preferably continues to 601 at which computer object data are received as further detailed hereinabove.

The method continues to 641 at which the priming formulation is dispensed to form a layer. The dispensing is on the fabric or on a previously dispensed layer, when such a layer was already formed by the method, and the formulation is dispensed in a selective manner according to the computer object data of the bottommost surface of the object as further detailed hereinabove.

The method continues to 642 at which the formulation is irradiated by the aforementioned curing radiation at radiation intensity $I_C$. Radiation intensity $I_C$ is typically higher, e.g., two times higher, than the aforementioned radiation intensity $I_B$. A typical value for the intensity $I_C$ is from about 10 W/cm$^2$ to about 22 W/cm$^2$.

For any layer of the adhesive structure formed by method 640, operation 642 is preferably executed according to a protocol in which pattern 616 of curing radiation is created on the layer wherein the pattern has a shape of two stripes, and is advanced along the scanning direction (x or φ) as further detailed hereinabove with respect to operation 606 and illustrated in FIGS. 11C and 11D. Operation 642 can be executed by activating both the solidification devices of the system, except that at operation 642 each of the solidification devices is operated at higher power than at operation 606 (typically doubled, compared to 606) so as to provide radiation intensity $I_C$. Specifically, when the system is configured to perform reciprocal relative motion along a straight line (e.g., system 110) operation 642 can be executed by activating both the solidification device that follows the printing head and the solidification device that is followed by the printing head, and when the system is configured to perform rotary relative motion (e.g., system 10), operation 642 can be executed by activating both the solidification device that is in front of the printing head with respect to the rotation direction, and the solidification device that is behind the printing head with respect to the rotation direction. The control over the solidification devices is typically by means of the controller of the three-dimensional printing system (e.g., controller 20 of system 10 or 110).

Once the loop that includes 641 and 642 is completed, a stack of layers is formed, and the method optionally and preferably continues to 604 at which the three-dimensional object is printed on the topmost layer of the previously formed stack. The object is preferably printed using one or more modeling materials, such as, but not limited to, one of more of the aforementioned modeling materials. The object is printed by dispensing one or more modeling formulations in layers in configured patterns corresponding to shapes of slices of the object, and irradiating the modeling formulation(s) of each layer by the curing radiation. The irradiation is preferably according to the same irradiating protocol described above with respect to operation 603.

In some embodiments, the method continues to 605 at which a formulation suitable for use as a coating formulation is dispensed and cured on the outer surface of the object as further detailed hereinabove, and in some embodiments the method proceeds to 606 at which the topmost layer of the object or coating is scanned by the curing radiation at intensity $I_B$, as further detailed hereinabove.

The method ends at 647.

In some embodiments of the present invention the operator first determines which of the above methods is more suitable to the fabric and then selects the appropriate method. Thus, the operator can obtain a parameter that describes the fabric, and then select one of methods 600, 620 and 640 based on the obtained parameter. The parameter can be the absorbent level of the fabric, or be indicative thereof. For example, the parameter can be a type of the fabric and the operator can use a lookup table to determine the absorbent level of the fabric. When the absorbent level is less than a predetermined threshold the operator can execute method 620, when the absorbent level is above a predetermined threshold the operator can execute method 640. The operator can select method 600 as the default method and executed in cases in which the absorbent level of the fabric is unknown.

The present embodiments also contemplate executing one or more of methods 600, 620 and 640 more than once for the same fabric or the same type of fabric. For example, one or more of these methods can be repeated for different orientations of the fabric on the same side of the fabric, and/or repeated for different sides of the fabric. These embodiments are particularly useful for testing, in which case the respective method performs the testing operation 607 at each execution of the method, allowing to determine the orientation and/or side at which the highest adherence level is obtainable.

The present embodiments also contemplate executing two or more of methods 600, 620 and 640 for the same fabric or the same type of fabric. These embodiments are also useful for testing, in which case the testing operation 607 is performed at each execution of the method, allowing to determine which printing protocol provides the highest adherence level for the fabric under investigation. When more than one method is executed using the same fabric, different method form the adhesive structure at different portions of the fabric. This type of testing can also be combined with a testing of the adherence level for different orientations and/or sides of the fabric. Thus, in this combined test, two or more of methods 600, 620 and 640 are executed for the same fabric or the same type of fabric, and are further executed for at least two different orientations and/or two different sides of the same fabric or the same type of fabric. For each method, the respective method performs the testing operation 607 at each execution of the method, allowing to determine the printing protocol as well as the orientation and/or side for which the highest adherence level is obtainable.

The methods 600, 620, 640 can be used to fabricate on the fabric any type of object, using any formulation suitable for three-dimensional printing. Representative examples of formulations suitable for the present embodiments include, without limitation, the formulations marketed under the trade names Vero™ family, e.g., Vero Vivid™Cyan, Vero Vivid™, VeroClear™, Vero ContactFlex, and VeroUltraClear and Agilus family, e.g., Agilus30™, Agilus™White, Agilus™Clear, Agilus™Black, Agilus™Cyan, Agilus™Magenta, Agilus™Yellow, all marketed by Stratasys® Ltd., Israel. In some embodiments of the present invention at least one of the formulations that is dispensed for fabricating the object(s) of the fabric provides a flexible material. A representative example of such a formulation is described in the Examples section that follow.

In some embodiments of the present invention the method is executed for fabricating an object selected from the group consisting of a lenticular, a prismatic object, an object that is reflective to visible light, an object that is transparent to visible light but reflective to non-visible light, a fluorescent object, and a waveguide. In some embodiments, the fabricated object is capable of changing an optical, mechanical, and/or geometrical property in response to an environmental change, such as, but not limited to, a change in temperature, a change in humidity, a change in electromagnetic content of the environment, and the like. For example, the object can be made of an optically sensitive material that changes its color in response to a change in light condition or temperature.

In some embodiments of the present invention the method is executed for fabricating an object which comprises an agent such as, but not limited to, a pharmaceutical agent and/or a cosmetic agent. For example, the agent can be adsorbed on the surface of the object (e.g., by applying the agent to the building material as an additive) or the object can be in the form of a capsule containing the agent. Representative examples of pharmaceutical agent that can be incorporated in the object include, without limitation, an anti-bacterial agent and an anti-viral agent.

In some embodiments of the present invention the method is executed for fabricating an object which comprises a heating element capable of releasing heat or a cooling element capable of absorbing heat. In some embodiments the method is executed for fabricating an object which comprises a circuit, and in some embodiments the method is executed for fabricating an object which comprises a cavity for receiving a foreign object, such as, but not limited to, an electric circuit, or a magnetic element, or a light emitting element, or a chip, or a capsule containing a pharmaceutical or cosmetic agent.

When the testing 607 is employed by the respective method, the object is preferably a testing object having a shape selected to facilitate the testing.

The testing object is fabricated by printing a modeling material to form a two-part structure. Top views of representative examples of a two-part structure 720 suitable for the present embodiments are illustrated in FIGS. 7A-C, and a side view of a representative example of two-part structure 720 is illustrated in FIG. 7D. Two-part structure 720 is formed of a first stack 722 of modeling material layers that is laterally displaced from a second stack 724 of modeling material layers. The layers are stacked along the vertical direction z defined for the printing system (see FIGS. 1A and 1C), and the stacks 722 and 724 are displaced from each other along a horizontal direction that is perpendicular to the vertical direction. FIGS. 7A-C illustrate top views of structure 720, and so only the uppermost layer of each of stacks 722 and 724 is shown. In FIGS. 7A-C, the vertical direction z is shown as a circled dot indicating that it is directed out of the drawing's plane. A side view of the two-part structure 720, the adhesive structure 740 and the fabric 742 is illustrated in FIG. 7D, showing also the vertical direction z as an upwardly pointing arrow.

In some embodiments of the present invention at least one of stacks 722 and 724 and more preferably both stacks 722 and 724 comprise a multiplicity of through holes 734 defining open cells in stacks 722 and 724. For example, the stacks 722 and 724 can have honeycomb structures. The through holes 734 are shown as hexagons in FIGS. 7A-C but they can have any other shape. The advantage of having through holes 734 in stacks 722 and 724 is that it reduces the likelihood of curling of the periphery of structure 720 relative to its center, during the printing process.

Stacks 722 and 724 are separated by a gap 726. The width of gap 726 is preferably uniform along the gap, but cases in which gap 726 has a non-uniform width are also contemplated in some embodiments. The width of gap 726 is preferably less than 1 mm, for example, from about 0.4 to about 0.9 mm. In experiments performed by the Inventors, widths of 0.5 mm, 0.7 mm and 0.9 mm were employed. While FIG. 7D shows a case in which the adhesive structure 740 is formed also below the gap 726, this need not necessarily be the case, since, in some embodiments, it may be desired to configure the substance layers to have the same lateral shape as structure 720 and to be co-aligned vertically with it. In these embodiments, there are two stacks of substance layers, one stack aligned vertically below stack 722 and another stack aligned vertically below stack 724. A representative illustration of the case in which there are two gap-separated adhesive structures 740*a*, 740*b* is illustrated in FIG. 8A, described below.

Two-part structure 720 is preferably elongated with planar width to length aspect ratio of from about 1:3 to about 1:10. The length of two-part structure 720, is defined as the aggregate lengths of stack 722 gap 726 and stack 724. Preferably the length of structure 720 is from about 50 mm to about 200 mm, and the width of structure 720 is preferably from about 10 mm to about 20 mm.

Gap 726 is optionally and preferably non-straight. In these embodiments, stacks 722 and 724 can be viewed as a male-female pair. For example, stack 722 can be defined as the male stack and stack 724 can be defined as the female stack. In some embodiments of the present invention gap 726 has a piecewise linear shape, as illustrated in FIGS. 7A and 7B, and in some embodiments of the present invention gap 726 has a curved shape, as illustrated in FIG. 7C. When the gap has a piecewise linear shape, it preferably forms an acute angle at one or more of its breakpoints 728. When the gap has a piecewise linear shape, it preferably has at least one apex 728. In the representative examples illustrated in FIGS. 7A-7C, the gap has a V shape (FIG. 7A), a W shape (FIG. 7B), and an arc shape (FIG. 7C), but other piecewise linear or curved shapes are also contemplated for gap 726. The advantage of having a gap with a breakpoint or apex is that it facilitates easy partial detachment of stack 722 and/or stack 724 from the fabric during a bend test. Specifically, a point 732 at the periphery of the male stack 722 that borders gap 726 and that is nearby (e.g., closest to) the breakpoint 728 or apex 730 can be a detachment point in the sense that the adhesion forces between the structure 720 and the fabric are the weakest in the vicinity of detachment point 732.

In various exemplary embodiments of the invention each of stacks 722, 724 has a bending resistance that is higher than the bending resistance of adhesive structure 740 as well as than the bending resistance of fabric 742. This can be achieved by selecting the modeling material of structure 720 to be stiffer than the adhesive structure 740 and the fabric 742, and/or by making the thickness of stacks 722, 724 along the vertical direction z larger than the thicknesses of adhesive structure 740 and fabric 742. Preferably, the thicknesses of stacks 722 and 724 are at least two times larger more preferably at least three times larger than the thickness of adhesive structure 740. In some embodiments, the thicknesses of stacks 722 and 724 are at least two times larger more preferably at least three times larger than the thickness of the fabric 742.

A typical thickness for adhesive structure 740 is from about 0.1 mm to about 1 mm, more preferably from about 0.2 mm to about 0.9 mm, more preferably from about 0.2 mm to about 0.8 mm. A typical thickness for stacks 722 and 724 is from about 1 mm to about 4 mm, more preferably from about 1.6 mm to about 3 mm, more preferably from about 2 mm to about 3 mm. In experiments performed by the Inventors thicknesses of 0.3 mm and 0.6 mm were employed for stack 740 and a thickness of 2.2 mm was employed for stacks 722 and 724.

The testing procedure typically includes bending the fabric 742 at the location of gap 726 so as to detach at least one of stacks 722 and 724 from the fabric at detachment point 732. Since both the testing object and the adhesive structure are fabricated by printing, the adherence between the adhesive structure and the modeling material that forms the testing object printed on top of it is stronger than the adherence between adhesive structure and the fabric.

Figure 8B:
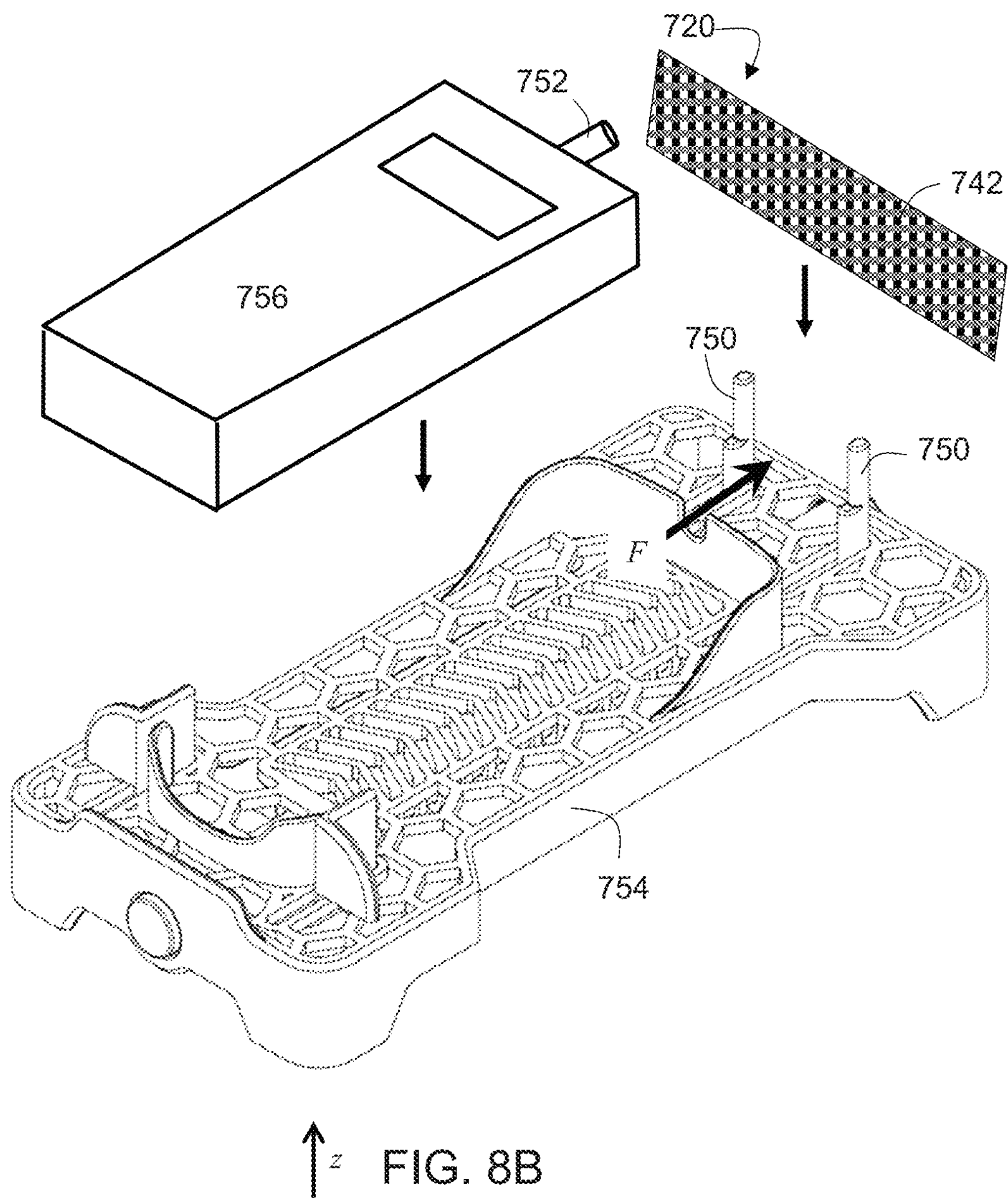

A preferred procedure for executing operation 704 is illustrated in FIGS. 8A and 8B. Structure 720 is placed to contact a pair 750 of supporting pillars. Preferably structure 720 contacts pillar pair 750 and fabric 742 is away from pillar pair 750. Note that FIG. 8B is an exploded view from a viewpoint showing the side of fabric 742 that does not include structure 720. The pillars 750 are arranged on a jig 754 and fabric 742 can contact them in a horizontal (FIG. 8A) or vertical (FIG. 8B) orientation.

A force applying pin 752 is brought to engage fabric 742 at proximity to the location of the gap 726 (not shown in FIGS. 8A-B), and a force F is applied by pin 752 perpendicularly to fabric 742, generally at the direction of pair 750. In the configuration shown in FIG. 8A (horizontal orientation of fabric 742) F is directed downwards, and in the configuration shown in FIG. 8B (vertical orientation of fabric 742) F is directed horizontally. The force F causes fabric 742 to bend into the space between the pillars of pair 750. Since the bending resistance of stacks 722 and 724 is higher, they begin to detach from fabric 742 (together with the stack 740, which is more strongly attached to structure 720 than to fabric 742), at the points of weakest adhesion, which are in the vicinity of the gap.

It is appreciated that the above procedure provides a qualitative assessment of the level of adherence of the substance to the fabric. When it is desired to have a more quantitative assessment of the level of adherence, the magnitude of the force F and the strain of fabric 742 is monitored, e.g., by a device 756 (FIG. 8B) that measures the displacement of pin 752 and the force applied by it. The adherence level of the substance to the fabric can then be determined based on the monitored values. For example, the monitored values can be analyzed to identify a maximal load at which there is an abrupt change in the correlation between the force and the displacement, and this maximal load can be defined as the level of adherence. Typically, the displacement grows generally linearly with the force until the force reaches the maximal load. When the displacement is larger than the displacement at the maximal load, there is no longer a linear growth of the displacement with the force. Oftentimes at this stage, there is a negative correlation between the displacement and the force. The maximal load can thus be identified as the force at which the linear growth of the displacement with the force terminates.

In experiments performed according to exemplary embodiments of the invention, once the object was formed on the fabric as described hereinabove, the printed fabric was subjected to machine washing to test adherence of the printed object to the fabric. Printed fabric samples were rolled in net bags to prevent direct rubbing or abrasion of the printed object and washed in a standard washing machine using a "Delicate" washing cycle at 30° C. with a 600 RPM spin speed.

As used herein the term "about" refers to ±10% or ±5%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Herein throughout, whenever the phrase "weight percent", or "% by weight" or "% wt.", is indicated in the context of embodiments of a formulation (e.g., a modeling formulation), it is meant weight percent of the total weight of the respective uncured formulation.

Herein throughout, an acrylic material is used to collectively describe material featuring one or more acrylate, methacrylate, acrylamide and/or methacrylamide group(s).

Similarly, an acrylic group is used to collectively describe curable groups which include acrylate, methacrylate, acrylamide and/or methacrylamide group(s), preferably acrylate or methacrylate groups (referred to herein also as (meth) acrylate groups).

Herein throughout, the term "(meth)acrylic" encompasses acrylic and methacrylic materials. Urethane acrylates are also contemplated.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 30, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group. Dimethylenecyclohexane is an example of a hydrocarbon comprised of 2 alkyl groups and one cycloalkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(═O)$_2$—OR' end group, as this term is defined hereinabove, or an —O—S(═O)$_2$—O— linking group, as these phrases are defined hereinabove, where R' is as defined hereinabove.

The term "thiosulfate" describes a —O—S(═S)(═O)—OR' end group or a —O—S(═S)(═O)—O— linking group, as these phrases are defined hereinabove, where R' is as defined hereinabove.

The term "sulfite" describes an —O—S(═O)—O—R' end group or a —O—S(═O)—O— group linking group, as these phrases are defined hereinabove, where R' is as defined hereinabove.

The term "thiosulfite" describes a —O—S(═S)—O—R' end group or an —O—S(═S)—O— group linking group, as these phrases are defined hereinabove, where R' is as defined hereinabove.

The term "sulfinate" describes a —S(═O)—OR' end group or an —S(═O)—O— group linking group, as these phrases are defined hereinabove, where R' is as defined hereinabove.

The term "sulfoxide" or "sulfinyl" describes a —S(═O)R' end group or an —S(═O)— linking group, as these phrases are defined hereinabove, where R' is as defined hereinabove.

The term "sulfonate" describes a —S(═O)$_2$—R' end group or an —S(═O)$_2$— linking group, as these phrases are defined hereinabove, where R' is as defined herein.

The term "S-sulfonamide" describes a —S(═O)$_2$—NR'R" end group or a —S(═O)$_2$—NR'— linking group, as these phrases are defined hereinabove, with R' and R" as defined herein.

The term "N-sulfonamide" describes an R'S(═O)$_2$—NR"— end group or a —S(═O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(═O)(OR')(OR") end group or a —P(═O)(OR')(O)— linking group, as these phrases are defined hereinabove, with R' and R" as defined herein.

The term "thiophosphonate" describes a —P(═S)(OR')(OR") end group or a —P(═S)(OR')(O)— linking group, as these phrases are defined hereinabove, with R' and R" as defined herein.

The term "phosphinyl" describes a —PR'R" end group or a —PR'-linking group, as these phrases are defined hereinabove, with R' and R" as defined hereinabove.

The term "phosphine oxide" describes a —P(═O)(R')(R") end group or a —P(═O)(R')— linking group, as these phrases are defined hereinabove, with R' and R" as defined herein.

The term "phosphine sulfide" describes a —P(═S)(R')(R") end group or a —P(═S)(R')— linking group, as these phrases are defined hereinabove, with R' and R" as defined herein.

The term "phosphite" describes an —O—PR'(═O)(OR") end group or an —O—PH(═O)(O)— linking group, as these phrases are defined hereinabove, with R' and R" as defined herein.

The term "carbonyl" or "carbonate" as used herein, describes a —C(═O)—R' end group or a —C(═O)— linking group, as these phrases are defined hereinabove, with R' as defined herein.

The term "thiocarbonyl" as used herein, describes a —C(═S)—R' end group or a —C(═S)— linking group, as these phrases are defined hereinabove, with R' as defined herein.

The term "oxo" as used herein, describes a (═O) group, wherein an oxygen atom is linked by a double bond to the atom (e.g., carbon atom) at the indicated position.

The term "thiooxo" as used herein, describes a (═S) group, wherein a sulfur atom is linked by a double bond to the atom (e.g., carbon atom) at the indicated position.

The term "oxime" describes a ═N—OH end group or a ═N—O— linking group, as these phrases are defined hereinabove.

The term "hydroxyl" describes a —OH group.

The term "alkoxy" describes both an —O-alkyl and an —O-cycloalkyl group, as defined herein. The term alkoxide describes —R'O" group, with R' as defined herein.

The term "aryloxy" describes both an —O-aryl and an —O-heteroaryl group, as defined herein.

The term "thiohydroxy" or "thiol" describes a —SH group. The term "thiolate" describes a $—S^-$ group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N═C═O group.

The term "isothiocyanate" describes an —N═C═S group.

The term "nitro" describes an $—NO_2$ group.

The term "acyl halide" describes a —(C═O) R"" group wherein R"" is halide, as defined hereinabove.

The term "azo" or "diazo" describes an —N═NR' end group or an —N═N-linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate. The term "C-carboxylate" describes a —C(═O)—OR' end group or a —C(═O)—O— linking group, as these phrases are defined hereinabove, where R' is as defined herein.

The term "O-carboxylate" describes a —OC(═O) R' end group or a —OC(═O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(═S)—OR' end group or a —C(═S)—O— linking group, as these phrases are defined hereinabove, where R' is as defined herein.

The term "O-thiocarboxylate" describes a —OC(═S) R' end group or a —OC(═S)-linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(═O)—NR'— end group or a —OC(═O)—NR'— linking group, as these phrases are defined hereinabove, with R' and R" as defined herein.

The term "O-carbamate" describes an —OC(═O)—NR'R" end group or an —OC(═O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(═S)—NR'R" end group or a —OC(═S)—NR'— linking group, as these phrases are defined hereinabove, with R' and R" as defined herein.

The term "N-thiocarbamate" describes an R"OC(═S)NR'— end group or a —OC(═S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(═S)—NR'R" end group or a —SC(═S)NR'— linking group, as these phrases are defined hereinabove, with R' and R" as defined herein.

The term "N-dithiocarbamate" describes an R"SC(═S)NR'— end group or a —SC(═S)NR'— linking group, as these phrases are defined hereinabove, with R' and R" as defined herein.

The term "urea", which is also referred to herein as "ureido", describes a —NR'C(═O)—NR"R'" end group or a —NR'C(═O)—NR"— linking group, as these phrases are defined hereinabove, where R' and R" are as defined herein and R" is as defined herein for R' and R".

The term "thiourea", which is also referred to herein as "thioureido", describes a —NR'—C(═S)—NR"R'" end group or a —NR'—C(═S)—NR"— linking group, with R', R" and R'" as defined herein.

The term "amide" as used herein encompasses C-amide and N-amide.

The term "C-amide" describes a —C(═O)—NR'R" end group or a —C(═O)—NR'— linking group, as these phrases are defined hereinabove, where R' and R" are as defined herein.

The term "N-amide" describes a R'C(═O)—NR"— end group or a R'C(═O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(═N)— end group or a —R'NC(═N)— linking group, as these phrases are defined hereinabove, where R' and R" are as defined herein.

The term "guanidine" describes a —R'NC(═N)—NR"R'" end group or a —R'NC(═N)—NR"— linking group, as these phrases are defined hereinabove, where R', R" and R" are as defined herein.

The term "hydrazine" describes a —NR'—NR"R'" end group or a —NR'—NR"-linking group, as these phrases are defined hereinabove, with R', R", and R'" as defined herein.

As used herein, the term "hydrazide" describes a —C(=O)—NR'—NR"R'" end group or a —C(=O)—NR'—NR"-linking group, as these phrases are defined hereinabove, where R', R" and R" are as defined herein.

As used herein, the term "thiohydrazide" describes a —C(=S)—NR'—NR"R'" end group or a —C(=S)—NR'—NR"-linking group, as these phrases are defined hereinabove, where R', R" and R" are as defined herein.

As used herein, the term "alkylene glycol" describes a —O—$[(CR'R")_z—O]_y$—R'" end group or a —O—$[(CR'R")_z—O]_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo (alkylene glycol).

The term "silanol" describes a —Si(OH)R'R" group, or —$Si(OH)_2$R' group or —$Si(OH)_3$ group, with R' and R" as described herein.

The term "silyl" describes a —SiR'R"R'" group, with R', R" and R'" as described herein.

As used herein, the term "urethane" or "urethane moiety" or "urethane group" describes a Rx-O—C(=O)—NR'R" end group or a —Rx-O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

Herein throughout, whenever the phrase "weight percent", or "% by weight" or "% wt.", is indicated in the context of embodiments of a formulation (e.g., a modeling formulation), it is meant weight percents of the total weight of the respective uncured formulation.

Herein, an "ethoxylated" material describes an acrylic or methacrylic compound which comprises one or more alkylene glycol groups, or, preferably, one or more alkylene glycol chains, as defined herein. Ethoxylated (meth)acrylate materials can be mono-functional, or, preferably, multi-functional, namely, di-functional, tri-functional, tetrafunctional, etc.

In multi-functional materials, typically, each of the (meth) acrylate groups are linked to an alkylene glycol group or chain, and the alkylene glycol groups or chains are linked to one another through a branching unit, such as, for example, a branched alkyl, cycloalkyl, aryl (e.g., Bisphenol A), etc.

In some embodiments, the ethoxylated material comprises at least one, or at least two ethoxylated group(s), that is, at least one or at least two alkylene glycol moieties or groups. Some or all of the alkylene glycol groups can be linked to one another to form an alkylene glycol chain. For example, an ethoxylated material that comprises 30 ethoxylated groups can comprise a chain of 30 alkylene glycol groups linked to one another, two chains, each, for example, of 15 alkylene glycol moieties linked to one another, the two chains linked to one another via a branching moiety, or three chains, each, for example, of 10 alkylene glycol groups linked to one another, the three chains linked to one another via a branching moiety. Shorter and longer chains are also contemplated.

The ethoxylated material can comprise one, two or more alkylene glycol chains, of any length.

The term "branching unit" as used herein describes a multi-radical, preferably aliphatic or alicyclic group. By "multi-radical" it is meant that the unit has two or more attachment points such that it links between two or more atoms and/or groups or moieties.

In some embodiments, the branching unit is derived from a chemical moiety that has two, three or more functional groups. In some embodiments, the branching unit is a branched alkyl or a cycloalkyl (alicyclic) or an aryl (e.g., phenyl) as defined herein.

Herein throughout, "Tg" of a material refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg (low) and the highest temperature of the Tg range is referred to herein as Tg (high).

Herein throughout, whenever a curable material is defined by a property of a hardened material obtained therefrom, it is to be understood that this property is for a hardened material obtained from this curable material per se.

Herein throughout, unless otherwise indicated, viscosity values are provided for a viscosity of a material or a formulation when measured at 25° C. on a Brookfield's viscometer. Measured values are provided in centipoise units, which correspond to mPa·second units.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing energy, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling formulations, and can be dispensed such that different parts of the object are made, upon curing, of different cured modeling formulations or different combinations thereof, and hence are made of different cured modeling materials or different mixtures of cured modeling materials.

The formulations forming the building material (modeling material formulations and support material formulations) comprise one or more curable materials, which, when exposed to curing energy, form hardened (cured) material.

The formulations forming the building material (modeling material formulations and support material formulations) are also referred to herein as curable formulations (e.g., a curable modeling material formulation or a curable support material formulation).

Herein throughout, a "curable material" is a compound (typically a monomeric or oligomeric compound, yet optionally a polymeric material) which, when exposed to a curing condition (e.g., curing energy), as described herein, solidifies or hardens to form a cured material. Curable materials are typically polymerizable materials, which undergo polymerization and/or cross-linking when exposed to a suitable energy source.

A curable material, according to the present embodiments, also encompasses materials which harden or solidify (cure) without being exposed to a curing energy, but rather to another curing condition (for example, upon exposure to a chemical reagent or simply upon exposure to the environment).

The terms "curable" and "solidifiable" as used in the following examples are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to curing energy (e.g., radiation), it hardens (cured) by any one, or combination, of chain elongation and cross-linking.

In some of any of the embodiments described herein, a curable material is a monomer or a mixture of monomers which can form a polymeric material upon a polymerization reaction, when exposed to curing energy at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to curing energy at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively (also referred to herein as featuring a functionality of 2, 3, or 4, etc.). The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to curing energy and/or act as cross-linkers.

Experimental Methods

Tear Resistance (TR) was determined in accordance with ASTM D 624 and is expressed by N/m units.

Shore A hardness was determined using a Shore A durometer, in accordance with ASTM-2240.

Printability was determined by inspecting formulation's compatibility with a 3D-inkjet system (e.g., as described in FIG. 1A or FIGS. 1B-D; and/or a system equipped with a LED source of curing energy), in terms of viscosity, reactivity, jettability, etc.

Curling and deformation were visually inspected (see, for example, FIGS. 7A-B).

Formulations were prepared by mixing all components at room temperature unless otherwise indicated. Powder components such as photoinitiators were dissolved at 85 degrees for 30 minutes.

Viscosity was measured using a Brookfield viscometer, and is presented in centipoises units, which correspond to mPa-second.

Surface tension was measured using a Kruss K6 Force Tensiometer, and is presented in Dyne/cm units.

Adhesion was measured as described hereinabove for testing procedure 607 and is expressed as the maximal force (N/cm) required for detachment.

Jettability was evaluated, for example, by recording the jetting pattern using a fast camera and analytical weight, and/or by using, for example, a jetting station which tests jetting parameters relevant to the printing process.

Example 1

Adhesion Tests of Aged Samples

Figure 9A:
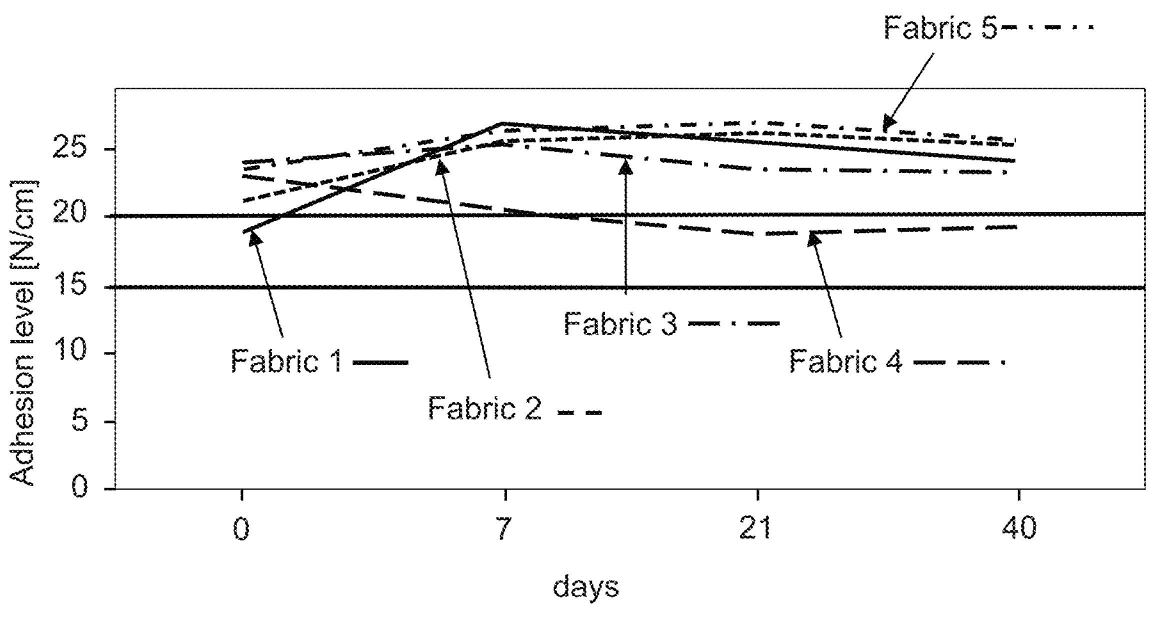
FIG. 9A-B shows results of adhesion level tests as obtained in experiments performed according to some embodiments of the present invention.
Figure 9B:
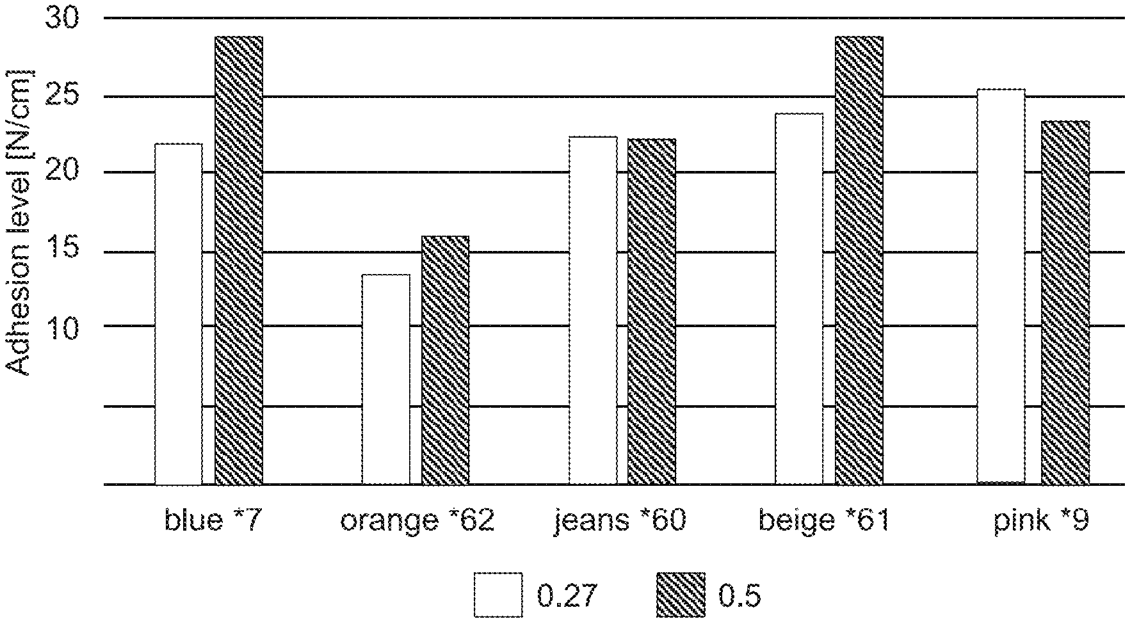

The protocols described above with reference to FIGS. 6A-C were applied and the adhesion level was measured. FIG. 9A shows results of adhesion levels and stability of the adhesion for five different types of fabrics, using the priming formulation described in Example 2, below. For Fabric Nos. 1-4 (Blue, Orange, Jeans and Beige, respectively), the adhesive structure was formed by method 640, and for Fabric No. 5 (Pink), the adhesive structure was formed by method 620. As shown, an adhesion level of more than 15 N/cm was achieved for all tested fabrics. The stability was assessed by means of accelerating aging technique. It was found that the same adhesion level can be maintained for a period of at least 2 years. FIG. 9B presents the adhesion level of an exemplary formulation as described in Example 2 below, when deposited at different thicknesses of the adhesive material (structure) on the various tested fabrics, as identified in FIG. 9A.

Figure 10:
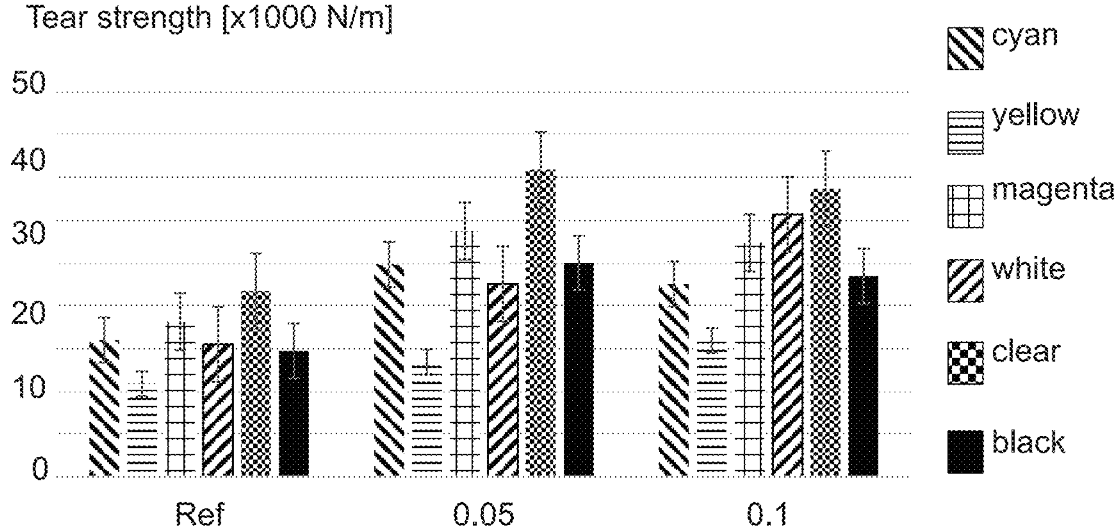
FIG. 10 shows results of an experiment directed to investigate the effect of a coating on a tear resistance of a printed object, as obtained in experiments performed according to some embodiments of the present invention.

FIG. 10 shows results of an experiment directed to investigate the effect of the coating on the tear resistance of the object. Tear resistance measurements were taken for six different types of modeling materials that were printed on adhesive structures formed by protocols described above with reference to FIGS. 6A-C. The objects were coated using the same formulation that was used for forming the adhesive structures. Shown results for coating thicknesses of 0.05 mm and 0.1 mm, compared to a reference case in which no coating was applied. The modeling materials used in these experiments include the flexible modeling materials described in Example 3, below. As shown, the coating improves the tear resistance for all types of modeling materials.

Example 2

Additive (e.g., Priming and/or Coating) Formulations

This Example describes an exemplary curable additive formulation which can be used in combination with a modeling material formulation as described herein, and which is suitable for use, both as a priming formulation providing upon curing a priming material that forms the adhesion structure, and as a coating formulation providing upon curing a coating material forming a solidified coating.

The exemplary additive formulations can serve as curable adhesive additive formulation, which is dispensed from the printing heads and form a configured pattern of an adhesive material that promotes adhesion of the modeling material formed of subsequently dispensed modeling material formulation(s), and which can further serve as a coating formulation, which is dispensed from the printing heads subsequent to the formation of a model object by dispensing modeling material formulation(s), and form a configured pattern of a coating material that improves properties of the printed object such as tear resistance and durability (in terms, of e.g., maintaining color of the object, withstanding washing, etc.).

The exemplary additive formulation includes curable materials that feature functional groups that may interact with surface functional groups of common fabrics, preferably polar functional groups that may interact (e.g., via hydrogen bond formation) with hydroxy groups that are typically present on fabric's surfaces, and which are further characterized by Tg lower than 100, or lower than 80, or lower than 50, ° C., so as to provide a hardened material which exhibits flexibility that is suitable for application onto fabrics.

Exemplary such materials can be collectively represented by Formula I:

Formula I

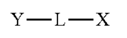

wherein Y is a terminal group and can be, for example, an alkyl, including linear and branched, substituted or unsubstituted alkyl, an aryl, a heteroaryl, a cycloalkyl, a heteroalicyclic, hydroxy, alkoxy, aryloxy, and amine; X is a polymerizable group, preferably a (meth)acrylate group as described herein, and L is a hydrocarbon of 2 to 10, preferably 2 to 8, or 2 to 6, carbon atoms in length, which is substituted by at least one hydroxy group and is optionally substituted by one or more heteroatoms that can form hydrogen bonds with hydroxy groups, for example, O heteroatoms.

When X is a (meth)acrylate group, such exemplary materials can be collectively represented by Formula Ia:

Formula Ia

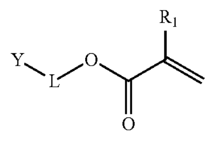

wherein Y and L are as defined herein and $R_1$ is hydrogen, in case of an acrylate polymerizable moiety, or methyl, in case of a methacrylate polymerizable moiety.

As an exemplary curable material, a hydrophilic mono-functional epoxy (meth)acrylate material that features a hydroxy group, such as 2-Hydroxy-3-phenoxypropyl acrylate, which is marketed under the tradename DA-141, was used. This material has the following structure:

DA-141

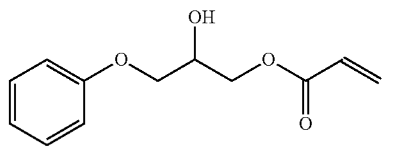

The additive formulation was selected as exhibiting a desirable performance, that is, sufficient adhesion level to fabrics, of at least 20 N/cm and/or the provision of a sufficient tear resistance to the coated object, of at least 10,000 N/m and should further include jettability (e.g., viscosity of 15-30, preferably 15-25 or 15-20 centipoises (mPa·second) at the jetting temperature, e.g., 70° C.; surface tension of 20-40, preferably 20-30, more preferably of 26-30 at the jetting temperature).

In addition, the additive formulation was designed as suitable for use in a system as described in FIG. 1A or in FIGS. 1B-D, and which comprises LED irradiation source (e.g., at a 395 nm wavelength), and preferably as biocompatible.

According to some of any of the embodiments described herein, the additive formulation is characterized by one or more of a viscosity in a range of 15 to 30, or 15 to 25, or 15 to 20 centipoises; a surface tension is a range of from 20 to 40, preferably from 20 to 30, more preferably 26 to 30, or 26 to 28 Dyne/cm; and an adhesion level to a respective fabric of at least 20 N/cm.

According to some of any of the embodiments described herein, the additive formulation is an adhesive (priming) formulation, which provides, when hardened, an adhesive material or structure on the fabric.

According to some of any of the embodiments described herein, the additive formulation is a coating or finishing formulation, which provides, when hardened, a coating of the object or a part thereof.

According to some of any of the embodiments described herein, the additive formulation is both an adhesive (priming) formulation, which provides, when hardened, an adhesive material or structure on the fabric, and a coating or finishing formulation, which provides, when hardened, a coating of the object or a part thereof.

According to some of any of the embodiments described herein, the additive formulation comprises a combination of one or more mono-functional curable material(s) and one or more multi-functional curable material(s).

According to some of any of the embodiments described herein, the one or more mono-functional curable materials comprise at least one mono-functional curable material featuring at least one polar group that is capable of interacting with surface functional groups in the fabric and Tg lower than 50° C.

According to some of any of the embodiments described herein, the additive formulation comprises a combination of one or more mono-functional curable material(s) and one or more multi-functional curable material(s).

According to some of any of the embodiments described herein, the one or more mono-functional curable materials comprise at least one mono-functional curable material featuring at least one polar group that is capable of interacting with surface functional groups in the fabric and Tg lower than 50° C.

According to some of these embodiments, an amount of this at least one mono-functional curable material featuring at least one polar group that is capable of interacting with surface functional groups in the fabric and Tg lower than 50° C. from 85 to 90% by weight of the total weight of the formulation.

According to some of any of the embodiments described herein, the one or more multi-functional curable materials comprise at least one multi-functional curable material featuring Tg lower than 50° C.

According to some of these embodiments, an amount of the at least one multi-functional curable material featuring Tg lower than 50° C. is from 10 to 15% by weight of the total weight of the formulation, including any intermediate values and subranges therebetween.

According to some of any of the embodiments of the present invention, the additive formulation comprises at least one mono-functional curable material featuring at least one group that is capable of interacting with surface functional groups in the fabric and Tg lower than 50° C., in an amount of from 85 to 90% by weight of the total weight of the formulation, including any intermediate values and subranges therebetween; and at least one multi-functional curable material featuring Tg lower than 50° C., in an amount of from 10 to 15% by weight of the total weight of the formulation, including any intermediate values and subranges therebetween.

Fabrics typically include a plurality of exposed surface groups, which are typically hydroxy groups or other polar groups, but can also be or include hydrophobic and/or aromatic groups. Groups that are capable of interacting with such surface functional groups typically include groups that are capable of forming transient formation of bond(s), e.g., hydrogen bonds, hydrophobic interactions, aromatic interactions, and like transient bonds, with such functional groups. For example, when the fabric's surface functional groups are hydrophobic, the groups that are capable of interacting with these functional groups can be an alkyl, a cycloalkyl, and aryl, or a hydrocarbon, as defined herein, which are preferably all-carbon groups, and have 2, 3, 4, or more carbon atoms. When the fabric's surface functional groups are aromatic, the groups that are capable of interacting with these functional groups can be or comprise aromatic groups such as aryls and/or heteroaryls, as defined herein, when may interact with the surface groups by aromatic interactions such as π-π stacking. When the fabric's surface functional groups are hydroxy groups or any other polar groups (e.g., carboxylate or amine groups), the groups that are capable of interacting with these functional groups are typically polar groups, that may interact electrostatically with the surface groups, for example, via hydrogen bonding.

According to some embodiments, the at least one mono-functional curable material features at least one polar group that is capable of interacting with surface functional groups in the fabric. Such a material is also referred to herein as "Component A".

The phrase "polar group" describes a charge-polarized group, which is capable of exhibiting transient charge polarization.

Exemplary polar groups typically include one or more electron-donating heteroatoms which form strong hydrogen bonds with surface polar groups. Such heteroatoms include, but are not limited to, oxygen and nitrogen.

Exemplary polar groups include, but are not limited to, an electron-donating heteroatom (e.g., oxygen or nitrogen), a carboxylate, a thiocarboxylate, oxo (=O), a linear amide, hydroxy, a (C1-4)alkoxy, an (C1-4) alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol).

In exemplary embodiments, the mono-functional curable material comprises one or more of a hydroxy group and an electron-donating heteroatom.

According to some embodiments, the one or more mono-functional curable material, are collectively represented by Formula I:

Formula I

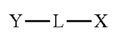

wherein:

Y is a terminal group, optionally and preferably selected from an alkyl, including linear and branched, substituted or unsubstituted alkyl, an aryl, a heteroaryl, a cycloalkyl, a heteroalicyclic, hydroxy, alkoxy, aryloxy, and amine;

X is a polymerizable group, optionally and preferably a (meth)acrylate group (—O—C(=O)—$CR_1$=$CR_2R_3$, wherein $R_1$ is hydrogen for acrylate and methyl for methacrylate and $R_2$ and $R_3$ are typically each hydrogen); and L is a hydrocarbon linking moiety of 2 to 10, preferably being of 2 to 8, or 2 to 6, carbon atoms in length, substituted by at least one polar groups (e.g., hydroxy groups) and optionally interrupted by one or more heteroatoms (e.g., heteroatoms that can form hydrogen bonds with hydroxy groups such as oxygen or nitrogen).

In exemplary embodiments, the at least one mono-functional curable material is a mono-functional (meth)acrylate, such that X is a (meth)acrylate group and the mono-functional curable material is represented by Formula Ia:

Formula Ia

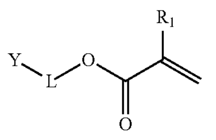

wherein $R_1$ is hydrogen (for acrylate) or alkyl (e.g., methyl, for methacrylate).

In exemplary embodiments, $R_1$ is hydrogen.

In some embodiments, Y is a group that comprises an electron-donating heteroatom, such as a heteroalicyclic, hydroxy, alkoxy, aryloxy, and amine, and in exemplary embodiments, Y is alkoxy or aryloxy (e.g., phenoxy).

In some embodiments, L is a hydrocarbon of 2 to 6 carbon atoms, or of 2 to 4, carbon atoms, substituted by one or more hydroxy group(s).

An exemplary mono-functional acrylate material, Component A, is shown in the Examples section that follows.

According to the embodiments described herein, the additive formulation comprises one or more multi-functional curable material featuring Tg lower than 50° C.

According to some embodiments, the at least one multi-functional curable material comprises a di-functional curable material featuring the indicated Tg.

According to some embodiments, the at least one multi-functional curable material comprises a multi-functional (e.g., di-functional) aliphatic or non-aromatic (e.g., aliphatic or alicyclic) meth (acrylate) featuring the indicated Tg.

According to some embodiments, the at least one multi-functional curable material comprises a multi-functional (e.g., di-functional) aliphatic or non-aromatic (e.g., aliphatic or alicyclic) urethane meth (acrylate) featuring the indicated Tg.

According to some of any of the embodiments described herein, the one or more multi-functional curable material(s) feature Tg of from −20 to 50, or from −20 to 40, or from −20 to 30, or from −20 to 20, or from −10 to 40, or from −10 to 30, or from −10 to 20, or from 0 to 50, or from 0 to 40, or from 0 to 30, ° C., including any intermediate values and subranges therebetween.

An exemplary multi-functional curable material include materials of a family marketed under the tradename Miramer, for example, Miramer PU2100NT.

According to some of any of the embodiments described herein, the additive formulation is a biocompatible formulation, in which all the components, or at least components that are included in an amount higher than 0.1%, or higher than 0.5%, or higher than 1%, are biocompatible.

According to some of any of the embodiments described herein, each of the curable materials in the formulation is a biocompatible material.

According to some of any of the embodiments described herein, each of the curable materials in the formulation is devoid of materials that are not considered biocompatible, for example, are devoid of metallic catalysts (e.g., is catalyst-free), or any other materials that may be present along with the curable material in a residual amount as a result of the synthetic process used for preparing these curable materials.

According to some of any of the embodiments described herein, each of the multi-functional curable materials is a multi-functional (e.g., di-functional) acrylate or a multi-functional (e.g., di-functional) urethane acrylate.

According to some of any of the embodiments described herein, each of the mono-functional curable materials is a mono-functional acrylate.

According to some of any of the embodiments described herein, at least one, or all, of the curable materials in the formulation are photocurable materials (e.g. UV-curable materials such as acrylic materials), and the additive formulation further comprises at least one photoinitiator (Component J).

According to some of any of the embodiments described herein, an amount of the photoinitiator ranges from 1 to 3, % by weight of the total weight of the formulation, including any intermediate values and subranges therebetween.

According to some of any of the embodiments described herein, the photoinitiator(s) comprises, or consists essentially of, a phosphine oxide-type (e.g., mono-acrylated (MAPO) or bis-acrylated phosphine oxide-type (BAPO) photoinitiator.

Exemplary monoacyl and bisacyl phosphine oxides include, but are not limited to, 2,4,6-trimethylbenzoyldiphenyl phosphine oxide, bis(2,4,6-trimethylbenzoyl)phenylphosphine oxide, dibenzoylphenylphosphine oxide, bis (2,6-dimethoxybenzoyl)phenyl phosphine oxide, tris(2,4-dimethylbenzoyl) phosphine oxide, tris(2-methoxybenzoyl) phosphine oxide, 2,6-dimethoxybenzoyldiphenyl phosphine oxide, 2,6-dichlorobenzoyldiphenyl phosphine oxide, 2,3,5,6-tetramethylbenzoyldiphenyl phosphine oxide, benzoyl-bis(2,6-dimethylphenyl)phosphonate, and 2,4,6-trimethylbenzoylethoxyphenyl phosphine oxide. Commercially available phosphine oxide photoinitiators capable of free-radical initiation when irradiated at wavelength ranges of greater than about 380 nm to about 450 nm include 2,4,6-trimethylbenzoyldiphenyl phosphine oxide (TPO), bis(2,4,6-trimethylbenzoyl)phenyl phosphine oxide (marketed as IRGACURE® 819), bis(2,6-dimethoxybenzoyl)-(2,4,4-trimethylpentyl)phosphine oxide (marketed as CGI 403), a 25:75 mixture, by weight, of bis(2,6-dimethoxybenzoyl)-2,4,4-trimethylpentyl phosphine oxide and 2-hydroxy-2-methyl-1-phenylpropan-1-one (marketed as IRGACURE® 1700), a 1:1 mixture, by weight, of bis(2,4,6-trimethylbenzoyl)phenyl phosphine oxide and 2-hydroxy-2-methyl-1-phenylpropane-1-one (marketed as DAROCUR® 4265), and ethyl 2,4,6-trimethylbenzylphenyl phosphinate (LUCIRIN LR8893X).

According to some of any of the embodiments described herein, the photoinitiator(s) comprises, or consists essentially of, a bis-acrylated phosphine oxide-type (BAPO) photoinitiator.

In an exemplary embodiments, the photoinitiator is or comprises bis(2,4,6-trimethylbenzoyl)phenyl phosphine oxide (marketed as IRGACURE® 819).

In an exemplary embodiments, the photoinitiator is devoid of a mono-acrylated (MAPO)phosphine oxide-type photoinitiator, and is some embodiments, it is devoid of 2,4,6-trimethylbenzoyldiphenyl phosphine oxide (marketed as TPO).

According to some of any of the embodiments described herein, the additive formulation further comprises additional, non-curable components, such as, for example, inhibitors, surfactants, dispersants, colorants (coloring agents), stabilizers, and the like. Commonly used surfactants, dispersants, colorants and stabilizers are contemplated. Exemplary concentrations of each component, if present, range from about 0.01 to about 1, or from about 0.01 to about 0.5, or from about 0.01 to about 0.1, weight percent, of the total weight of the formulation containing same, including any intermediate values and subranges therebetween. Exemplary components are described hereinafter.

In some of any of the embodiments described herein, the formulation comprises a curing inhibitor, that is, an agent that inhibits or reduces an amount of the curing in the absence of a curing condition, which is also referred to herein as Component I. In some embodiments, the inhibitor is a free radical polymerization inhibitor. In some embodiments, an amount of an inhibitor (e.g., Component I, e.g., a free radical inhibitor) ranges from 0.01 to 2, or from 0.01 to 1, or from 0.05 to 0.5, or from 0.1 to 0.2, weight percent, including any intermediate values and subranges therebetween, depending on the type of inhibitor used. Commonly used inhibitors, such as radical inhibitors, are contemplated.

According to some of any of the embodiments described herein, the additive formulation further comprises an inhibitor (Component I), as described herein, for example, a phenol-type inhibitor or any other inhibitor that is commonly used in medical devices or applications and/in food products.

According to some of any of the embodiments described herein, an amount of the inhibitor ranges from 0.05 to 0.5, % by weight, of the total weight of the formulation, including any intermediate values and subranges therebetween.

In exemplary embodiments, a free radical inhibitor such as are those of the Genorad™ family (e.g., Genorad 20).

In exemplary embodiments, such a free radical inhibitor is used in an amount of from 0.1 to 3, or from 0.1 to 2, or from 0.1 to 1, or from 0.1 to 0.5, weight percent, including any intermediate values and subranges therebetween.

According to some of any of the embodiments described herein, the additive formulation further comprises one or more dispersant or surfactant (Component H).

According to some of any of the embodiments described herein, an amount of the dispersant ranges from 0.01 to 1, or from 0.1 to 0.5, % by weight, of the total weight of the formulation, including any intermediate values and subranges therebetween.

Exemplary dispersants and surfactants are those marketed as BYK surface additives.

According to some of these embodiments, the dispersant is such that features curable groups, preferably (meth)acrylic groups.

According to some of any of the embodiments described herein, the dispersant is a multi-functional (e.g., di-functional) aliphatic silicon (meth)acrylate.

According to some of any of the embodiments described herein, the dispersant is a di-functional aliphatic silicon (meth)acrylate.

According to some of any of the embodiments described herein, the dispersant is a multi-functional (e.g., di-functional) aliphatic silicon acrylate.

According to some of any of the embodiments described herein, the dispersant is a di-functional aliphatic silicon acrylate.

According to some of any of the embodiments described herein, the dispersant has an average MW of at least 1,000, or at least 2,000, or at least 3,000 grams/mol, and is considered as an oligomeric material.

According to some of any of the embodiments described herein, the dispersant is a multi-functional (e.g., di-functional) aliphatic silicon (meth)acrylate, having an average MW of at least 1,000 grams/mol as described herein.

According to some of any of the embodiments described herein, the dispersant is a di-functional aliphatic silicon (meth)acrylate, having an average MW of at least 1,000 grams/mol as described herein.

According to some of any of the embodiments described herein, the dispersant is a multi-functional (e.g., di-functional) aliphatic silicon acrylate, having an average MW of at least 1,000 grams/mol as described herein.

According to some of any of the embodiments described herein, the dispersant is a di-functional aliphatic silicon acrylate, having an average MW of at least 1,000 grams/mol as described herein.

According to some of any of the embodiments described herein, the dispersant features, when hardened, low Tg, preferably lower than 0, or lower than −20, or lower than −50, ° C.

According to some of any of the embodiments described herein, an amount of the dispersant ranges from 0.1 to 0.5, % by weight, of the total weight of the formulation, including any intermediate values and subranges therebetween.

According to some of any of the embodiments described herein, the additive formulation is a clear (e.g., transparent), colorless formulation, which is devoid of a coloring agent or pigment.

According to some of any of the embodiments described herein, the additive formulation further comprises one or more coloring agent(s) or pigments (Component P).

The coloring agent can be a pigment or a dye and is preferably a pigment.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nano-sized carbon black.

In some embodiments, combinations of white and color pigments are used to prepare colored cured materials.

According to some of any of the embodiments described herein, the coloring agent comprises a mixture of a pigment and at least one (meth)acrylic material, such that the pigment is introduced to the formulation within this mixture.

According to some of any of the embodiments described herein, the pigment is a white pigment and the formulation provides a white hardened material.

According to some of any of the embodiments described herein, the coloring agent comprises a mixture of a white pigment and one or more curable materials such as (meth) acrylic materials, such that the pigment is introduced to the formulation within this mixture.

According to some of these embodiments, an amount of the white pigment in the mixture ranges from 20 to 50% by weight of the total weight of the mixture, including any intermediate values and subranges therebetween.

According to some of these embodiments, an amount of the coloring agent, which is a mixture of a white pigment and at least one (meth)acrylic material ranges from 1 to 5% by weight of the total weight of the formulation.

According to some of any of the embodiments described herein, the pigment is a cyan pigment and the formulation provides a cyan hardened material.

According to some of any of the embodiments described herein, the coloring agent comprises a mixture of a cyan pigment and one or more curable materials such as (meth) acrylic materials, such that the cyan pigment is introduced to the formulation within this mixture.

According to some of these embodiments, an amount of the cyan pigment in the mixture ranges from 0.01 to 1, or from 0.05 to 0.5, or from 0.1 to 0.2, % by weight of the total weight of the mixture, including any intermediate values and subranges therebetween.

According to some of these embodiments, an amount of the coloring agent, which is a mixture of a cyan pigment and at least one (meth)acrylic material ranges from 0.1 to 1% by weight of the total weight of the formulation, including any intermediate values and subranges therebetween.

According to some of any of the embodiments described herein, the pigment is a yellow pigment and the formulation provides a yellow hardened material.

According to some of any of the embodiments described herein, the coloring agent comprises a mixture of a yellow pigment and one or more curable materials such as (meth) acrylic materials, such that the yellow pigment is introduced to the formulation within this mixture.

According to some of these embodiments, an amount of the yellow pigment in the mixture ranges from 0.01 to 1, or from 0.05 to 0.5, or from 0.1 to 0.2, % by weight of the total weight of the mixture, including any intermediate values and subranges therebetween.

According to some of these embodiments, an amount of the coloring agent, which is a mixture of a yellow pigment and at least one (meth)acrylic material ranges from 0.1 to 1% by weight of the total weight of the formulation.

According to some of any of the embodiments described herein, the pigment is a magenta pigment and the formulation provides a magenta hardened material.

According to some of any of the embodiments described herein, the coloring agent comprises a mixture of a magenta pigment and one or more curable materials such as (meth) acrylic materials, such that the magenta pigment is introduced to the formulation within this mixture.

According to some of these embodiments, an amount of the magenta pigment in the mixture ranges from 0.01 to 1, or from 0.05 to 0.5, or from 0.1 to 0.2, % by weight of the total weight of the mixture, including any intermediate values and subranges therebetween.

According to some of these embodiments, an amount of the coloring agent, which is a mixture of a magenta pigment and at least one (meth)acrylic material ranges from 0.1 to 1% by weight of the total weight of the formulation, including any intermediate values and subranges therebetween.

According to some of any of the embodiments described herein, the formulation comprises one or more of a white, magenta, cyan, and yellow coloring agents, and in some of these embodiments, each pigment is introduced to the formulation in a mixture with curable materials as described herein.

According to some of any of the embodiments described herein, the coloring agent further comprises a pigment dispersant (Component Dp). Preferred pigment dispersants are such that has a plurality of groups that feature an affinity to the pigment.

According to some of any of the embodiments described herein, the additive formulation comprises Components H, I, and J, as described herein in any of the respective embodiments. An exemplary such a formulation is a clear colorless formulation, that is devoid of a coloring agent.

According to some of any of the embodiments described herein, the additive formulation comprises Components H, I, J and P and optionally Dp, as described herein in any of the respective embodiments. An exemplary such a formulation is a white formulation that comprises a white pigment as described herein.

According to some of any of the embodiments described herein, the additive formulation comprises Components H, I, J, P and optionally Dp, as described herein in any of the respective embodiments.

Example 3

Flexible Modeling Material

An object according to the present embodiments is such that at least a part or a portion thereof is made of a flexible material, and is also referred to herein as "an object made of a flexible material". The object may be such that several parts or portions thereof are made of a flexible material, or such that is entirely made of a flexible material. The flexible material can be the same or different in the different parts or portions, and, for each part, portion or the entire object made of a flexible material, the flexible material can be the same or different within the portion, part or object. When different flexible materials are used, they can differ in their chemical composition and/or mechanical properties and/or visual properties (e.g., color, transparency, etc.), as is further explained hereinafter.

An exemplary modeling material formulation is such that exhibits desirable Shore A hardness values (e.g., 70-100) and printability, and preferably provides biocompatible hardened materials that can be suitable for 3D printing on fabrics such as garment fabrics.

The exemplary modeling material formulation includes materials that are devoid of elements that may adversely affect the biocompatibility of the hardened material.

The exemplary formulation is suitable for use in a system as described in FIG. 1A or FIGS. 1B-D, and which comprises LED irradiation source (e.g., at a 395 nm wavelength).

The exemplary modeling material formulation is also referred to herein as "modeling formulation" or "flexible formulation" or "flexible modeling material formulation" or "modeling material formulation that provides, when hardened, a flexible material", and other diversions thereof.

The modeling material formulation comprises a combination of curable materials, as defined herein, and is therefore a curable formulation, which, upon exposure to a curing condition, as defined herein, is hardened or solidifies.

The modeling material formulation of the present embodiments has been designed as suitable for forming, by additive manufacturing (e.g., 3D inkjet printing) of three-dimensional objects on fabrics, and provides, when hardened, a flexible material.

According to some of any of the embodiments described herein, the modeling material formulation is such that the hardened material formed therefrom is characterized by mechanical properties that correspond to a flexible material and/or meet the requirements of materials that are printed in a fabric. Such properties include, for example, suitable Shore A hardness (e.g., between 80 and 100 or between 80 and 90), and/or high Tear resistance (e.g., higher than 10,000, or higher than 12,000, or higher than 15,000 N/m, for example, from 10,000 to 25,000 N/m).

According to some embodiments, the modeling material formulation is such that provides, when hardened, one or more of:

- Tg, as defined herein, lower than 50° C., e.g., of from 0 to 50° C., or from 0 to 45, or from 0 to 40, or from 0 to 30, or from 10 to 40, or from 20 to 40, or from 10 to 30, or from 10 to 30, ° C., including any intermediate values and subranges therebetween;
- Shore A hardness, when determined as defined herein, of at least 80, for example, of from 80 to 120, or from 80 to 100, preferably of from 80 to 90; and
- Tear resistance of at least 10,000, or of at least 12,000, or of at least 15,000 N/m, for example, from 10,000 to 25,000 N/m, or from 12,000 to 25,000 N/m, or from 15,000 to 25,000 N/m, including any intermediate values and subranges therebetween.

According to some of any of the embodiments described herein, the modeling material formulation is a biocompatible formulation, in which all the components, or at least components that are included in an amount higher than 0.1%, or higher than 0.5%, or higher than 1%, are biocompatible.

According to some of any of the embodiments described herein, each of the curable materials in the formulation is a biocompatible material.

According to some of any of the embodiments described herein, each of the curable materials in the formulation is devoid of materials that are not considered biocompatible, for example, are devoid of metallic catalysts (e.g., is catalyst-free), or any other materials that may be present along with the curable material in a residual amount as a result of the synthetic process used for preparing these curable materials.

The modeling material formulation of some of the present embodiments comprises a combination of mono-functional and multi-functional materials that feature low Tg, e.g., lower than 150, or lower than 100, ° C.

According to some of any of the embodiments of the present invention, a total amount of the mono-functional and multi-functional materials that feature low Tg as described herein, is at least 60, or at least 65, or at least 70, or at least 75, or at least 80, or at least 85, or even at least 90, %, by weight, of the total weight of the formulation, from example, in a total amount of from 60 to 95, or from 60 to 90, or from 70 to 90, or from 70 to 95, or from 80 to 95, or from 80 to 90, or from 60 to 85, or from 60 to 80, or from 70 to 85, or from 70 to 80, % by weight of the total weight of the formulation, including any intermediate values and subranges therebetween.

According to some of any of the embodiments described herein, the modeling material formulation comprises:

- at least one mono-functional curable material featuring Tg lower than 150° C., in a total amount of from 40 to 60% by weight of the total weight of the formulation, including any intermediate values and subranges therebetween;
- at least one multi-functional curable material featuring Tg higher than 100, or higher than 150, ° C., in an amount of from 4 to 10% by weight of the total weight of the formulation, including any intermediate values and subranges therebetween; and
- at least one multi-functional curable material featuring Tg lower than 150, or lower than 100, ° C., in a total amount of 25-35% by weight of the total weight of the formulation, including any intermediate values and subranges therebetween.

Mono-Functional Curable Materials:

According to some of any of the embodiments described herein, the formulations comprises one or more mono-functional curable materials, each featuring Tg lower than 150° C.

According to some of any of the embodiments described herein, the formulations comprises two or more mono-functional materials.

According to some of these embodiments, one or more of the mono-functional curable materials comprise(s) at least a first mono-functional curable material which features Tg of from 50 to 150° C., which is also referred to herein as Component A1*, and one or more other mono-functional curable material(s) comprise(s) at least a second mono-functional curable material which features Tg lower than 50, or lower than 20, ° C., which is also referred to herein as Component A2* and/or B*.

According to some of any of the embodiments described herein, the formulation comprises one (or more) of a first mono-functional curable material which features Tg of from 50 to 150° C. (Component A1*); and two or more of a second mono-functional curable material which features Tg lower than 50, or lower than 20, ° C. (Components A2* and B*).

According to some of any of the embodiments described herein, each of the one or more mono-functional curable materials as described herein, is a mono-functional (meth) acrylate.

According to some of any of the embodiments described herein, each of the mono-functional materials has an average molecular weight lower than 1,000 grams/mol or lower than 500 grams/mol.

According to some of any of the embodiments described herein, the one or more mono-functional curable materials comprise one or more of a first mono-functional (meth) acrylate, which features Tg of from 50 to 150° C., which is also referred to herein as Component A1*; and one or more of a second mono-functional (meth)acrylate, which features Tg lower than 50, or lower than 20, ° C., which is also referred to herein as Component A2*.

According to some embodiments, the first mono-functional curable material as described herein, e.g., the first mono-functional (meth)acrylate, or Component A1*, is a hydrophobic material, as described herein.

According to some embodiments, the second mono-functional curable material as described herein, e.g., the second mono-functional (meth)acrylate, or Component A2*, is a hydrophilic and/or amphiphilic material, as described herein.

As used herein throughout, the term "hydrophilic" describes a physical property of a material or a portion of a material (e.g., a chemical group in a compound) which accounts for transient formation of bond(s) with water molecules, typically through hydrogen bonding.

Hydrophilic materials dissolve more readily in water than in oil or other hydrophobic solvents. Hydrophilic materials can be determined by, for example, as having Log P lower than 0.5, when Log P is determined in octanol and water phases.

Hydrophilic materials can alternatively, or in addition, be determined as featuring a lipophilicity/hydrophilicity balance (HLB), according to the Davies method, of at least 10, or of at least 12.

As used herein throughout, the term "amphiphilic" describes a property of a material that combines both hydrophilicity, as described herein for hydrophilic materials, and hydrophobicity or lipophilicity, as defined herein for hydrophobic materials.

Amphiphilic materials typically comprise both hydrophilic groups as defined herein and hydrophobic groups, as defined herein, and are substantially soluble in both water and a water-immiscible solvent (oil).

Amphiphilic materials can be determined by, for example, as having Log P of 0.8 to 1.2, or of about 1, when Log P is determined in octanol and water phases.

Amphiphilic materials can alternatively, or in addition, be determined as featuring a lipophilicity/hydrophilicity balance (HLB), according to the Davies method, of 3 to 12, or 3 to 9.

As used herein throughout, the term "hydrophobic" describes a physical property of a material or a portion of a material (e.g., a chemical group in a compound) which does not form bond(s) with water molecules.

Hydrophobic materials dissolve more readily in oil than in water or other hydrophilic solvents. Hydrophobic materials can be determined by, for example, as having Log P higher than 1, when Log P is determined in octanol and water phases.

Hydrophobic materials can alternatively, or in addition, be determined as featuring a lipophilicity/hydrophilicity balance (HLB), according to the Davies method, lower than 3.

A hydrophilic material or portion of a material (e.g., a chemical group in a compound) is one that is typically charge-polarized and capable of forming hydrogen bonding.

Amphiphilic materials typically comprise one or more hydrophilic groups (e.g., a charge-polarized group), in addition to hydrophobic groups.

A hydrophobic material or portion of a material (e.g., a chemical group in a compound) is one that is typically non-polarized and incapable of forming hydrogen bonding.

Hydrophilic materials or groups, and amphiphilic materials, typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic materials or groups is 10:1 or lower, and can be, for example, 8:1, more preferably 7:1, 6:1, 5:1 or 4:1, or lower. It is to be noted that hydrophilicity and amphiphilicity of materials and groups may result also from a ratio between hydrophobic and hydrophilic moieties in the material or chemical group, and does not depend solely on the above-indicated ratio.

A hydrophilic or amphiphilic material can have one or more hydrophilic groups or moieties. Hydrophilic groups are typically polar groups, comprising one or more electron-donating heteroatoms such as oxygen and nitrogen.

Exemplary hydrophilic groups include, but are not limited to, an electron-donating heteroatom, a carboxylate, a thiocarboxylate, oxo (=O), a linear amide, hydroxy, a (C1-4) alkoxy, an (C1-4)alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

An amphiphilic moiety or group typically comprises one or more hydrophilic groups as described herein and one or more hydrophobic groups, or, can a heteroatom-containing group or moiety in which the ratio of number of carbon atoms to the number of heteroatoms accounts for amphiphilicity.

Hydrophobic groups include, for example, all-carbon groups such as alkyl, alkenyl, alkynyl, aryl, cycloalkyl, and the like.

Monomeric mono-functional (meth)acrylate materials according to the present embodiments can be collectively represented by Formula A:

Formula A

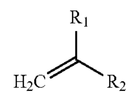

wherein $R_1$ is a carboxylate, —C(=O)—O—Ra, $R_2$ is hydrogen (for acrylate) or methyl (methacrylate), and Ra is an aliphatic, alicyclic or aromatic moiety, which can be hydrophilic or hydrophobic, as described herein.

When the material is an alicyclic monomeric mono-functional (meth)acrylate material(s), Ra can be, for example, an alicyclic moiety such as, but not limited to, isobornyl or any other substituted or unsubstituted cycloalkyl as described herein, or a heteroalicyclic moiety as described herein such as morpholine, tetrahydrofuran, oxalidine, or any other substituted or unsubstituted heteroalicyclic as described herein, wherein the substituent(s), if present for a cycloalkyl or for a heteroalicyclic, do not comprise an aryl or heteroaryl, as defined herein. Exemplary alicyclic monomeric mono-functional acrylate include, but are not limited to isobornylacrylate (IBOA), acryloyl morpholine (ACMO), and a material marketed under the tradename SR-218.

When the material is an aliphatic monomeric mono-functional (meth)acrylate material(s), Ra can be, for example, a substituted or unsubstituted alkyl or alkylene, or any other short hydrocarbon as defined herein, wherein the substituent(s), if present do not comprise an aryl or heteroaryl, as defined herein.

When the material is an aromatic monomeric mono-functional (meth)acrylate material(s), Ra can be, or comprise, for example, an aryl or a heteroaryl, as defined herein, for example a substituted or unsubstituted phenyl, a substituted or unsubstituted naphthalenyl, etc., wherein when substituted, there can be 1, 2, 3 or more substituents each being the same or different, or an alkyl or cycloalkyl substituted by one or more substituted or unsubstituted aryl(s) or substituted or unsubstituted heteroaryl(s), as described herein, for example, substituted or unsubstituted benzyl. Exemplary aromatic monomeric mono-functional (meth)acrylates include, for example, a material marketed as CN131B.

Additional exemplary monomeric mono-functional (meth)acrylates featuring Tg as indicated for Component A2*, or the second mono-functional (meth)acrylate, and which are optionally hydrophilic or amphiphilic, include, without limitation, those marketed under the tradenames SR-256, SR-217, SR-285, SR-336, SR-420 and SR-238.

According to some of any of the embodiments described herein, Component A1* is a mono-functional (meth)acrylate, for example, acrylate, having an alicyclic moiety.

According to some of any of the embodiments described herein, Component A2* is a mono-functional (meth)acrylate, for example, acrylate, having an aromatic moiety (e.g., phenoxy).

According to some of any of the embodiments described herein, one or more or all of the mono-functional (meth) acrylate materials, e.g., Components A1* and A2*, and optionally also Component B*, is such that the MW of the compound is no more than 1,000 grams/mol, or no more than 500 grams/mol.

According to some of any of the embodiments described herein, a total amount of mono-functional acrylate or methacrylates, e.g., Components A1* and A2* as described herein, in the formulation, ranges from 20 to 40, or from 25 to 35, %, by weight of the total weight of the formulation, including any intermediate values and subranges therebetween.

According to some of any of the embodiments described herein, the at least one mono-functional curable material in the formulation comprises at least two types of mono-functional curable materials, which differ from one another by the chemical composition, that is, one type includes one or more materials having Formula A as described herein, that is, this type includes acrylates and/or methacrylates, which are collectively referred to herein as Component A*, and another type includes one or more materials that are urethane acrylates, which are collectively referred to herein as Component B*.

According to some of these embodiments, the at least one mono-functional curable material featuring Tg lower than 150° C. comprises at least one mono-functional (meth) acrylate material featuring Tg lower than 150° C. (e.g., Component A*, which can comprise Components A1* and A2*, or a first and a second mono-functional curable materials, as described herein) and at least one mono-functional urethane (meth)acrylate material featuring Tg lower than 150° C. (e.g., Component B*), as described herein.

According to some of these embodiments, the one or more mono-functional (meth)acrylate materials, Component A*, comprise one mono-functional (meth)acrylate, preferably acrylate, that features Tg of from 50 to 150° C., or from 50 to 100° C., as described herein, and is referred to herein also as Component A1*, or as a first mono-functional curable material or a first mono-functional (meth)acrylate, and one or more mono-functional (meth)acrylate, preferably acrylate, that features Tg lower than 50 or lower than 20, ° C., as described herein, and is referred to herein also as Component A2*, or as a second mono-functional curable material or a second mono-functional (meth)acrylate.

According to some of these embodiments, a total amount of mono-functional (meth)acrylate materials, Component A*, e.g., of Component A1* and Component A2*, or the first and second mono-functional materials, ranges from 20 to 40, or from 25 to 35, %, by weight of the total weight of the formulation, including any intermediate values and subranges therebetween.

According to some of any of these embodiments, an amount of the second mono-functional curable material (e.g., mono-functional (meth)acrylate), which features Tg lower than 50, or lower than 20, ° C., (e.g., Component A2*) ranges from 5 to 10%, by weight, of the total weight of the formulation, including any intermediate values and subranges therebetween.

According to some of any of these embodiments, an amount of the first mono-functional curable material (e.g., mono-functional (meth)acrylate), which features Tg of from 50 to 150, or from 50 to 100, ° C., (e.g., Component A1*) ranges from 20 to 30, or from 20 to 25, %, by weight, of the total weight of the formulation, including any intermediate values and subranges therebetween.

According to some of any of the embodiments described herein, the at least one mono-functional curable material in the formulation comprises at least two types of mono-functional curable materials, which differ from one another by the Tg thereof, that is, one type includes one or more materials each featuring Tg of from 50 to 150° C., or from 50 to 100° C., including any intermediate values and subranges therebetween, and another type includes one or more materials each featuring Tg lower than 50, or lower than 20, C, e.g., in a range of from −50 to 50, or from −20 to 50, or from −50 to 20, or from −20 to 20, ° C., including any intermediate values and subranges therebetween.

According to some of these embodiments, each of the mono-functional curable materials is a (meth)acrylate material, including acrylate, methacrylate and urethane acrylate materials.

According to some of these embodiments, a total amount of the one or more mono-functional curable materials featuring Tg of from 50 to 150° C., or from 50 to 100° C., ranges from 20 to 30, or from 20 to 25, %, by weight of the total weight formulation, including any intermediate values and subranges therebetween.

According to some of these embodiments, a total amount of the one or more mono-functional curable materials featuring Tg lower than 50, or lower than 20, ° C., ranges from 20 to 40, %, or from 25 to 35, %, by weight, of the total weight of the formulation, including any intermediate values and subranges therebetween.

According to some of these embodiments, the one or more mono-functional curable materials featuring Tg lower than 50, or lower than 20, ° C., comprise two or more such mono-functional curable materials; one or more is/are mono-functional acrylate or methacrylate, which features the indicated Tg (e.g., Component A2*) and one or more is/are mono-functional urethane acrylate or urethane methacrylate, which features the indicated Tg (e.g., Component B*).

According to some of any of the embodiments described herein, the at least one mono-functional curable material featuring Tg lower than 150° C. as described herein, comprises one or more, or two or more Component A* and one or more Component B*.

According to some of any of the embodiments described herein, the at least one mono-functional curable material featuring Tg lower than 150° C. as described herein, comprises at least a first mono-functional (meth)acrylate material which features Tg of from 50 to 150° C., as described herein (e.g., Component A1*) and a second mono-functional (meth)acrylate material which features Tg lower than 50, or lower than 20, ° C. (e.g., Component A2*), and one or more mono-functional urethane (meth)acrylate material that features Tg lower than 150° C. as described herein (e.g., Component B*).

According to some of any of the embodiments described herein, the at least one mono-functional urethane (meth) acrylate material (e.g., Component B*) features Tg lower than 20, or lower than 10, or lower than 0, ° C.

According to some of any of the embodiments described herein, the at least one mono-functional urethane (meth) acrylate material (e.g., Component B*) is an aliphatic urethane (meth)acrylate.

According to some of any of the embodiments described herein, the at least one mono-functional urethane (meth) acrylate material (e.g., Component B*) is an aliphatic urethane (meth)acrylate that features Tg lower than 20, or lower than 10, or lower than 0, ° C.

According to some of any of the embodiments described herein, the at least one mono-functional urethane (meth) acrylate material (e.g., Component B*) is a catalyst-free material (e.g., tin-free material).

Exemplary mono-functional urethane (meth)acrylates featuring the indicated Tg and which are usable as Component B*, for example, include those marketed under the tradename Genomer, for example, Genomer 1122, which is also marketed as a tin-free material. Any other mono-functional aliphatic urethane (meth)acrylates are contemplated.

According to some of any of the embodiments described herein, an amount of the at least one mono-functional urethane (meth)acrylate material as described herein in any of the respective embodiments ranges from 20 to 30% by weight of the total weight of the formulation, including any intermediate values and subranges therebetween.

According to some of any of the embodiments described herein, the at least one mono-functional curable material featuring Tg lower than 150° C. is in a total amount of from 40 to 60% by weight, including any intermediate values and subranges therebetween, and comprises:

- a first mono-functional (meth)acrylate material (optionally hydrophobic and/or alicyclic) which features Tg of from 50 to 150° C., as described herein in any of the respective embodiments (e.g., Component A1*);
- a second mono-functional (meth)acrylate material (optionally hydrophilic or amphiphilic and/or aromatic) which features Tg lower than 50, or lower than 20, ° C., as described herein in any of the respective embodiments (e.g., Component A2*); and
- at least one (preferably catalyst-free) mono-functional (preferably aliphatic) urethane (meth)acrylate material features Tg lower than 20, or lower than 10, or lower than 0, ° C., as described herein in any of the respective embodiments (e.g., Component B*).

According to some of any of the embodiments described herein, the at least one mono-functional curable material featuring Tg lower than 150° C. comprises a first mono-functional (meth)acrylate material (optionally hydrophobic and/or alicyclic) which features Tg of from 50 to 150° C., as described herein in any of the respective embodiments (e.g., Component A1*), in an amount of from 10 to 30%, by weight, of the total weight of the formulation, including any intermediate values and subranges therebetween.

According to some of any of the embodiments described herein, the at least one mono-functional curable material featuring Tg lower than 150° C. comprises a second mono-functional (meth)acrylate material (optionally hydrophilic or amphiphilic and/or aromatic) which features Tg lower than 50, or lower than 20, ° C., as described herein in any of the respective embodiments (e.g., Component A2*), in an amount of from 5 to 10%, by weight, of the total weight of the formulation, including any intermediate values and subranges therebetween.

According to some of any of the embodiments described herein, the at least one mono-functional curable material featuring Tg lower than 150° C. comprises at least one (preferably catalyst-free) mono-functional (preferably aliphatic) urethane (meth)acrylate material features Tg lower than 20, or lower than 10, or lower than 0, ° C., as described herein in any of the respective embodiments (e.g., Component B*), in an amount of from 10 to 30%, by weight, of the total weight of the formulation, including any intermediate values and subranges therebetween.

According to some of any of the embodiments described herein, the at least one mono-functional curable material featuring Tg lower than 150° C. is in a total amount of from 40 to 60% by weight, including any intermediate values and subranges therebetween, and comprises:

- a first mono-functional (meth)acrylate material (optionally hydrophobic and/or alicyclic) which features Tg of from 50 to 150° C., as described herein in any of the respective embodiments (e.g., Component A1*), in an amount of from 10 to 30%, by weight, of the total weight of the formulation, including any intermediate values and subranges therebetween;
- a second mono-functional (meth)acrylate material (optionally hydrophilic or amphiphilic and/or aromatic) which features Tg lower than 50, or lower than 20, ° C., as described herein in any of the respective embodiments (e.g., Component A2*), in an amount of from 5 to 10%, by weight, of the total weight of the formulation, including any intermediate values and subranges therebetween; and
- at least one (preferably catalyst-free) mono-functional (preferably aliphatic) urethane (meth)acrylate material features Tg lower than 20, or lower than 10, or lower than 0, ° C., as described herein in any of the respective embodiments (e.g., Component B*), in an amount of from 10 to 30%, by weight, of the total weight of the formulation, including any intermediate values and subranges therebetween.

According to the present embodiments, the modeling material formulation further comprises two or more multi-functional curable materials.

According to some of any of the embodiments described herein, a total amount of all of the multi-functional curable materials is at least 15%, or ranges from 15 to 25%, by weight of the total weight of the formulation, including any intermediate values and subranges therebetween.

The two or more multi-functional curable materials comprise one or more multi-functional curable material(s) featuring higher Tg, e.g., Tg higher than 100° C., or higher than 150° C., which includes, for example, a Component C* as described herein, and one or more multi-functional curable material(s) featuring lower Tg, e.g., Tg lower than 150, or lower than 100, ° C., which includes, for example, a Component D* as described herein.

According to some of any of the embodiments described herein, the at least one multi-functional curable material featuring Tg higher than 100° C., or higher than 150° C., comprises a di-functional curable material.

According to some of any of the embodiments described herein, the at least one multi-functional curable material featuring Tg higher than 100° C., or higher than 150° C., comprises at least one multi-functional (e.g., di-functional) (meth)acrylate (Component C*).

According to some of any of the embodiments described herein, an average molecular weight of the at least one multi-functional curable material featuring Tg higher than 100° C., or higher than 150° C., is lower than 500 grams/mol, and is e.g., in a range of from 200 to 500, or 200 to 400, grams/mol, including any intermediate values and subranges therebetween.

In multifunctional materials, typically, each of the curable (e.g., (meth)acrylate) groups are linked to one another through a linking moiety. The linking moiety can be a branching unit, such as, for example, a linear (in case of a di-functional material) or branched alkyl, cycloalkyl, aryl (e.g., bisphenol A), etc. (in case of di-, tri- and higher functional materials).

The multi-functional (e.g., di-functional) curable material featuring the higher Tg (e.g., Component C*), can be, for example, an aromatic or non-aromatic (e.g., alicyclic or aliphatic), multi-functional (e.g., di-functional) (meth)acrylate, which comprises at least one aromatic moiety or non-aromatic moiety (e.g., alicyclic or aliphatic) linking moiety that connects between the curable groups (e.g., (meth)acrylate groups).

According to some of any of the embodiments described herein, the multi-functional (e.g., di-functional) curable material featuring the higher Tg (e.g., Component C*), is a non-aromatic (e.g., alicyclic or aliphatic, multi-functional (e.g., di-functional) (meth)acrylate, which comprises an alicyclic and/or aliphatic moiety that connects between the curable groups (e.g., (meth)acrylate groups).

In some of these embodiments, the linking moiety is or comprises an all-carbon alicyclic moiety, optionally a poly-alicyclic moiety which comprises 2, 3 or more rings. In some embodiments, the alicyclic moiety is of at least 6, at least 7, at least 8, at least 9 or at least 10, carbon atoms.

In some embodiments, the linking moiety comprises a polyalicyclic moiety as described herein, in which the two or more rings are fused to one another.

An exemplary such multi-functional curable material (e.g., Component C*) is tricyclododecane dimethanol diacrylate (e.g., SR833S and/or SR 368, marketed by Sartomer).

According to some of any of the embodiments described herein, the one or more multi-functional curable material(s) featuring Tg higher than 100° C., or higher than 150° C. (e.g., Component C*), provide(s), when hardened, a transparent material.

According to some of any of the embodiments described herein, the formulation comprises one or more multi-functional (e.g., di-functional) (meth)acrylate(s) featuring Tg higher than 100° C., or higher than 150° C., for example Tg of from 100 to 200, or from 150 to 200, or from 160 to 200, ° C., including any intermediate values and subranges therebetween.

According to some of any of the embodiments described herein, the formulation comprises one or more multi-functional (e.g., di-functional) (meth)acrylate(s) featuring Tg higher than 100° C., or higher than 150° C. (e.g., Component C*), for example Tg of from 100 to 200, or from 150 to 200, or from 160 to 200, ° C., and having a molecular weight lower than 500 grams/mol, as described herein. In some of these embodiments, the multi-functional (e.g., di-functional) curable material is a non-aromatic material, having a non-aromatic linking moiety between the curable groups, and in some embodiments, the linking moiety is an aliphatic or alicyclic moiety. In some of any of these embodiments, the curable material provides, when hardened, a transparent material.

According to some of any of the embodiments described herein, the formulation comprises one or more multi-functional (e.g., di-functional) (meth)acrylate(s) featuring Tg higher than 100° C., or higher than 150° C. (e.g., Component C*), for example Tg of from 100 to 200, or from 150 to 200, or from 160 to 200, ° C., and which provide, when hardened, a transparent material. In some of these embodiments, the multi-functional (e.g., di-functional) curable material is a non-aromatic material, having a non-aromatic linking moiety between the curable groups, and in some embodiments, the linking moiety is an aliphatic or alicyclic moiety.

According to some of any of the embodiments described herein, other one or more multi-functional curable material (s) are included in the formulation, each featuring a lower Tg, namely, Tg lower than 150, preferably lower than 100, ° C. Exemplary such materials are also collectively referred to herein as Component D*.

According to some of any of the embodiments described herein, one or more or each of the at least one multi-functional curable material(s) featuring Tg lower than 150, or lower than 100, ° C., is a di-functional curable material featuring Tg lower than 150, or lower than 100, ° C.

According to some of any of the embodiments described herein, one or more or each of the at least one multi-functional curable material(s) featuring Tg lower than 150, or lower than 100, ° C., is a multi-functional (e.g., di-functional) meth (acrylate).

According to some of any of the embodiments described herein, the formulation comprises two (or more) multi-functional curable materials featuring Tg lower than 150, or lower than 100, ° C. According to some of these embodiments, one of these materials is a first multi-functional curable material featuring Tg lower than 0, or lower than −20, ° C. (such as referred to herein as Component D1*), and a second multi-functional curable material featuring Tg that ranges from 50 to 150, or from 50 to 100, ° C., including any intermediate values and subranges therebetween (such as referred to herein as Component D2*).

According to some of any of the embodiments described herein, the one or more the multi-functional curable material(s) featuring Tg lower than 150, or lower than 100, ° C. (e.g., Component D*, or Component D1* and/or D2*), comprises at least one multi-functional (e.g., di-functional) ethoxylated (meth)acrylate, as described herein.

In ethoxylated multifunctional materials, typically, each of the curable (e.g., (meth)acrylate) groups are linked to an alkylene glycol group or chain, and the alkylene glycol groups or chains either links two curable groups (in case of a di-functional material), or are linked to one another through a linking moiety (in case of d-, tri-, tetra-, etc.

functional materials). The linking moiety can be a branching unit, such as, for example, a linear (in case of a di-functional material) or branched alkyl, cycloalkyl, aryl (e.g., bisphenol A), etc. (in case of di-, tri- and higher functional materials).

According to some of any of the embodiments described herein, one or more, or each, of the multi-functional (e.g., di-functional) ethoxylated (e.g., (meth)acrylate) materials is a multi-functional (e.g., di-functional) aromatic ethoxylated (meth)acrylate, which comprises an aromatic (e.g., bisphenol A) branching unit, as described herein.

According to some of any of the embodiments described herein, the first multi-functional curable material, featuring Tg lower than 0, or lower than −20, ° C. (e.g., Component D1*), is or comprises a multi-functional (e.g., di-functional) ethoxylated aromatic (meth)acrylate featuring at least 10 (e.g. from 10 to 40, or from 20 to 40, including any intermediate values and subranges therebetween) ethoxylated groups. According to some embodiments, this material features Tg between 0 and −50, or between −20 to −50, ° C., including any intermediate values and subranges therebetween.

Exemplary such materials, which are usable as Component D1*, include any ethoxylated aromatic multi-functional materials featuring a bisphenol A branching unit from which two or more alkylene (glycol) chains that comprise altogether 10 or more (e.g., 10 to 40, or 20 to 40) alkylene glycol units that terminate by a curable group (e.g., (meth)acrylate group) extend. Exemplary such compounds are marketed under the tradenames Miramer (e.g., Miramer M2301) or SR9036A. Other ethoxylated aromatic multi-functional (e.g., di-functional) (meth)acrylates are contemplated.

According to some of any of the embodiments described herein, the second multi-functional curable material featuring Tg that ranges from 50 to 150, or from 50 to 100, ° C. (e.g., Component D2*), is or comprises a multi-functional (e.g., di-functional) ethoxylated (meth)acrylate featuring less than 10 (e.g., from 2 to 4) ethoxylated groups, and in some embodiments, it is a multi-functional (e.g., di-functional) aromatic, as described herein, ethoxylated (meth) acrylate featuring less than 10 (e.g., from 2 to 4) ethoxylated groups.

According to some of any of the embodiments described herein, the at least one multi-functional curable material featuring Tg lower than 150, or lower than 100, ° C. (e.g., Component D*), comprises a first multi-functional (e.g., di-functional) ethoxylated aromatic (meth)acrylate featuring at least 10 (e.g. from 10 to 40) ethoxylated groups (e.g., Component D1*), as described herein in any of the respective embodiments, and a second multi-functional (e.g., di-functional) ethoxylated aromatic (meth)acrylate featuring less than 10 (e.g., from 2 to 4) ethoxylated groups (e.g., Component D2)*, as described herein in any of the respective embodiments.

According to some of any of the embodiments described herein, an amount of the multi-functional (e.g., di-functional) ethoxylated (e.g., aromatic) (meth)acrylate featuring at least 10 (e.g. from 10 to 40) ethoxylated groups (e.g., Component D1*) ranges from 10 to 30%, by weight, of the total weight of the formulation, including any intermediate values and subranges therebetween.

According to some of any of the embodiments described herein, an amount of the multi-functional (e.g., di-functional) ethoxylated (e.g., aromatic) (meth)acrylate featuring less than 10 (e.g., from 2 to 4) ethoxylated groups (e.g., Component D2*) ranges from 10 to 20, %, by weight, of the total weight of the formulation, including any intermediate values and subranges therebetween.

According to some of any of the embodiments described herein, an amount of the multi-functional (e.g., di-functional) ethoxylated (e.g., aromatic) (meth)acrylate featuring at least 10 (e.g. from 10 to 40) ethoxylated groups (e.g., Component D1*) ranges from 10 to 30%, by weight, of the total weight of the formulation, including any intermediate values and subranges therebetween; and an amount of the multi-functional (e.g., di-functional) ethoxylated (e.g., aromatic) (meth)acrylate featuring less than 10 (e.g., from 2 to 4) ethoxylated groups (e.g., Component D2*) ranges from 10 to 20, %, by weight, of the total weight of the formulation, including any intermediate values and subranges therebetween.

An exemplary modeling material formulation according to some of the present embodiments, comprises:

- a first mono-functional (meth)acrylate material which features Tg of from 50 to 150° C., as described herein in any of the respective embodiments (e.g., Component A1*);
- a second mono-functional (meth)acrylate material which features Tg lower than 50, or lower than 20, ° C., as described herein in any of the respective embodiments (e.g., Component A2*);
- at least one catalyst-free mono-functional urethane (meth) acrylate material features Tg lower than 20, or lower than 10, or lower than 0, ° C., as described herein in any of the respective embodiments (e.g., Component B*);
- at least one aliphatic multi-functional (e.g., di-functional) (meth)acrylate featuring Tg higher than 100° C., or higher than 150° C., optionally having molecular weight lower than 500 grams/mol, as described herein in any of the respective embodiments (e.g., Component C*);
- at least one multi-functional (e.g., di-functional) ethoxylated aromatic (meth)acrylate featuring at least 10 (e.g. from 10 to 40) ethoxylated groups and Tg lower than 0, or lower than −20, ° C., as described herein in any of the respective embodiments (e.g., Component D1*); and a multi-functional (e.g., di-functional) ethoxylated aromatic (meth)acrylate featuring less than 10 (e.g., from 2 to 4) ethoxylated groups and Tg that ranges from 50 to 100, ° C., as described herein in any of the respective embodiments (e.g., Component D2*).

According to some of any of these exemplary embodiments, an amount of the first mono-functional (meth)acrylate material which features Tg of from 50 to 150° C. (e.g., Component A1*) ranges from 10 to 30%, by weight, of the total weight of the formulation, including any intermediate values and subranges therebetween.

According to some of any of these exemplary embodiments, an amount of the second mono-functional (meth) acrylate material which features Tg lower than 50, or lower than 20, ° C. (e.g., Component A2*), ranges from 5 to 10%, by weight, of the total weight of the formulation, including any intermediate values and subranges therebetween.

According to some of any of these exemplary embodiments, an amount of the at least one catalyst-free mono-functional urethane (meth)acrylate material features Tg lower than 20° C. (e.g., Component B*) ranges from 10 to 30%, by weight, of the total weight of the formulation, including any intermediate values and subranges therebetween.

According to some of any of these exemplary embodiments, an amount of the at least one non-aromatic (e.g., alicyclic) multi-functional (e.g., di-functional) (meth)acrylate featuring Tg higher than 100° C., or higher than 150° C., optionally having molecular weight lower than 500 grams/ mol (e.g., Component C*), ranges from 4 to 10%, by weight of the total weight of the formulation, including any intermediate values and subranges therebetween.

According to some of any of these exemplary embodiments, an amount of the multi-functional (e.g., di-functional) ethoxylated aromatic (meth)acrylate featuring at least 10 (e.g. from 10 to 40) ethoxylated groups (e.g., Component D1*) ranges from 10 to 30%, by weight, of the total weight of the formulation, including any intermediate values and subranges therebetween.

According to some of any of these exemplary embodiments, an amount of the multi-functional (e.g., di-functional) ethoxylated aromatic (meth)acrylate featuring less than 10 (e.g., from 2 to 4) ethoxylated groups (e.g., Component D2*) ranges from 10 to 20, %, by weight, of the total weight of the formulation, including any intermediate values and subranges therebetween.

According to some of any of these exemplary embodiments, an amount of the first mono-functional (meth)acrylate material which features Tg of from 50 to 150° C. (e.g., Component A1*) ranges from 10 to 30%, by weight, of the total weight of the formulation; an amount of the second mono-functional (meth)acrylate material which features Tg lower than 50, or lower than 20, ° C. (e.g., Component A2*), ranges from 5 to 10%, by weight, of the total weight of the formulation; an amount of the at least one catalyst-free mono-functional urethane (meth)acrylate material features Tg lower than 20° C. (e.g., Component B*) ranges from 10 to 30%, by weight, of the total weight of the formulation; an amount of the at least one non-aromatic (e.g., alicyclic) multi-functional (e.g., di-functional) (meth)acrylate featuring Tg higher than 100° C., or higher than 150° C., optionally having molecular weight lower than 500 grams/mol (e.g., Component C*), ranges from 4 to 10%, by weight of the total weight of the formulation; an amount of the multi-functional (e.g., di-functional) ethoxylated aromatic (meth)acrylate featuring at least 10 (e.g. from 10 to 40) ethoxylated groups (e.g., Component D1*) ranges from 10 to 30%, by weight, of the total weight of the formulation; and an amount of the multi-functional (e.g., di-functional) ethoxylated aromatic (meth)acrylate featuring less than 10 (e.g., from 2 to 4) ethoxylated groups (e.g., Component D2*) ranges from 10 to 20, %, by weight, of the total weight of the formulation (all ranges including any intermediate values and subranges therebetween).

According to some of any of the embodiments described herein, each of the multi-functional curable materials is a multi-functional (e.g., di-functional) acrylate.

According to some of any of the embodiments described herein, each of the mono-functional curable materials is a mono-functional acrylate.

According to some of any of the embodiments described herein, at least one, or all, of the curable materials in the formulation are photocurable materials (e.g. UV-curable materials such as acrylic materials), and the modeling material formulation further comprises at least one photoinitiator (Component J*).

According to some of any of the embodiments described herein, an amount of the photoinitiator ranges from 1 to 3, % by weight of the total weight of the formulation, including any intermediate values and subranges therebetween.

According to some of any of the embodiments described herein, the photoinitiator(s) comprises, or consists essentially of, a phosphine oxide-type (e.g., mono-acrylated (MAPO) or bis-acrylated phosphine oxide-type (BAPO) photoinitiator.

Exemplary monoacyl and bisacyl phosphine oxides include, but are not limited to, 2,4,6-trimethylbenzoyldiphenyl phosphine oxide, bis(2,4,6-trimethylbenzoyl)phenylphosphine oxide, dibenzoylphenylphosphine oxide, bis(2,6-dimethoxybenzoyl)phenyl phosphine oxide, tris(2,4-dimethylbenzoyl) phosphine oxide, tris(2-methoxybenzoyl) phosphine oxide, 2,6-dimethoxybenzoyldiphenyl phosphine oxide, 2,6-dichlorobenzoyldiphenyl phosphine oxide, 2,3,5,6-tetramethylbenzoyldiphenyl phosphine oxide, benzoyl-bis(2,6-dimethylphenyl)phosphonate, and 2,4,6-trimethylbenzoylethoxyphenyl phosphine oxide. Commercially available phosphine oxide photoinitiators capable of free-radical initiation when irradiated at wavelength ranges of greater than about 380 nm to about 450 nm include 2,4,6-trimethylbenzoyldiphenyl phosphine oxide (TPO), bis(2,4,6-trimethylbenzoyl)phenyl phosphine oxide (marketed as IRGACURE® 819), bis(2,6-dimethoxybenzoyl)-(2,4,4-trimethylpentyl)phosphine oxide (marketed as CGI 403), a 25:75 mixture, by weight, of bis(2,6-dimethoxybenzoyl)-2,4,4-trimethylpentyl phosphine oxide and 2-hydroxy-2-methyl-1-phenylpropan-1-one (marketed as IRGACURE® 1700), a 1:1 mixture, by weight, of bis(2,4,6-trimethylbenzoyl)phenyl phosphine oxide and 2-hydroxy-2-methyl-1-phenylpropane-1-one (marketed as DAROCUR® 4265), and ethyl 2,4,6-trimethylbenzylphenyl phosphinate (LUCIRIN LR8893X).

According to some of any of the embodiments described herein, the photoinitiator(s) comprises, or consists essentially of, a bis-acrylated phosphine oxide-type (BAPO) photoinitiator.

In an exemplary embodiments, the photoinitiator is or comprises bis(2,4,6-trimethylbenzoyl)phenyl phosphine oxide (marketed as IRGACURE® 819).

In an exemplary embodiments, the photoinitiator is devoid of a mono-acrylated (MAPO)phosphine oxide-type photoinitiator, and is some embodiments, it is devoid of 2,4,6-trimethylbenzoyldiphenyl phosphine oxide (marketed as TPO).

According to some of any of the embodiments described herein, the modeling material formulation further comprises additional, non-curable components, such as, for example, inhibitors, surfactants, dispersants, colorants (coloring agents), stabilizers, and the like. Commonly used surfactants, dispersants, colorants and stabilizers are contemplated. Exemplary concentrations of each component, if present, range from about 0.01 to about 1, or from about 0.01 to about 0.5, or from about 0.01 to about 0.1, weight percent, of the total weight of the formulation containing same. Exemplary components are described hereinafter.

In some of any of the embodiments described herein, the formulation comprises a curing inhibitor, that is, an agent that inhibits or reduces an amount of the curing in the absence of a curing condition, which is also referred to herein as Component I*. In some embodiments, the inhibitor is a free radical polymerization inhibitor. In some embodiments, an amount of an inhibitor (e.g., Component I*, e.g., a free radical inhibitor) ranges from 0.01 to 2, or from 0.01 to 1, or from 0.05 to 0.5, or from 0.1 to 0.2, weight percent, including any intermediate values and subranges therebetween, depending on the type of inhibitor used. Commonly used inhibitors, such as radical inhibitors, are contemplated.

According to some of any of the embodiments described herein, the modeling material formulation further comprises an inhibitor (Component I*), as described herein, for example, a phenol-type inhibitor or any other inhibitor that is commonly used in medical devices or applications and/in food products.

According to some of any of the embodiments described herein, an amount of the inhibitor ranges from 0.05 to 0.5, % by weight, of the total weight of the formulation, including any intermediate values and subranges therebetween.

In exemplary embodiments, a free radical inhibitor such as are those of the Genorad™ family (e.g., Genorad20).

In exemplary embodiments, such a free radical inhibitor is used in an amount of from 0.1 to 3, or from 0.1 to 2, or from 0.1 to 1, or from 0.1 to 0.5, weight percent, including any intermediate values and subranges therebetween.

According to some of any of the embodiments described herein, the modeling material formulation further comprises one or more dispersant or surfactant (Component H*).

According to some of any of the embodiments described herein, an amount of the dispersant ranges from 0.01 to 0.1, % by weight, of the total weight of the formulation, including any intermediate values and subranges therebetween.

Exemplary dispersants and surfactants are those marketed as BYK surface additives.

According to some of any of the embodiments described herein, the modeling material formulation is a clear (e.g., transparent), colorless formulation, which is devoid of a coloring agent or pigment.

According to some of any of the embodiments described herein, the modeling material formulation further comprises one or more coloring agent(s) or pigments (Component P*).

The coloring agent can be a pigment or a dye and is preferably a pigment.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nano-sized carbon black.

In some embodiments, combinations of white and color pigments are used to prepare colored cured materials.

According to some of any of the embodiments described herein, the coloring agent comprises a mixture of a pigment and at least one (meth)acrylic material, such that the pigment is introduced to the formulation within this mixture.

According to some of any of the embodiments described herein, the pigment is a white pigment and the formulation provides a white hardened material.

According to some of any of the embodiments described herein, the coloring agent comprises a mixture of a white pigment and one or more curable materials such as (meth) acrylic materials, such that the pigment is introduced to the formulation within this mixture.

According to some of these embodiments, an amount of the white pigment in the mixture ranges from 20 to 50% by weight of the total weight of the mixture, including any intermediate values and subranges therebetween.

According to some of these embodiments, an amount of the coloring agent, which is a mixture of a white pigment and at least one (meth)acrylic material ranges from 1 to 5% by weight of the total weight of the formulation, including any intermediate values and subranges therebetween.

According to some of any of the embodiments described herein, the pigment is a cyan pigment and the formulation provides a cyan hardened material.

According to some of any of the embodiments described herein, the coloring agent comprises a mixture of a cyan pigment and one or more curable materials such as (meth) acrylic materials, such that the cyan pigment is introduced to the formulation within this mixture.

According to some of these embodiments, an amount of the cyan pigment in the mixture ranges from 0.01 to 1, or from 0.05 to 0.5, or from 0.1 to 0.2, % by weight of the total weight of the mixture, including any intermediate values and subranges therebetween.

According to some of these embodiments, an amount of the coloring agent, which is a mixture of a cyan pigment and at least one (meth)acrylic material ranges from 0.1 to 1% by weight of the total weight of the formulation.

According to some of any of the embodiments described herein, the pigment is a yellow pigment and the formulation provides a yellow hardened material.

According to some of any of the embodiments described herein, the coloring agent comprises a mixture of a yellow pigment and one or more curable materials such as (meth) acrylic materials, such that the yellow pigment is introduced to the formulation within this mixture.

According to some of these embodiments, an amount of the yellow pigment in the mixture ranges from 0.01 to 1, or from 0.05 to 0.5, or from 0.1 to 0.2, % by weight of the total weight of the mixture, including any intermediate values and subranges therebetween.

According to some of these embodiments, an amount of the coloring agent, which is a mixture of a yellow pigment and at least one (meth)acrylic material ranges from 0.1 to 1% by weight of the total weight of the formulation.

According to some of any of the embodiments described herein, the pigment is a magenta pigment and the formulation provides a magenta hardened material.

According to some of any of the embodiments described herein, the coloring agent comprises a mixture of a magenta pigment and one or more curable materials such as (meth) acrylic materials, such that the magenta pigment is introduced to the formulation within this mixture.

According to some of these embodiments, an amount of the magenta pigment in the mixture ranges from 0.01 to 1, or from 0.05 to 0.5, or from 0.1 to 0.2, % by weight of the total weight of the mixture, including any intermediate values and subranges therebetween.

According to some of these embodiments, an amount of the coloring agent, which is a mixture of a magenta pigment and at least one (meth)acrylic material ranges from 0.1 to 1% by weight of the total weight of the formulation, including any intermediate values and subranges therebetween.

According to some of any of the embodiments described herein, the formulation comprises one or more of a white, magenta, cyan, and yellow coloring agents, and in some of these embodiments, each pigment is introduced to the formulation in a mixture with curable materials as described herein.

According to some of any of the embodiments described herein, the coloring agent further comprises a pigment dispersant (Component Dp*). Preferred pigment dispersants are such that has a plurality of groups that feature an affinity to the pigment.

According to some of any of the embodiments described herein, the modeling material formulation comprises Components H*, I*, and J*, as described herein in any of the respective embodiments. An exemplary such a formulation is a clear colorless formulation, that is devoid of a coloring agent.

According to some of any of the embodiments described herein, the modeling material formulation comprises Components H*, I*, J* and P* and optionally Dp*, as described herein in any of the respective embodiments. An exemplary such a formulation is a white formulation that comprises a white pigment as described herein.

According to some of any of the embodiments described herein, the modeling material formulation comprises Components H*, I*, J*, P* and optionally Dp*, as described herein in any of the respective embodiments. Exemplary such formulations are the cyan, magenta and yellow formulation as described herein.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of forming an object on a fabric by three-dimensional printing, the method comprising:

printing on the fabric an adhesion structure having a stack of layers in a configured pattern corresponding to a shape of a bottommost surface of the object, wherein for each layer of said stack said printing comprises dispensing and curing a first formulation along a scanning direction; and printing the object onto said stack by dispensing and curing a building formulation in layers along said direction in configured patterns corresponding to shapes of slices of the object;

wherein for each layer of said stack and each layer of the object, said curing comprising irradiating said layer by creating a pattern of curing radiation having radiation intensity $I_A$ that scans said layer along said direction, wherein said pattern has a shape of a single stripe.

2. The method according to claim 1, comprising irradiating a topmost surface of said object by creating a pattern of curing radiation having radiation intensity $I_B$ that scans said topmost surface along said direction, wherein said pattern has a shape of at least two separated stripes and wherein said intensity $I_B$ is about two times said intensity $I_A$.

3. The method according to claim 1, comprising printing said first formulation also on an outer surface of said object to form a liquid coating, and irradiating said coating by said curing radiation to form a solidified coating.

4. The method according to claim 3, comprising irradiating said coating by creating a pattern of curing radiation having radiation intensity $I_B$ that scans a topmost said topmost surface along said direction, wherein said pattern has a shape of at least two separated stripes and wherein said intensity $I_B$ is about two times said intensity $I_A$.

5. The method according to claim 1, comprising testing adherence level of said object to the fabric.

6. The method according to claim 5, being repeated for different orientations of the fabric on the same side thereof.

7. The method according to claim 5, being repeated for different sides of the fabric.

8. The method according to claim 5, wherein said object comprises two gap-separated stacks of modeling material layers, wherein a bending resistance is higher for said stacks of modeling material layers than for said adhesive material and said fabric.

9. The method according to claim 8, wherein said testing comprises bending said fabric at said gap so as to detach at least one of said stacks of modeling material layers from the fabric at a detachment point bordering said gap.

10. The method according to claim 9, wherein said gap has a piecewise linear shape, and said detachment point is near a breakpoint of said piecewise linear shape.

11. The method according to claim 10, wherein said gap forms an acute angle at said breakpoint.

12. The method according to claim 8, wherein said gap has a curved shape.

13. The method according to claim 8, wherein thicknesses of said stacks of modeling material are larger than a thickness of the adhesion structure.

14. A method of forming an adhesion structure on a fabric by three-dimensional printing, the method comprising:

printing on the fabric a first stack of uncured layers in a configured pattern corresponding to a shape of a bottommost surface of an object, wherein for each layer of said stack said printing comprises dispensing a first formulation without curing said first formulation; and printing on said first stack a second stack of layers, wherein for each layer of said second stack said printing comprises dispensing and curing said first formulation along a scanning direction, wherein said curing comprises irradiating said layer by creating a pattern of curing radiation having radiation intensity $I_B$ that scans said layer along said direction, wherein said pattern has a shape of at least two separated stripes.

15. The method according to claim 14, wherein said first stack comprises less than 5 layers.

16. The method according to claim 14, comprising printing said object onto said second stack.

17. The method according to claim 16, wherein said printing said object is by dispensing and curing a building formulation in layers along said direction in configured patterns corresponding to shapes of slices of the object, wherein for each layer of said object, said curing comprising irradiating said layer by creating a pattern of curing radiation having radiation intensity $I_A$ that scans said layer along said direction, wherein said pattern has a shape of a single stripe, and wherein said intensity $I_B$ is about two times said intensity $I_A$.

18. A method of forming an object on a fabric by three-dimensional printing, the method comprising:

printing on the fabric an adhesion structure having a stack of layers in a configured pattern corresponding to a shape of a bottommost surface of an object, wherein for each layer of said stack, said printing comprises dispensing and curing a first formulation along a scanning direction, wherein said curing comprises irradiating said layer by creating a pattern of curing radiation having radiation intensity $I_C$ that scans said layer along said direction, and wherein said pattern has a shape of at least two separated stripes; and printing the object onto said stack by dispensing and curing a building formulation in layers along said direction in configured patterns corresponding to shapes of slices of the object, wherein for each layer of said object, said curing comprising irradiating said layer by creating a pattern of curing radiation having radiation intensity $I_A$ that scans said layer along said direction, wherein said pattern has a shape of a single stripe, and wherein said intensity $I_C$ is about four times said intensity $I_A$.

19. A method of forming an adhesion structure on a fabric by three-dimensional printing, the method comprising obtaining a parameter describing the fabric, and executing one of:

(i) a method comprising:

printing on the fabric a first stack of uncured layers in a configured pattern corresponding to a shape of a bottommost surface of an object, wherein for each layer of said stack said printing comprises dispensing a first formulation without curing said first formulation; and printing on said first stack a second stack of layers, wherein for each layer of said second stack said printing comprises dispensing and curing said first formulation along a scanning direction, wherein said curing comprises irradiating said layer by creating a pattern of curing radiation having radiation intensity $I_B$ that scans said layer along said direction, wherein said pattern has a shape of at least two separated stripes, and (ii) the method according to claim 8;

wherein said (i) is executed when said parameter is indicative of an absorbance level less than a predetermined threshold, and said (ii) is executed when said parameter is indicative of an absorbance level of more than a predetermined threshold.

20. A method of selecting a printing protocol for three-dimensional printing on a fabric, the method comprising:

executing a first method on a first portion of the fabric;

executing a second method on a second portion of the fabric;

executing the method according to claim 8 on a third portion of the fabric; and testing adherence level of a respective object to each of said portions of the fabric;

wherein said first method comprises:

printing on the fabric an adhesion structure having a stack of layers in a configured pattern corresponding to a shape of a bottommost surface of the object, wherein for each layer of said stack said printing comprises dispensing and curing a first formulation along a scanning direction; and printing the object onto said stack by dispensing and curing a building formulation in layers along said direction in configured patterns corresponding to shapes of slices of the object;

wherein for each layer of said stack and each layer of the object, said curing comprising irradiating said layer by creating a pattern of curing radiation having radiation intensity $I_A$ that scans said layer along said direction, wherein said pattern has a shape of a single stripe;

wherein said second method comprises:

printing on the fabric a first stack of uncured layers in a configured pattern corresponding to a shape of a bottommost surface of an object, wherein for each layer of said stack said printing comprises dispensing a first formulation without curing said first formulation;

printing on said first stack a second stack of layers, wherein for each layer of said second stack said printing comprises dispensing and curing said first formulation along a scanning direction, wherein said curing comprises irradiating said layer by creating a pattern of curing radiation having radiation intensity $I_B$ that scans said layer along said direction, wherein said pattern has a shape of at least two separated stripes; and printing said object onto said second stack by dispensing and curing a building formulation in layers along said direction in configured patterns corresponding to shapes of slices of the object, wherein for each layer of said object, said curing comprising irradiating said layer by creating a pattern of curing radiation having radiation intensity $I_A$ that scans said layer along said direction, wherein said pattern has a shape of a single stripe, and wherein said intensity $I_B$ is about two times said intensity $I_A$.

* * * * *